(12) United States Patent
Santamaria et al.

(10) Patent No.: US 8,751,667 B2
(45) Date of Patent: Jun. 10, 2014

(54) SUPPORTING HANDS-FREE SERVICES VIA A HANDS-FREE DEVICE FOR IP VIDEO CALLS

(75) Inventors: Justin Santamaria, San Francisco, CA (US); Justin Wood, Sunnyvale, CA (US); Matthew Klahn, San Jose, CA (US)

(73) Assignee: Apple Inc., Cupertino, CA (US)

( * ) Notice: Subject to any disclaimer, the term of this patent is extended or adjusted under 35 U.S.C. 154(b) by 127 days.

(21) Appl. No.: 13/223,266

(22) Filed: Aug. 31, 2011

(65) Prior Publication Data

US 2012/0050455 A1     Mar. 1, 2012

Related U.S. Application Data

(63) Continuation-in-part of application No. 12/886,479, filed on Sep. 20, 2010, now Pat. No. 8,423,058, and a continuation-in-part of application No. 12/886,485, filed on Sep. 20, 2010, now Pat. No. 8,725,880, and a continuation-in-part of application No. 12/886,490, filed on Sep. 20, 2010, now Pat. No. 8,704,863.

(60) Provisional application No. 61/382,479, filed on Sep. 13, 2010, provisional application No. 61/378,924, (Continued)

(51) Int. Cl.
*G06F 15/16* (2006.01)
*H04L 12/28* (2006.01)

(52) U.S. Cl.
USPC .......................................... 709/227; 370/431

(58) Field of Classification Search
None
See application file for complete search history.

(56) References Cited

U.S. PATENT DOCUMENTS 5,371,534 A    12/1994   Dagdeviren et al.
5,410,543 A     4/1995   Seitz et al.
(Continued)

FOREIGN PATENT DOCUMENTS

EP    0583094 A2    7/1993
EP    1819124 A1    8/2007
(Continued)

OTHER PUBLICATIONS

PCT International Search Report and Written Opinion for PCT/US2010/050064, mailed Dec. 15, 2010, 12 pages.

(Continued)

*Primary Examiner* — Oscar Louie
*Assistant Examiner* — Younes Naji
(74) *Attorney, Agent, or Firm* — Blakely, Sokoloff, Taylor & Zafman LLP

(57) ABSTRACT

Hands-free services for Internet Protocol (IP) video calls through a peered hands-free device can begin when an IP video call invitation request that requests the client computing device participate in a P2P (peer-to-peer) IP video call is received. A generic incoming call object is generated based on the IP video call invitation request in a format that can be common for both incoming audio only cellular calls and IP video call invitation requests. The hands-free device is alerted of the incoming call based on the incoming call object. Responsive to receiving an indication from the hands-free device that a user has indicated to answer the incoming call, an IP video call accept message is transmitted and a P2P connection is established for the P2P IP video call, and the hands-free device can act as an auditory relay during the P2P IP video call.

10 Claims, 40 Drawing Sheets

Related U.S. Application Data filed on Aug. 31, 2010, provisional application No. 61/378,926, filed on Aug. 31, 2010, provisional application No. 61/321,865, filed on Apr. 7, 2010, provisional application No. 61/321,866, filed on Apr. 7, 2010, provisional application No. 61/351,814, filed on Jun. 4, 2010, provisional application No. 61/378,924, filed on Aug. 31, 2010, provisional application No. 61/378,926, filed on Aug. 31, 2010, provisional application No. 61/382,479, filed on Sep. 13, 2010, provisional application No. 61/321,832, filed on Apr. 7, 2010.

(56) References Cited

U.S. PATENT DOCUMENTS

| | | | |
|---|---|---|---|
| 6,101,532 A | 8/2000 | Horibe et al. | |
| 6,502,135 B1 | 12/2002 | Munger et al. | |
| 6,684,248 B1 | 1/2004 | Janacek et al. | |
| 6,748,055 B1* | 6/2004 | Borman et al. | 379/88.14 |
| 7,102,663 B2 | 9/2006 | Crook | |
| 7,292,823 B2* | 11/2007 | Kuo | 455/41.2 |
| 7,418,504 B2 | 8/2008 | Larson et al. | |
| 7,490,151 B2 | 2/2009 | Munger et al. | |
| 7,603,594 B2* | 10/2009 | Inoue et al. | 714/712 |
| 7,620,690 B1 | 11/2009 | Castelli | |
| 7,921,211 B2 | 4/2011 | Larson et al. | |
| 7,933,263 B1* | 4/2011 | Huang | 370/356 |
| 8,051,181 B2 | 11/2011 | Larson et al. | |
| 8,161,104 B2 | 4/2012 | Tomkow | |
| 8,504,697 B2 | 8/2013 | Larson et al. | |
| 2003/0026289 A1 | 2/2003 | Mukherjee et al. | |
| 2003/0220107 A1 | 11/2003 | Lioy et al. | |
| 2004/0048612 A1 | 3/2004 | Virtanen et al. | |
| 2004/0240650 A1 | 12/2004 | Bear et al. | |
| 2006/0068758 A1 | 3/2006 | Dharmadhikari et al. | |
| 2007/0002829 A1 | 1/2007 | Chang et al. | |
| 2007/0097989 A1 | 5/2007 | Sato | |
| 2007/0115962 A1 | 5/2007 | Mammoliti et al. | |
| 2007/0121856 A1* | 5/2007 | Alperin et al. | 379/142.12 |
| 2007/0253418 A1 | 11/2007 | Shiri et al. | |
| 2007/0280439 A1 | 12/2007 | Prywes | |
| 2008/0064398 A1 | 3/2008 | Zhu | |
| 2008/0123685 A1 | 5/2008 | Varma et al. | |
| 2008/0181169 A1 | 7/2008 | Lauer et al. | |
| 2008/0233990 A1 | 9/2008 | Jen | |
| 2008/0254835 A1* | 10/2008 | Mellqvist | 455/559 |
| 2009/0017855 A1 | 1/2009 | Kwon et al. | |
| 2009/0193507 A1 | 7/2009 | Ibrahim | |
| 2009/0234910 A1 | 9/2009 | Chung et al. | |
| 2009/0247245 A1* | 10/2009 | Strawn et al. | 455/575.2 |
| 2009/0288143 A1 | 11/2009 | Stebila et al. | |
| 2009/0313688 A1 | 12/2009 | Tuil | |
| 2009/0324197 A1 | 12/2009 | Ueda et al. | |
| 2010/0001058 A1 | 1/2010 | Grovit | |
| 2010/0098226 A1 | 4/2010 | Gupta et al. | |
| 2010/0199089 A1 | 8/2010 | Vysogorets et al. | |
| 2010/0217964 A1 | 8/2010 | Peterka et al. | |
| 2010/0228982 A1 | 9/2010 | Zhu et al. | |
| 2010/0245585 A1* | 9/2010 | Fisher et al. | 348/164 |
| 2010/0246355 A1 | 9/2010 | Ueda et al. | |
| 2010/0325427 A1 | 12/2010 | Ekberg et al. | |
| 2011/0092230 A1 | 4/2011 | Wenger | |
| 2011/0249073 A1 | 10/2011 | Cranfill et al. | |
| 2011/0252146 A1 | 10/2011 | Santamaria et al. | |
| 2012/0196629 A1 | 8/2012 | Movsesyan et al. | |
| 2013/0157699 A1 | 6/2013 | Talwar et al. | |

FOREIGN PATENT DOCUMENTS

| | | |
|---|---|---|
| EP | 1956796 A1 | 2/2008 |
| EP | 2034666 A1 | 3/2009 |
| WO | WO 2004/063843 A2 | 7/2004 |

OTHER PUBLICATIONS

PCT International Search Report and Written Opinion for PCT/US2010/050067, mailed Jan. 18, 2011, 11 pages.

"Push Notification Doubts, MacRumors Forums," http://forums.macrumors.com/showthread.php?t=735982, Jun. 30, 2009, 5 pages.

PCT Search Report and Written Opinion for PCT/US2010/050066, mailed Feb. 22, 2011, 22 pages.

PCT Search Report and Written Opinion for PCT/US2010/050066, mailed Apr. 8, 2011, 25 pages.

"Asterisk sip canreinvite," Voip-Info.org, Mar. 26, 2010, http://www.voip-info.org/wiki/view/Asterisk+sip+canreinvite, pp. 1-4.

PCT International Preliminary Report and Written Opinion for PCT/US2010/050064, mailed on Oct. 18, 2012, (8 pages).

PCT International Preliminary Report and Written Opinion for PCT/US2010/050067, mailed Oct. 18, 2012, (8 pages).

PCT International Preliminary Report and Written Opinion for PCT/US2010/050066, mailed Oct. 18, 2012 (18 pages).

Chen, Jason, "Gizmodo—This is Apple's Next iPhone," http://gizmodo.com/5520164/this-is-Apples-next-iphone, Apr. 19, 2010., (Apr. 19, 2012), 9 pages.

Rosenberg, J., et al., "SIP: Session Initiation Protocol," RFC 3261, Network Working Group, Jun. 2002, pp. 1-269.

Slivka, Eric , "Gizmodo Cleared as Charges Finally Brought in Lost Prototype iPhone 4 Case," http://www.macrumors.com/2011/08/10/qizmodo-cleared-as-charges-finally-brought-in-lost-prototype-iphone4-case, Aug. 10, 2011, 6 pages.

Van Meggelen, et al., "Asterisk: The Future of Telephony", Chapter 4: Initial Configuration of Asterisk, O'Reilly Media Inc., Sep. 16, 2005, pp. 65-84.

* cited by examiner

| Registration Data Store 750 | |
|---|---|
| PUSH TOKEN FIELD 1015 | ID FIELD 1020 |
| PT A; PT B | APPLE ID 123 |
| PT C | 555-555-2222 |
| PT D | EMAIL@EXAMPLE.COM |

The ID FIELD 1020 entries (APPLE ID 123, 555-555-2222, EMAIL@EXAMPLE.COM) comprise IP MESSAGING ID RECORDS 1010.

FIG. 10

NAT Compatibility Chart 1110

| A/B | Unknown | Full Cone | Port Restricted | Symmetric | Closed |
|---|---|---|---|---|---|
| Unknown | 0.0 | 1.0 | 0.0 | 0.0 | 0.0 |
| Full Cone | 1.0 | 1.0 | 1.0 | 1.0 | 0.0 |
| Port Restricted | 0.0 | 1.0 | 1.0 | 0.0 | 0.0 |
| Symmetric | 0.0 | 1.0 | 0.0 | 0.0 | 0.0 |
| Closed | 0.0 | 0.0 | 0.0 | 0.0 | 0.0 |

FIG. 11

SUPPORTING HANDS-FREE SERVICES VIA A HANDS-FREE DEVICE FOR IP VIDEO CALLS

CROSS-REFERENCE TO RELATED APPLICATIONS

This application claims the benefit of U.S. Provisional Application No. 61/382,479, filed Sep. 13, 2010, and claims the benefit of U.S. Provisional Application Nos. 61/378,924 and 61/378,926, each filed Aug. 31, 2010, all of which are each hereby incorporated by reference. This application is also a continuation-in-part of U.S. patent application Ser. No. 12/886,479, filed on Sep. 20, 2010 and is incorporated herein by reference. This application is also a continuation-in-part of U.S. patent application Ser. No. 12/886,485, filed on Sep. 20, 2010 and is incorporated herein by reference. This application is also a continuation-in-part of U.S. patent application Ser. No. 12/886,490, filed on Sep. 20, 2010 and is incorporated herein by reference. U.S. patent application Ser. Nos. 12/886,479, 12/886,485, and 12/886,490 claim priority to U.S. Provisional Application Nos.:

(1) Application No. 61/321,865 filed on Apr. 7, 2010;
(2) Application No. 61/321,866 filed on Apr. 7, 2010;
(3) Application No. 61/351,814 filed on Jun. 4, 2010;
(4) Application No. 61/378,924 filed on Aug. 31, 2010;
(5) Application No. 61/378,926 filed on Aug. 31, 2010; and
(6) Application No. 61/382,479 filed on Sep. 13, 2010.

This application may include related subject matter to co-pending, co-assigned U.S. Provisional Application No. 61/321,832, filed Apr. 7, 2010, and entitled: Apparatus and Method for Inviting Users to Online Sessions, which is incorporated by reference herein.

BACKGROUND

1. Field

Embodiments of the invention relate to the field of computer networking; and more specifically for supporting hands-free services for IP video calls with a hands-free unit (e.g., a headset, a car kit) over a WPAN (e.g., Bluetooth) network.

2. Background

Many implementations to provide online communication sessions (e.g., instant messaging, video conferencing, etc.) require users of computing devices to install software and/or register with the service. Thus as a prerequisite for a user to establish an online communication session with another user, both users must be registered and/or have the same software installed. Many implementations also maintain presence (e.g., a friendlist) that allows users to determine the status of other users (e.g., online, offline, away, etc.).

Large public networks, such as the Internet, frequently have connections to smaller private networks, such as those maintained by a corporation, Internet service provider, or even individual households. By their very nature, public networks must have a commonly agreed upon allocation of network addresses, i.e., public addresses. For a variety of reasons, maintainers of private networks often choose to use private network addresses for the private networks that are not part of the commonly agreed upon allocation. Thus, for network traffic from the private network to be able to traverse the public network, some form of private/public network address translation ("NAT") is required.

A device performing NAT operations alters the data packets being sent out of the private network to comply with the addressing scheme of the public network. Particularly, the network address translator replaces the originating private address and port number of a packet with its own public address and an assigned port number. A network address translator also alters the data packets being received for computers on the private network to replace the destination public address and port number with the correct private address and port number of the intended recipient. As used herein, the term address should be construed to include both an address and a port number if appropriate in the context, as would be understood by one of ordinary skill in the art.

NAT has become increasingly common in modern network computing. One advantage of NAT is that it slows the depletion of public network address space. For example, TCP/IP addressing, which is used on the Internet, comprises four strings of three digits each, thus providing a finite address space. Additionally, certain portions of this address space are reserved for particular uses or users, further depleting the actual number of addresses available. However, if NAT is used, a private network or subnet may use an arbitrary number of addresses, and still present only a single, standardized public address to the outside world. This makes the number of available addresses practically limitless, because each private network could, theoretically, use exactly the same private addresses.

One advantage provided by NAT is increased security arising from the fact that those on the public network cannot determine the actual (i.e., private) network address of a computer on a private network. This is because only the public address is provided on the public network by the network address translator. Additionally, this public address may correspond to any number of computers on the private network.

Different NAT types employ different levels of security. For example, with a "full cone NAT," once an internal address (iAddr:iPort) is mapped to an external address (eAddr:ePort), any external host can send packets to iAddr:iPort by sending packets to eAddr:ePort. With a "restricted cone NAT," an external host with an address hAddr can send packets to iAddr:iPort by sending packets to eAddr:ePort only if iAddr:iPort had previously sent a packet to hAddr. The port of the external host is irrelevant. With a "Port Restricted Cone NAT," an external host having an address/port hAddr:hPort can send packets to iAddr:iPort by sending packets to eAddr:ePort only if iAddr:iPort previously sent a packet to hAddr:hPort. Finally, with a Symmetric NAT, each request from the same iAddr:iPort to a specific destination IP address and port is mapped to a unique eAddr:ePort. If the same internal host sends a packet to a different destination, a different external address and port mapping is used. Only an external host that receives a packet from an internal host can send a packet back to the internal host.

Peer-to-peer ("P2P") computing refers to a distributed network architecture comprised of computing nodes which make a portion of their resources directly available to other network participants. Peers in a P2P network establish direct communication channels with one another and act as both clients and servers, in contrast to the traditional client-server model in which servers supply resources and clients consume resources.

The NAT operations described above pose numerous problems for P2P connections. For example, establishing a direct connection between two peers becomes increasingly difficult if one or both of the peers is located behind one or more of the NAT types described above. This problem is exacerbated by the fact that client devices such as the Apple iPod Touch®, Apple iPhone®, Apple iPad® and various other devices (e.g., RIM Blackberry® devices, Palm Pre® devices, etc) are frequently moved between networks having different NAT implementations. For example, the Apple iPhone™ is capable of communicating over Wi-Fi networks (e.g., 802.11b, g, n networks); 3G networks (e.g., Universal Mobile Telecommunications System ("UMTS") networks, High-Speed Uplink Packet Access ("HSUPA") networks, etc); and Bluetooth networks (known as personal area networks ("PANs")). Future client devices will be capable of communicating over additional communication channels such as WiMAX, International Mobile Telecommunication ("IMT") Advanced, and Long Term Evolution ("LTE") Advanced, to name a few.

Hands-free units (e.g., headsets, car kits) are typically used to peer with a computing device for hands-free services. For example, it is common for a computing device that includes cellular telephony functionality to include the ability to peer with a hands-free unit that acts as an auditory relay between the hands-free unit and the computing device.

SUMMARY

Providing hands-free services for Internet Protocol (IP) video calls through a peered hands-free device is described herein. In one embodiment, an IP video call invitation request that requests the client computing device participate in a P2P (peer-to-peer) IP video call is received. A generic incoming call object is generated based on the IP video call invitation request in a format that is common for both incoming audio only cellular calls and IP video call invitation requests. The hands-free device is alerted of the incoming call based on the incoming call object. Responsive to receiving an indication from the hands-free device that a user has indicated to answer the incoming call, an IP video call accept message is transmitted and a P2P connection is established for the P2P IP video call. The audio portion of the P2P IP video call is routed through the hands-free device such that it can act as an auditory relay during the P2P IP video call.

BRIEF DESCRIPTION OF THE DRAWINGS

The invention may best be understood by referring to the following description and accompanying drawings that are used to illustrate embodiments of the invention. In the drawings:

FIG. 10 illustrates an exemplary registration data store according to one embodiment;

FIG. 11 illustrates an exemplary NAT compatibility table according to one embodiment;

DETAILED DESCRIPTION

Figure 1:
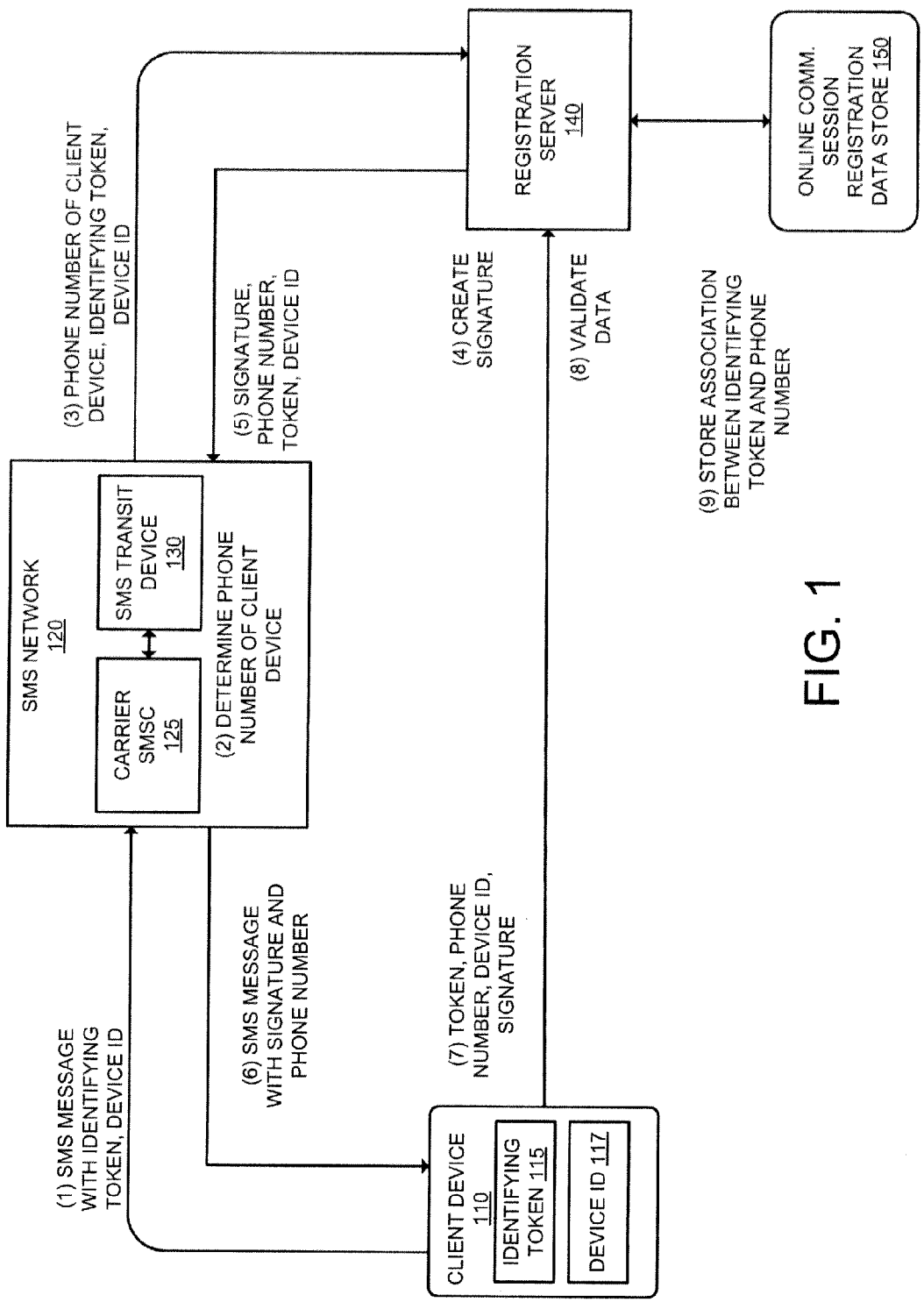
FIG. 1 is a data flow diagram illustrating registering a client device for online communication sessions according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Automatically Registering for Online Communication Sessions

A method and apparatus for automatically registering a client computing device ("client device") (e.g., a workstation, a laptop, a palmtop, a mobile phone, a smartphone, a multimedia phone, a tablet, a portable media player, a GPS unit, a gaming system, etc.) for online communication sessions (e.g., P2P video conferencing, P2P instant messaging, etc.) is described. In one embodiment, upon an event at a computing device (e.g., the computing device powering on), the client device automatically begins a registration process for online communication sessions. The automatic registration process includes the client device transmitting an SMS (short message service) message with an identifying token (e.g., its push token) and a client device identifier to an SMS transit device (e.g., an SMS gateway or an SMS aggregator). The identifying token uniquely identifies a client device for online communication session messages (e.g., invite request and accept invite messages), and in one embodiment, is a push token that can contain information that allows a push notification service to locate the client device. The identifying token in the push notification service embodiment is also used as a way of establishing trust that a particular notification is legitimate. In other embodiments, any registry or mapping of client devices to unique tokens may be used to associate identifying tokens with client devices and to provide a trusted method of associating the identity of the client device with a uniquely identified token. The device identifier uniquely identifies the client device and is typically based on one or more hardware identifiers (e.g., a serial number of the device, an ICC-ID (Integrated Circuit Card ID) of a SIM (Subscriber Identity Module) card, etc.).

The SMS transit device determines the phone number of the client device (e.g., by examining the header of the SMS message) and transmits an IP (Internet Protocol) message to a registration server with the identifying token, device identifier, and the phone number. The registration server generates a signature based on the identifying token, device identifier, and the phone number, and transmits these to the SMS transit device for delivery to the client device. The SMS transit device transmits an SMS message to the client device including the signature and phone number. The client device then transmits an IP message to the registration server with the signature, device identifier, identifying token, and phone number.

The registration server validates the information from the client device and stores an association between the identifying token and the phone number in an online communication session registration data store. Together, the associated pair of the identifying token and the phone number uniquely identify the device in an online communication session network. After the client device has been registered, a user at the client device may initiate and/or accept an invitation for an online communication session (e.g., video chat/conference session, instant messaging session, etc.). In one embodiment, the phone number of a client device is used as the online communication session endpoint identifier of an online communication session. By way of example, a user at a client device may invite other user(s) at other client device(s) to participate in an online communication session using their phone number(s). In some embodiments, the client device does not natively know its own phone number.

FIG. 1 is a data flow diagram illustrating registering a client device for online communication sessions according to one embodiment. FIG. 1 includes the client device 110, the SMS network 120, the registration server 140, and the IP messaging data store 150. The client device 110 (e.g., a workstation, a laptop, a palmtop, a computing phone, a smartphone, a multimedia phone, a tablet, a portable media player, a GPS unit, a gaming system, etc.) includes the identifying token 115 (which may be a push token in one embodiment). The identifying token 115 uniquely identifies the client device 110 for receiving invitation request and invitation accept (or deny) messages, which will be described in greater detail later herein. The device identifier 117 uniquely identifies the client device and is typically based on one or more hardware identifiers (e.g., a serial number of the device, an ICC-ID (Integrated Circuit Card ID) of a SIM (Subscriber Identity Module) card, etc.). The client device 110 includes the ability to transmit and receive SMS messages as well as the ability to connect and send/receive IP messages.

After registering for online communication sessions, the client device 110 can invite and/or accept invitations for online communication sessions. The client device 110 is identified in the online communication sessions through an online communication session endpoint identifier. While in one embodiment the online communication session endpoint identifier is a phone number of the client device 110, in other embodiments the online communication session endpoint identifier is a different identifier (e.g., a username (e.g., an Apple ID), an email address, a mailing address, a MAC address, or other identifier).

The SMS network 120, which includes the carrier SMSC (Short Message Service Center) 125 and the SMS transit device 130 (e.g., an SMS gateway or an SMS aggregator). The carrier SMSC 125 is computing carrier specific and receives and delivers SMS messages. For example, the carrier SMSC 125 delivers SMS messages sent from the client device 110 to the SMS transit device 130, and delivers SMS messages sent from the SMS transit device 130 to the client device 110. The SMS transit device 130 separates the mobile network and the IP network.

The registration server 140 registers client devices such as the client device 110 for online communication sessions. Registering a client device for online communication sessions includes associating an identifying token of a device with the phone number of the device (or other online communication session endpoint identifier). The associations between identifying tokens and online communication session end identifiers are stored in the online communication session registration data store 150.

Upon an event occurring at the client device 110 (e.g., the client device powering on, an online communication session application (e.g., a P2P video conferencing application, a P2P instant message application, etc.) launching, etc.), the client device 110 begins a registration process for online communication sessions. In one embodiment the registration process begins automatically (without user interaction) while in other embodiments the registration process begins after a user selects to register the client device for online communication sessions.

In embodiments where the phone number of the client device 110 is used as the online communication session endpoint identifier, and is thus to be associated with the identifying token 115 of the client device 110 in the registration data store 150, the phone number of the client device 110 must be determined. Since the client device 110 does not natively know its own phone number, in some embodiments the phone number of the client device 110 is determined through the client device 110 transmitting an SMS message. For example, at operation 1, the client device 110 transmits an SMS message with its identifying token 115 and the device identifier 117 to the SMS transit device 130 through the carrier SMSC 125. In some embodiments, the SMS message is addressed to a phone number, which may be a standard length number or a short code (a type of phone number that is typically significantly shorter than a full telephone number), that is specifically established for online communication session registration. The phone number that the SMS message is addressed to is stored in the client device (e.g., in a carrier bundle).

The carrier SMSC 125 receives the SMS message and delivers it to the SMS transit device 130. The SMS transit device 130 determines the phone number of the client device at operation 2. For example, the SMS transit device 130 examines the header of the SMS message to determine the phone number of the client device 110. After determining the phone number, the SMS transit device 130 transmits an IP message to the registration server 140 with the phone number of the client device 110 the identifying token 115, and the device identifier 117. This is sometimes referred to as a registration request message.

The registration server 140 receives the IP message from the SMS transit device including the phone number of the client device 110, the identifying token 115, and the device identifier 117, and creates a signature. The signature may be based on the phone number of the client device 110, the identifying token 115, and/or the device identifier 117, and is used for validation purposes (which will be described in greater detail later herein). In some embodiments, a random number is also used when generating the signature to account for situations where multiple client devices have the same phone number. The registration server 140 transmits the signature, phone number, device identifier, and the token back to the SMS transit device 130 at operation 5 (e.g., in an IP message). This is sometimes referred to as a registration response message.

The SMS transit device 130 receives the signature, phone number, device identifier, and token from the registration server 140 and generates an SMS message with the signature and phone number for the client device 110. The SMS transit device 130 transmits the SMS message to the client device 110 with the signature and phone number at operation 6 (through the carrier SMSC 125).

The client device 110 receives and processes the SMS message including storing its phone number. The client device 110 transmits an IP message with its identifying token 115, device identifier 117, its phone number, and the signature generated by the registration server to the registration server 140 at operation 7. This is sometimes referred to as a registration validation request message.

Using the signature, the registration server 140 validates the data sent by the client device 110. For example, the registration server 140 compares the signature sent by the client device 110 with the signature generated during operation 4. If they match, then the data is validated. Assuming that the data is valid, the registration server 140 stores an association between the identifying token 115 and the phone number of the client device 110 in the online communication session registration data store 150.

In an alternative embodiment, instead of determining the phone number of the client device 110 through transmission of SMS messages, the user of the device is prompted to input the phone number of the client device 110. In these embodiments, the client device 110 directly transmits the phone number of the client device 110 (as input by the user) and its identifying token 115 to the registration server 140, which may associate them in the online communication session registration data store 150.

Figure 5:
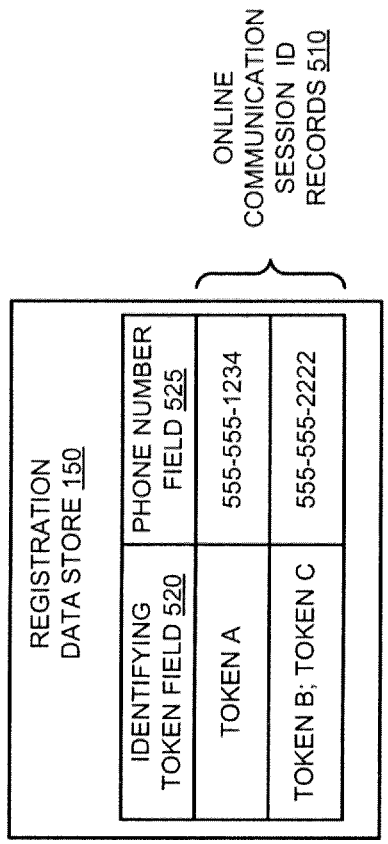
FIG. 5 illustrates an exemplary registration data store according to one embodiment.

FIG. 5 illustrates an exemplary registration data store 150 according to one embodiment. As illustrated in FIG. 5, each of the online communication session identifier records 510 include a identifying token field 520 and a phone number field 525. In some situations, it is possible for a single phone number to be associated with multiple identifying tokens. For example, different client devices may have the same phone number. In these cases, these different client devices would have different identifying tokens. Thus, when an online communication session invitation is sent for a phone number associated with multiple identifying tokens, an invite will be transmitted each device associated with the identifying token.

Figure 2:
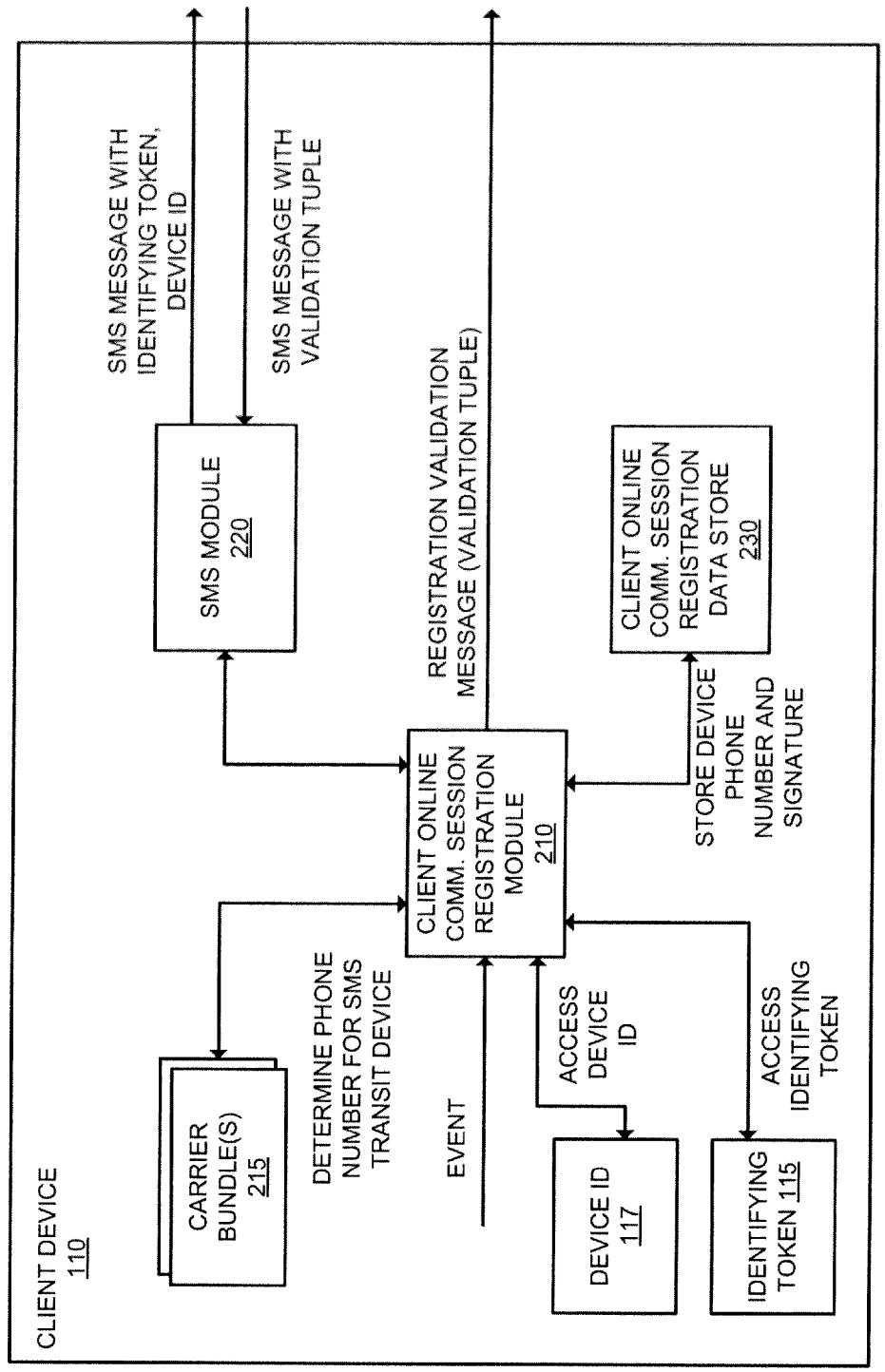
FIG. 2 is a block diagram illustrating the client device of FIG. 1 in more detail according to one embodiment.

FIG. 2 is a block diagram illustrating the client device 110 in more detail according to one embodiment. FIG. 2 will be described with reference to the exemplary embodiment of FIG. 4, which is a flow diagram illustrating exemplary operations for registering a client device for online communication sessions. However, it should be understood that the operations of FIG. 4 can be performed by embodiments other than those discussed with reference to FIG. 2, and the embodiments discussed with reference to FIG. 2 can perform operations different than those discussed with reference to FIG. 4.

As illustrated in FIG. 2, the client device 110 includes the client online communication session registration module ("client registration module") 210, the carrier bundle(s) 215, the push token 115, the device identifier 117, the SMS module 220, and the client online communication session registration data store ("client registration data store") 230. The client registration module 210 controls the registration of the client device 110 for online communication sessions. The carrier bundle(s) 215 include settings specific to a carrier including the phone number for the SMS transit device used for registration (e.g., the number for the SMS transit device 130) and other settings (e.g., Access Point Name (APN) settings, multimedia messaging service (MMS) settings, etc.). The SMS module 220 transmits and receives SMS messages. The client registration data store 230 stores data related to online communication session registration (e.g., the phone number of the client device 110 once determined).

Figure 4:
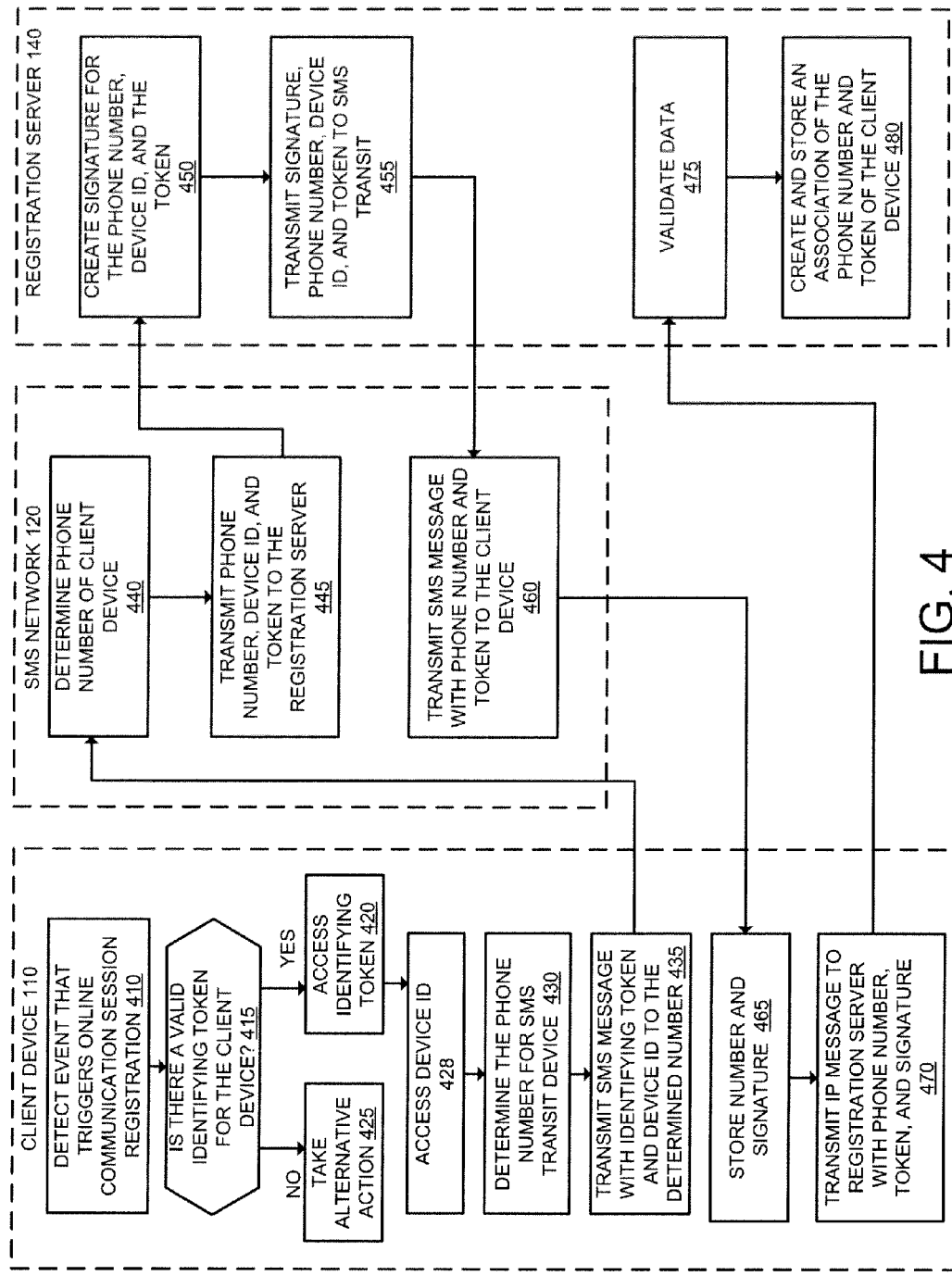
FIG. 4 is a flow diagram illustrating exemplary operations for registering a client device for online communication sessions according to one embodiment.

Referring to FIG. 4, at block 410, the client registration module 210 detects or receives an event that triggers online communication session registration. Examples of such events include the client device 110 powering on, a user opening an online communication application (e.g., a P2P video conferencing application, a P2P instant messaging application, etc.), etc. In some embodiments the registration process is performed each time the client device 410 powers on, while in other embodiments the registration process is performed the first time the client device 110 is powered on. Flow moves from block 410 to block 415.

At block 415, the client registration module 210 determines whether there is a valid identifying token for the client device 110. If there is not a identifying token, or the identifying token has expired, then flow moves to block 425 where alternative action is taken. For example, in embodiments using push tokens, the client device 110 can initiate a token generation procedure by requesting a push token be generated by a push notification service (which is typically remote from the client device 110). The push notification service generates a push token specific to the client device 110 and returns it to the client device 110. If there is a valid identifying token, then flow moves to block 420 where the client registration module 210 access the identifying token 115. Flow moves from block 420 to block 428.

At block 428, the client registration module 210 accesses the device identifier 117. Flow then moves to block 430, where the client registration module 210 determines the phone number for the SMS transit device used in the registration process. For example, the client registration module 210 accesses the carrier bundle(s) 215 to determine the phone number of the SMS transit device. The phone number may be a short code or may be a standard length number. In this example, the SMS transit device used in the registration process is the SMS transit device 130. Flow moves from block 430 to block 435.

At block 435, an SMS message having the identifying token 115 and the device identifier 117 is transmitted to the determined number (the SMS transit device 130). For example, the client registration module 210 requests the SMS module 220 to transmit an SMS message with the identifying token 115 and device identifier 117 to the determined number. The SMS module 220 transmits the SMS message with the identifying token to the determined number. Flow moves from block 435 to block 440. The SMS message will be received by the carrier SMSC 125, which delivers it to the SMS transit device 130.

At block 440, the SMS transit device 130 determines the phone number of the client device 110 based on the received SMS message. For example, the SMS transit device examines the header of the SMS message, which will include the phone number of the sender, which in this case is the client device 110. Flow then moves to block 445 where the SMS transit device 130 transmits the phone number of the client device 110 the identifying token 115, and the device identifier 117 to the registration server 140 (e.g., in a secure IP message). Flow moves from block 445 to block 450.

Figure 3:
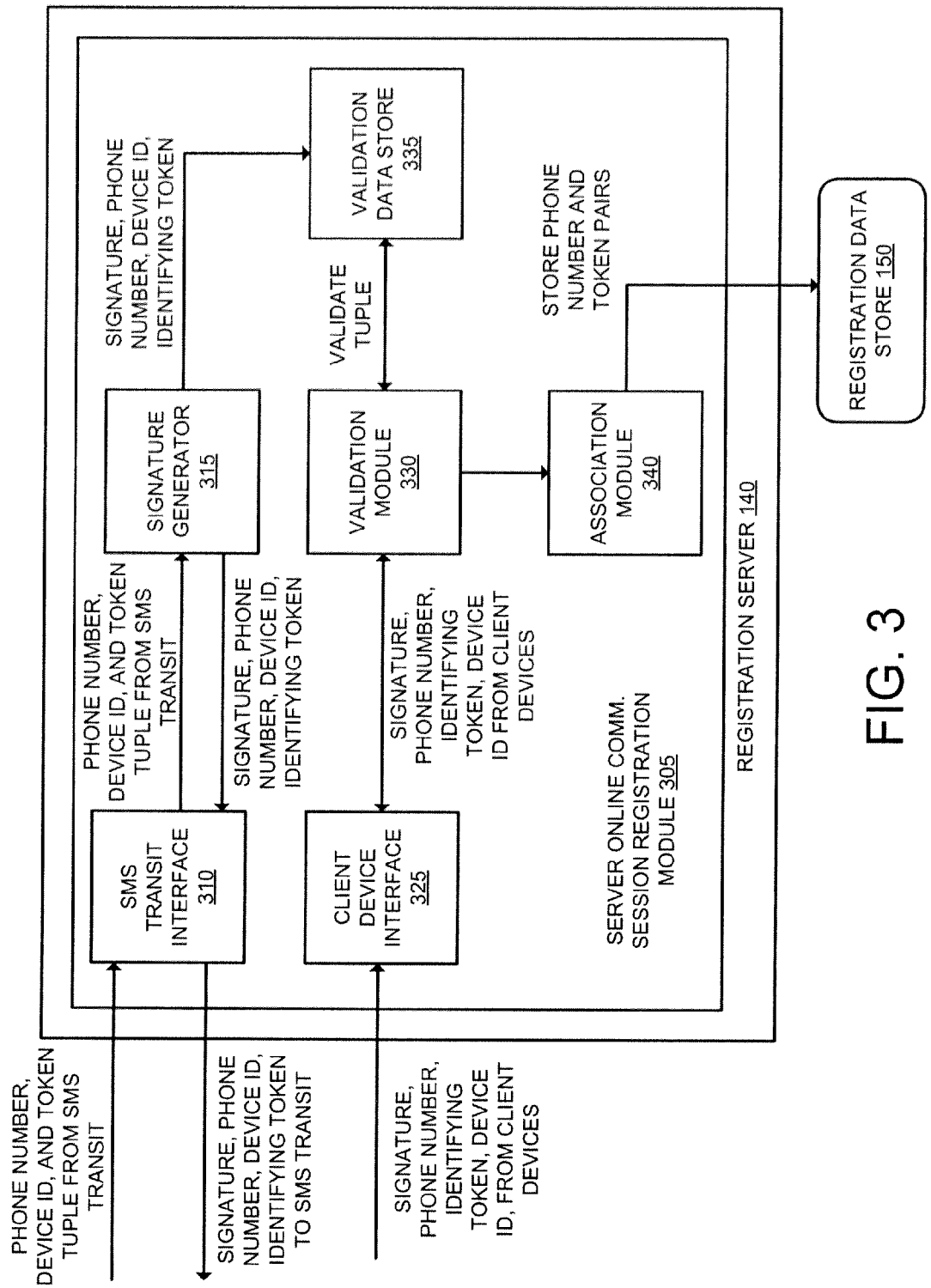
FIG. 3 is a block diagram illustrating the registration server of FIG. 1 in more detail according to one embodiment.

FIG. 3 is a block diagram illustrating the registration server 140 in more detail according to one embodiment. FIG. 3 will be described with reference to the exemplary embodiment of FIG. 4. However, it should be understood that the operations of FIG. 4 can be performed by embodiments other than those discussed with reference to FIG. 3, and the embodiments discussed with reference to FIG. 3 can perform operations different than those discussed with reference to FIG. 4. As illustrated in FIG. 3, the registration server 140 includes the server online communication session registration module 305, which includes the SMS transit interface 310, the signature generator 315, the client device interface 325, the validation module 330, the validation data store 335, and the association module 340. The SMS transit interface 310 receives and sends messages to the SMS transit device 130. For example, the SMS transit interface 310 receives phone number, identifying token, and device identifier tuples from the SMS transit interface 310, and transmits phone number, identifying token, device identifier and signature tuples (sometimes referred to as "validation tuples") to the SMS transit interface 310. The client device interface 325 receives and may transmit messages to client devices. For example, the client device interface 325 receives validation tuples from client devices.

Referring back to FIG. 4, at block 450, the signature generator 310 generates a signature for the phone number, identifying token, and device identifier tuple it received from the SMS transit device 130. The signature will be used to validate the pairing of the phone number and the identifying token prior to storing the pair in the registration data store 150. In some embodiments the signature is based on the phone number, identifying token, and/or device identifier (e.g., a cryptographic hash is applied to phone number, identifying token, and/or device identifier, or some portion thereof, to generate the signature). In some embodiments, the signature is also based on a random number to account for situations where multiple client devices have the same phone number. The signature generator 310 stores the signature and optionally the phone number, identifying token, and/or device identifier in the validation data store 325. Flow then moves to block 455, where the SMS transit interface 310 transmits the signature, phone number, device identifier, and identifying token to the SMS transit device 130. Flow moves from block 455 to block 460.

The SMS transit device 130 receives the signature, phone number, and identifying token from the registration server 140. At block 460, the SMS transit device transmits an SMS message (through the carrier SMSC 125) with the signature and phone number for the client device 110. Flow next moves to block 465.

At block 465, the SMS module 220 receives the SMS message with the signature and the phone number and stores the signature and the phone number in the client registration data store 230. Flow then moves to block 470, where the client registration module 210 transmits an IP message to the registration server with its phone number, identifying token 115, device identifier 117, and signature. Flow then moves to block 475.

The client device interface 325 receives the phone number, identifying token, device identifier, and signature from the client device. The information is passed to the validation module 330 which determines whether the data is valid at block 475. For example, the same hash function as applied when generating the signature is used on the phone number, identifying token, and/or device identifier received from the client device, and the validation module 330 compares the result with the signature that was previously generated (stored in the validation data store 335). If the signatures match, then the data is valid and flow moves to block 480.

At block 480, the association module 330 of the registration server 140 stores an association of the phone number of the client device and the identifying token of the client device in the registration data store 150. In some embodiments, the registration server 140 may transmit a registration status message to the client device 110 alerting the client device 110 whether registration was successful.

After the client device has been registered, a user at the client device may initiate and/or accept an invitation for an online communication session (e.g., video chat/conference session, instant messaging session, etc.). By way of example, a user at a client device may invite other user(s) at other client device(s) to participate in an online communication session using their phone number(s). In some embodiments, the client device does not natively know its own phone number. While embodiments have described the use of SMS messages during registration, in other embodiments other types of text messaging may be used (e.g., MMS (Multimedia Messaging Service)).

Registering Email Addresses for Online Communication Sessions

Figure 21:
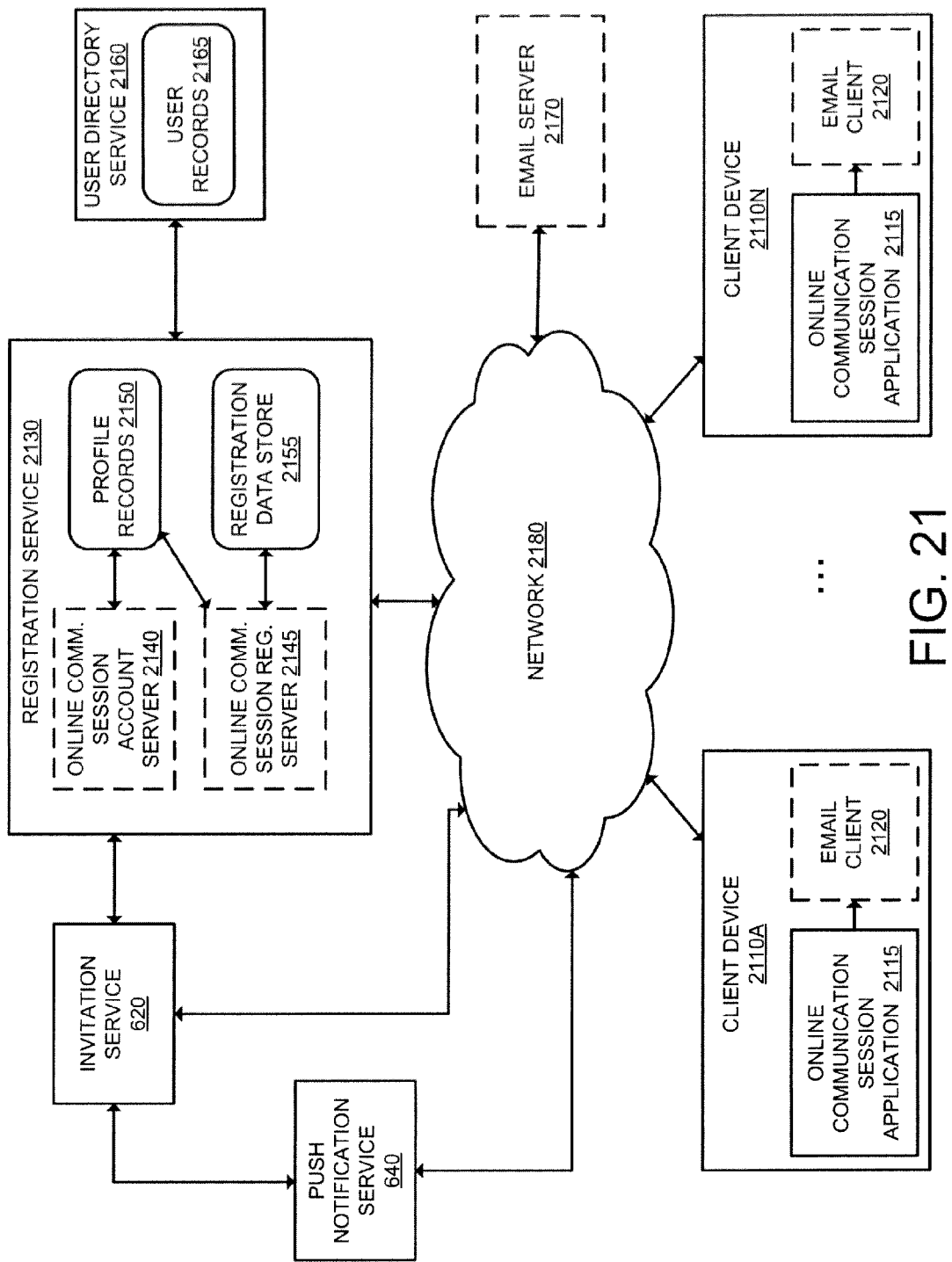
FIG. 21 illustrates a general network topology used to register a client device for online communication sessions using an email address as an online communication session endpoint identifier according to one embodiment.

While FIG. 1 was described in relation to registering a phone number as an online communication session endpoint identifier, in other embodiments an email address is used as an online communication session endpoint identifier. FIG. 21 illustrates a general network topology used to register a client device for online communication sessions using an email address as an online communication session endpoint identifier. The client devices 2110A-N use the registration service 2130 to register for online communication sessions. For example, in one embodiment, the user of a client device 2110A uses the online communication session client 2115 to register an email address for use as an online communication session identifier for online communications over the network 2180 (e.g., the Internet).

Figure 22A:
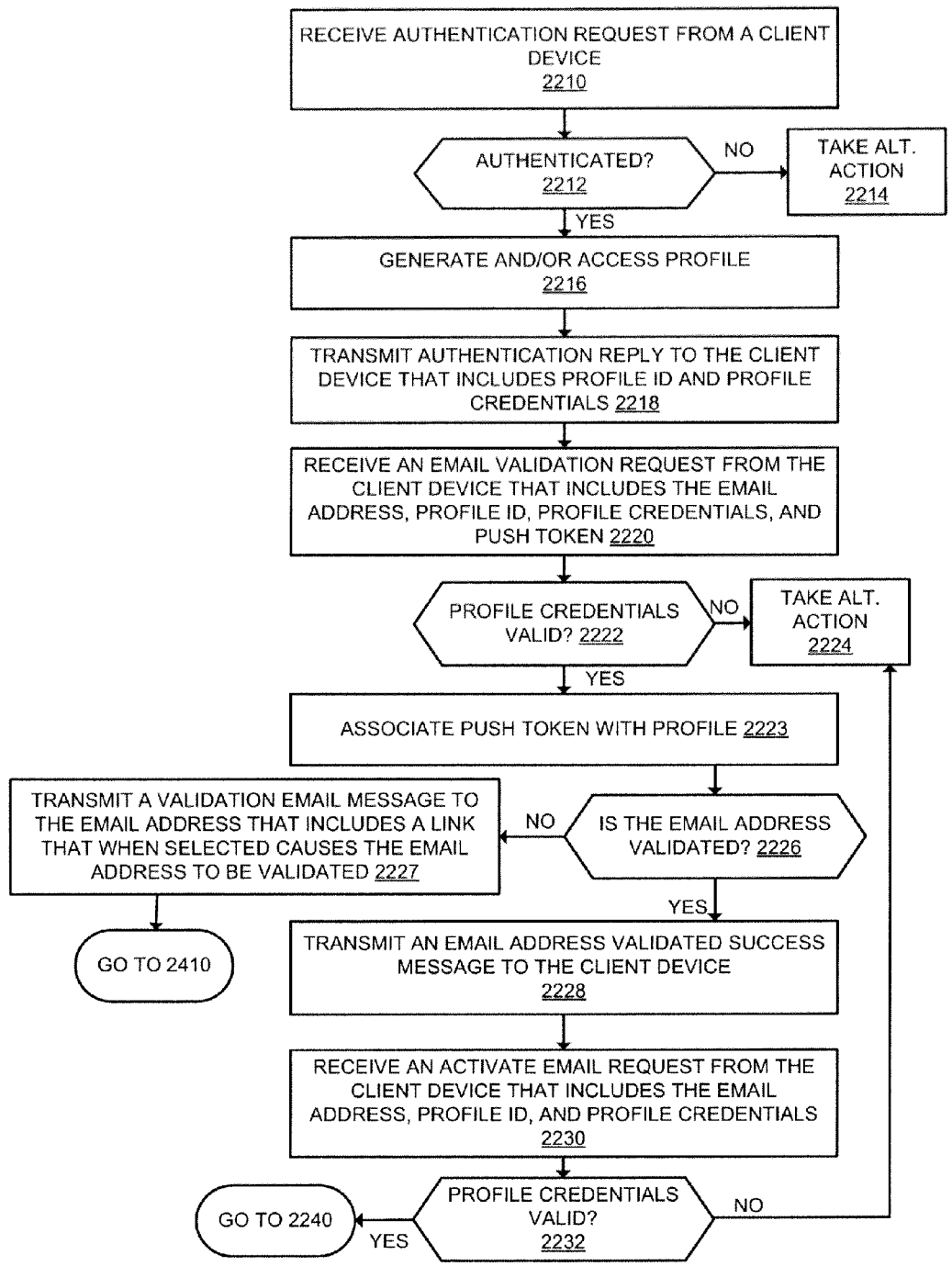
FIGS. 22A-B are flow diagrams illustrating exemplary operations for registering an email address as an online communication session endpoint identifier according to one embodiment.
Figure 22B:
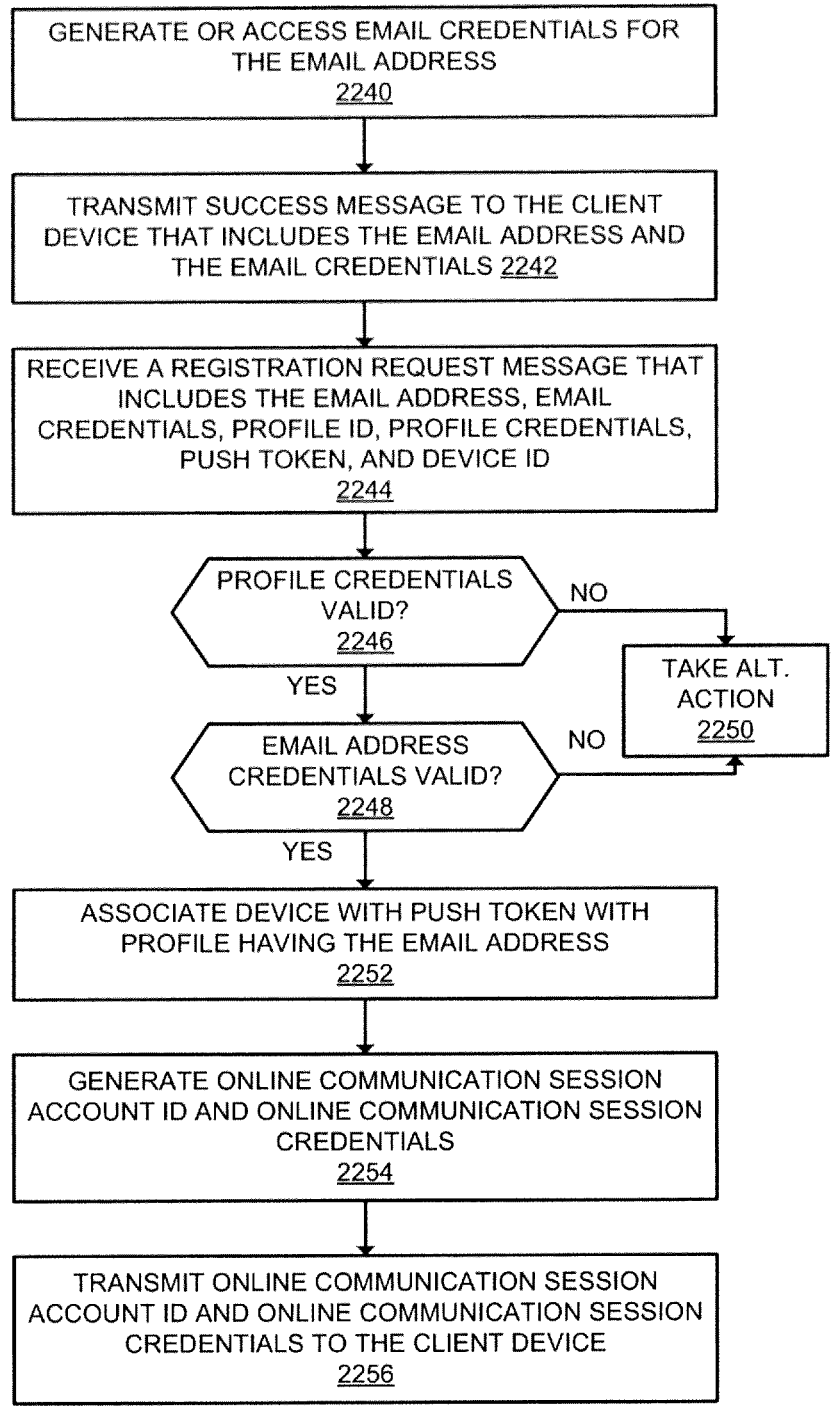

FIGS. 22A-B are flow diagrams illustrating exemplary operations for registering an email address as an online communication session endpoint identifier according to one embodiment. FIGS. 22A-B will be described with reference to the exemplary embodiment illustrated in FIG. 21. However, it should be understood that the operations of FIGS. 22A-B can be performed by embodiments other than those discussed with reference to FIG. 21, and the embodiments discussed with reference to FIG. 21 can perform operations different than those discussed with reference to FIGS. 22A-B.

Figure 23:
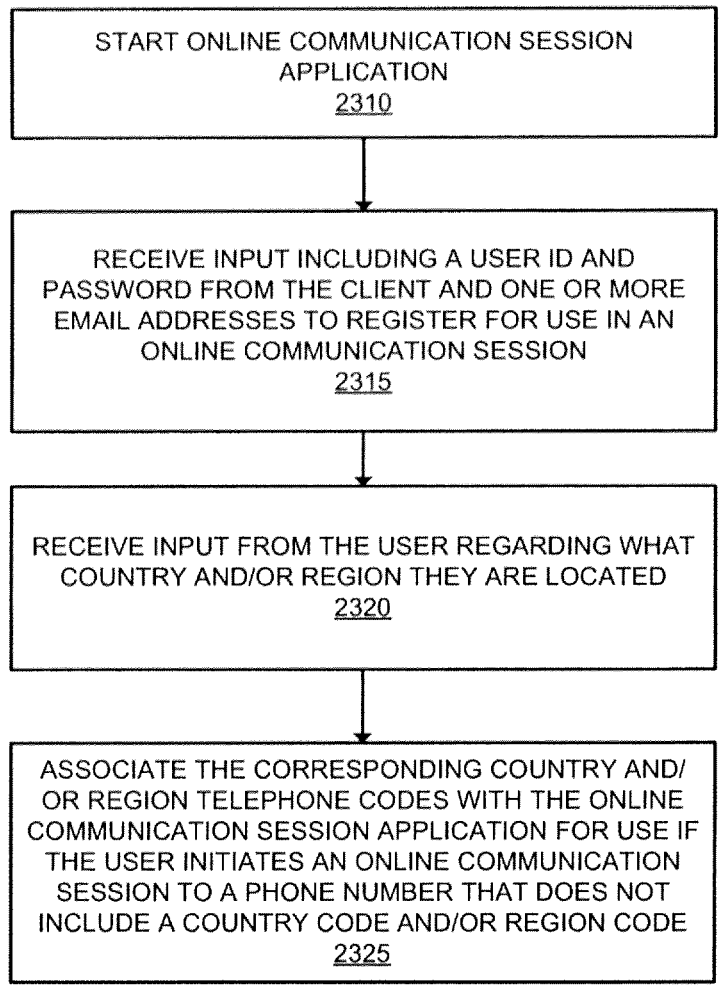
FIG. 23 is a flow diagram that illustrates exemplary operations for a user providing initialization information for registering an email address as an online communication session endpoint identifier according to one embodiment.

At operation 2210, the registration service 2130 receives an authentication request from the client device 2110A. For example, with reference to FIG. 23, which describes exemplary operations for a user providing initialization information, at operation 2310, the online communication session application 2115 is started on the client device 2110A. Flow then moves to operation 2315 and the client device 2110A receives input from the user including a user ID and password and one or more email address to register for use as online communication session endpoint identifier(s). Flow then moves to operation 2320 and the client device 2110A transmits the user ID and password to the registration service 2130.

Although the client device 2110A is registering an email address as an online communication session endpoint identifier and may not include phone functionality, it may send an online communication session invitation using a phone number instead of an email address. In addition to receiving a user ID, password, and one or more email addresses to register, in some embodiments the user can also provide information regarding what country and/or region they are currently located so that a corresponding country code and/or region code can be used if the user initiates an online communication session to a phone number that does not include a country code and/or region code. For example, in the United States, a local telephone call can be placed by using 7 digits (thus the country code and area code are not required). The underlying telephone system automatically determines the country and area code and completes the call. However, in cases where the client device 2110A does not include telephone functionality, the client device 2110A cannot rely on the underlying telephone system to automatically include the country code and/or region code when inviting a user to an online communication session using a telephone number that does not include the country code and/or region code.

At operation 2320, the client device 2110A receives input from the user regarding what country and/or region (e.g., area code, state, province, city, etc.) they are located in. Flow then moves to operation 2320 where the client device 2320 associates the corresponding country and/or region telephone codes with the online communication session application 2115 for use if the user initiates an online communication session to a phone number that does not include a country code and/or region code. For example, if the user indicates that they are located in the United States and the user invites a user to an online communication session using a 10 digit phone number that does not include the country code, the client device 2110A automatically adds the country code for the United States to the phone number.

With reference back to FIG. 22A, after receiving the authentication request from the client device 2110A, an authentication process is performed using the provided username and password. In one embodiment the registration service 2130 performs the authentication process while in another embodiment the user directory service 2160 performs the authentication process. The user directory service 2160 is a centralized service that provides user accounting, authentication, and other services. The user directory service 2160 manages the user records 2165. In one embodiment, each authenticated user is associated with a user record that includes various information (e.g., one or more of a user ID, password, mailing address, telephone number, name, birthday, country, a list of emails associated with the user (which may also indicate whether the email address is validated), etc.). If authentication is successful, then flow moves to operation 2216. If authentication fails, then flow moves to operation 2214 and alternative action is taken (e.g., the registration service 2130 transmits an error message to the client device 2110A that indicates that the username and/or password is not correct).

At operation 2216, the registration service 2130 generates and/or access an online communication session profile associated with the user ID. For example, the registration service 2130 may include an online communication session account server 2140 that manages the online communication session profile records 2150. In one embodiment, each user that is registering or registered for online communication sessions has a corresponding online communication session profile record. Each online communication session profile record may include a set of one or more email addresses, including their validation status, that are associated with the profile. Each online communication session profile record may also include one or more push tokens that correspond to one or more client devices respectively that are registered for online communication sessions. Each profile record may also include profile credentials which are used to validate certain communications from the client devices. Each profile record may also indicate which client devices (as indicated by push tokens) have registered or are trying to register which email addresses.

Flow moves from operation 2216 to operation 2218 and the registration service 2130 transmits an authentication reply to the client device 2110A that includes the profile ID (e.g., a string that identifies the profile associated with the provided user ID) and the profile credentials. The authentication reply may also indicate that the authentication was successful. Flow then moves to operation 2220 and the registration service 2130 receives an email validation request from the client device 2110A that includes one or more email addresses to validate, profile ID, profile credentials, and the push token of the client device 2110A. The email validation request message may also include the device ID of the client device 2110A. The registration service 2130 then determines whether the profile credentials are valid for the profile ID at operation 2222. If they are not, then flow moves to operation 2224 and alternative action is taken (e.g., the registration service 2130 transmits an error message to the client device 2110A). If they profile credentials are valid, then flow moves to operation 2223. At operation 2223, the registration service 2130 associates the push token with the profile. For example, the online communication session account server 2140 stores the push token in the profile record for the user.

Flow then moves to operation 2226 and the registration service 2130 determines whether the email address is validated. A validated email address is an email address that has been validated as belonging to the user requesting that is requesting it to be registered for use as an online communication session endpoint identifier. The online communication session account server 2140 accesses the user's profile record 2150 to determine whether the email address is validated. If the profile record does not indicate that the email address is validated, in some embodiments the registration service 2130 transmits an email address validation request to the user directory service 2160 to determine whether the user record 2165 for the user indicates that the email address is validated. If the email address is not validated, then flow moves to operation 2227 and the registration service 2130 causes a validation email message to be sent to the email address that includes a link that when selected (or when entered into an Internet browser) causes the email address to be validated. For example, selection of the link causes an email address validation message to be sent that includes the email address and a validation token that are used to validate the email address. The registration service 2130 may also transmit an email address needs validating message to the client device that indicates that the email address is not validated (and thus needs to be validated) and may also indicate a validation email message was sent to the email address in question. Flow then moves to operation 2410, which will be described in reference to FIG. 24. However, if the email address is validated, then flow moves to operation 2228.

At operation 2228, the registration service 2130 transmits an email address validated success message to the client device 2228 that indicates that the email address has been validated. Flow then moves to operation 2230 and the registration service 2130 receives an activate email request from the client device 2228 that includes the email address, profile ID, and profile credentials. The registration service 2130 then determines whether the profile credentials are valid for the profile ID at operation 2232. If they are not, then flow moves to operation 2224 and alternative action is taken (e.g., the registration service 2130 transmits an error message to the client device 2110A). If they profile credentials are valid, then flow moves to operation 2240.

At operation 2240, the registration service 2130 generates or accesses email credentials for the email address. For example, in one embodiment, the online communication session account server 2140 stores the email credentials for each validated email address of a user in that user's profile record 2150. Flow then moves to operation 2242 and the registration service 2130 transmits an activation success message to the client device 2110A that includes the email address and the email credentials.

Flow moves from operation 2242 to operation 2244 and the registration service 2130 receives a registration request message that includes the email address, the email credentials, the profile ID, the profile credentials, the push token of the client device 2110A, and the device ID of the client device 2110A. In one embodiment, the request message is received at the online communication session registration server 2145. The online communication session registration server manages the online communication session registration data store 2155. The online communication session registration data store 2155 associates a push token (and optionally the device ID) with the profile that has a set of one or more email addresses as online communication session endpoint identifier(s). Thus, each record in the communication session registration data store 2155 represents that a particular device with a particular push token is using an online communication session profile that has one or more email addresses that can be used to invite a user at that device to an online communication session. Flow moves from operation 2244 to operation 2246.

At operation 2246, the registration service 2130 (e.g., the online communication session registration server 2145) determines whether the profile credentials are valid. If they are not valid, then flow moves to operation 2250 and alternative action is taken (e.g., the registration service 2130 transmits an error message to the client device 2110A). If they are valid, then flow moves to operation 2248 and the registration service 2130 (e.g., the online communication session registration server 2145) determines whether the email address credentials are valid. If they are not, then flow moves to operation 2250. If they are valid, then flow moves to operation 2252.

At operation 2252, the registration service 2130 (e.g., the online communication session registration server 2145) associates the client device 2110A with its push token with the profile having the email address and stores the association in the registration data store 2155. Flow then moves to operation 2254 and the registration service 2130 generates an online communication session account identifier and online communication session credentials and transmits them to the client device 2110A at operation 2256.

Figure 24:
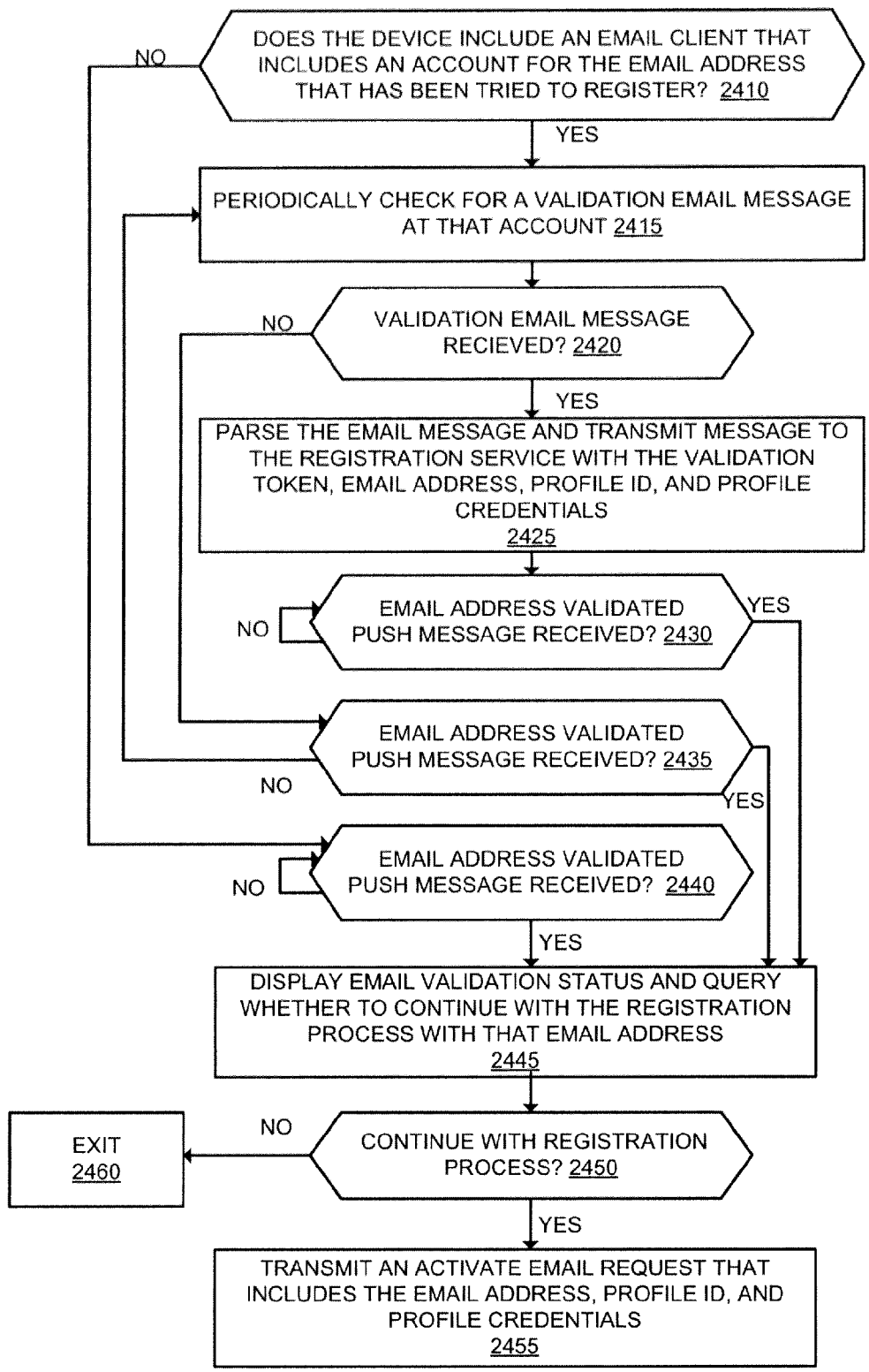
FIG. 24 illustrates exemplary operations for validating an email address according to one embodiment.

There are different ways to validate email addresses in different embodiments. With reference to FIG. 24, which is a flow diagram that illustrates exemplary operations for validating an email address, at operation 2410 the client device 2110A determines whether it includes an email client that includes an account for an email address that it has tried to register and has not received a positive validation email message. If it does not include such an email client, then flow moves to operation 2440, otherwise flow moves to operation 2415.

At operation 2415, the email account is automatically periodically checked for a validation email message (e.g., the validation email message transmitted in operation 2227). In one embodiment, the online communication session application 2115 periodically requests the email client 2120 to check for the validation email message (the email client 2120 may poll the email server 2170 to check for the validation email message). The validation email message is identified by a set of one or more criteria including the From: field, the To: field, and a validation token (the validation token may be unique for each email address being validated) that is used to validate the email address. The validation token may be located in the header or the body of the validation email message. If the validation email message is received, then flow moves from operation 2420 to operation 2425, otherwise flow moves to operation 2435.

At operation 2425, the validation email message is returned to the online communication session application 2115 and it parses the message to locate the validation token. After locating the validation token, the online communication session application 2115 transmits an email address validation message to the registration service 2130 with the validation token, the email address, the profile ID and profile credentials. Thus in this embodiment, the email address is automatically validated without requiring the user to click on a link or otherwise validate the email address. In one embodiment, after receiving the message and determining that the profile credentials are valid, the registration service 2130 transmits an email validated push message (via the push notification service 640) to the device that indicates that the email address has been successfully validated. Thus, flow moves from operation 2425 to operation 2430 and the client device 2110A waits to receive the email address validated push message.

If a validation email message has not been received, then flow moves to operation 2435 where the client device determines whether an email validated push message has been received that indicates that the email address that is trying to be registered has been validated. If such a message is received, then flow moves to operation 2445, otherwise flow moves back to operation 2415.

At operation 2440 (the client device 2110A does not include an email client that includes an account for the email address that is being registered), the client device 2110A waits to receive an email validated push message has been received that indicates that the email address that is trying to be registered has been validated. If such a message is received, then flow moves to operation 2445, otherwise flow remains at operation 2440.

At operation 2445, the client device 2110A displays that the email address has been validated and queries the user to continue with the registration process with that email address. If the client device 2110A receives input indicating to continue with the registration process, then flow moves to operation 2455 and the client device 2110A transmits an active email request that includes the email address, the profile ID, and the profile credentials to the registration server. The operations described beginning at operation 2230 of FIG. 22 are then performed. If the client device 2110A receives input indicating that the user does not want to continue with the registration process, then flow moves from operation 2450 to operation 2460 and the process exits.

Figure 25:
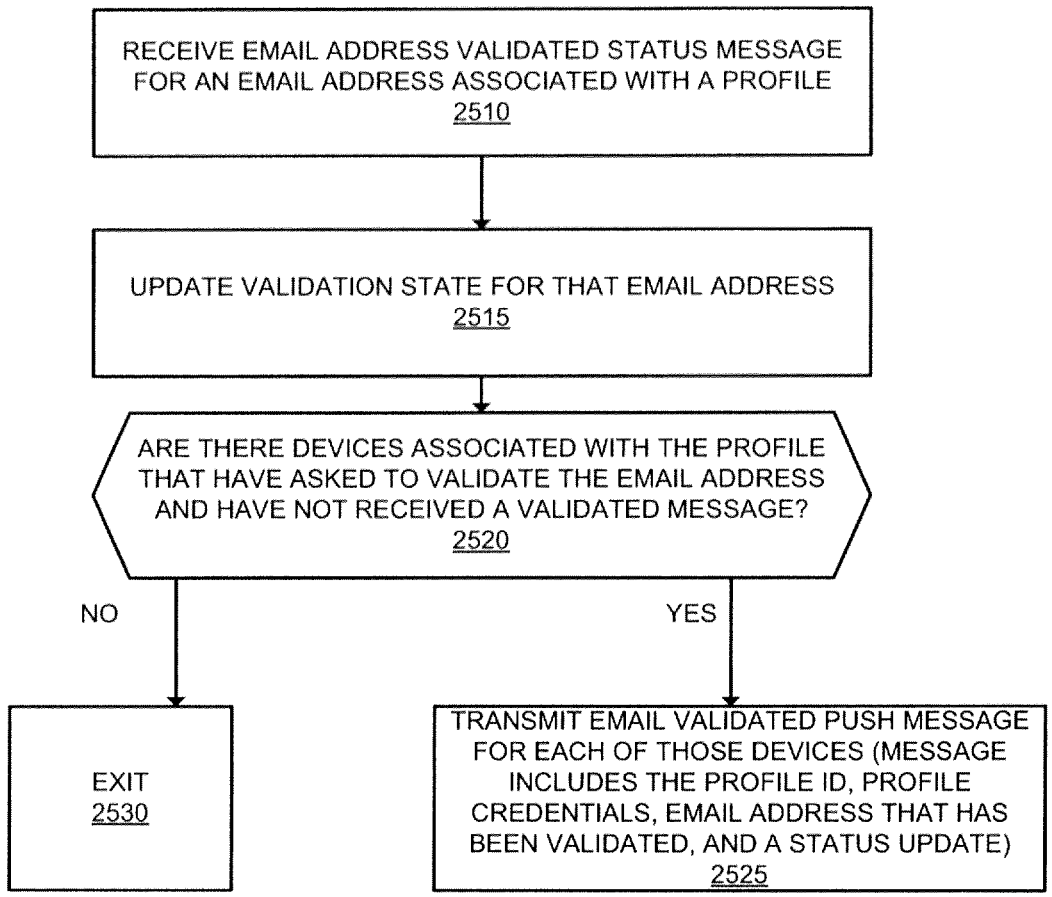
FIG. 25 is a flow diagram illustrating exemplary operations performed on a registration service when an email address has been validated according to one embodiment.

FIG. 25 is a flow diagram illustrating exemplary operations performed on the registration service when an email address has been validated according to one embodiment. At operation 2510, the registration service 2130 receives an email address validated status message that indicates that an email address that is associated with an online communication session profile has been validated. The email address validated status message may have been received as a result of operation 2425, or may have been received as a result of the email address being validated in a different way (e.g., a user clicking on a validation link in a validation email message that causes the email address to be validated, which may be sent on a different device than the device that is trying to register the email address for use in online communication sessions).

Flow then moves to operation 2515 and the registration service 2130 updates the validation state for the email address in the profile records 2150. Flow then moves to operation 2515 and the registration service 2130 determines whether there are client devices that are associated with the online communication session profile that have asked to validate the email address that have not received an email address validated message. For example, the registration service 2130 accesses the profile record 2150 for the online communication session profile to determine which client devices (e.g., as identified by unique push tokens) have asked to validate the email address and which have not received an email address validation message for that email address. For each such client device, the registration service transmits an email validated push message to that client device that includes the profile ID, profile credentials, and the email address that has been validated at operation 2525. The email validated push message may also include a status update to indicate that the email address has been validated. If there are no devices that have asked to validate the email address that have not received an email address validated message, then flow moves to operation 2530 and the process exits.

Establishing Online Communication Sessions

Figure 6:
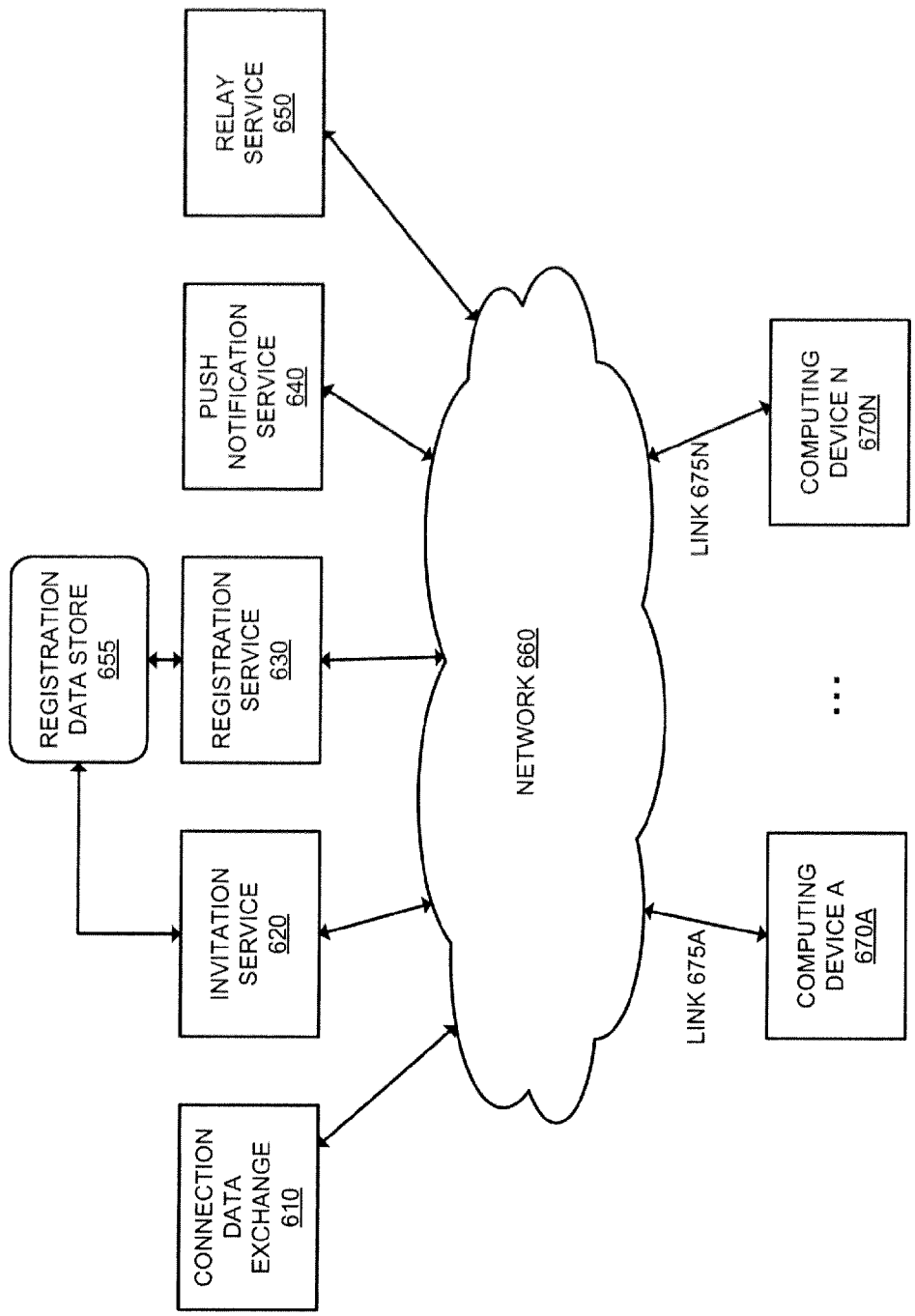
FIG. 6 illustrates a general network topology of one embodiment.

As illustrated in FIG. 6, a general network topology implemented in one embodiment can include a number of client devices A-N, 670A-N respectively, communicating with one another and with one or more services 610, 620, 630, 640, and 650 over a network 660. Although illustrated as a single network cloud, the network 660 can include a variety of different components including public networks such as the Internet and private networks such as local Wi-Fi networks (e.g., 802.11n home wireless networks or wireless hotspots), local area Ethernet networks, cellular data networks (e.g., 3G, 4G, Edge, etc.) and WiMAXs networks, to name a few. The client devices 670A-N may connect to the network 660 over different network links. For example client device 670A may be connected to a home Wi-Fi network represented by network link 675A and the client device 670N may be connected to a 3G network (e.g., Universal Mobile Telecommunications System ("UMTS"), High-Speed Uplink Packet Access ("HSUPA"), etc.) over the network link 675N. Each of the network links 675A-N over which the client devices 670A-N are connected may be coupled to a public network such as the Internet through a gateway and/or NAT (Network Address Translation) device (not shown in FIG. 6), thereby enabling communication between the various client devices 670A-N over the public network. However, if two client devices are on the same local or private network (e.g., the same Wi-Fi network), then the two devices may communicate directly over that local/private network, bypassing the public network. It should be noted, of course, that the underlying principles of the invention are not limited to any particular set of network types or network topologies.

Each of the client devices 670A-N can communicate with a connection data exchange (CDX) service 610, an invitation service 620, a registration service 630, a push notification service 640, and a relay service 650. In one embodiment, the services 610-650 can be implemented as software executed across one or more physical computing devices such as servers.

In one embodiment, the CDX service 610 operates as a central exchange point for connection data required to establish online communication sessions between two or more client devices. Specifically, one embodiment of the CDX service 610 generates NAT traversal data (sometimes referred to as "Hole Punch" data) in response to client device requests to enable external services and clients to communicate through the NAT of each client device (i.e., to "punch a hole" through the NAT to reach the device). For example, in one embodiment, the CDX service detects the external IP address and port needed to communicate with the client device and provides this information to the client device. In one embodiment, the CDX service also receives and processes lists of client devices generated by the invitation service 620 and efficiently and securely distributes connection data to each of the client devices included on the lists (as described in detail below).

Users of the client devices 670A-N use the invitation service 620 to invite users to participate in collaborative online communication sessions (e.g., P2P video conferencing, P2P instant messaging chats/conference, etc.). For example, a user of the client device 670A requests an online communication session with one or more users of one or more different client devices by transmitting an invitation request to the invitation service 620 that includes an online communication session endpoint identifier of each of the other users. The online communication session endpoint identifier may be different in different embodiments (e.g., a telephone number, a username (e.g., an Apple ID), an email address, a mailing address, a MAC address, or other identifier). The invitation service 620 reads the online communication session endpoint identifier(s) from the invitation request and performs a lookup in the registration data store 655 to locate the client device(s) that are associated with the online communication session endpoint identifier(s).

The client devices 670A-N use the registration service 630 to register for online communication sessions. For example, in one embodiment, when each of the client devices 670A-N is powered on and is activated on the network, it causes its identifying token (e.g., its push token) to be associated with an online communication session endpoint identifier. The associations are stored in the registration data store 655. In one embodiment, the client devices 670A-N register for participation for online communication session service using the registration service 630 as described with respect to FIG. 4, while in other embodiments the registration process occurs differently (e.g., by providing both their push token and their online communication session endpoint identifier).

The push notification service 640 uses the push tokens of the client devices 670A-N to transmit push notifications to the client devices 670A-N. In one embodiment, the push notifications are used to transmit the invitations for the online communication sessions. The relay service 650 establishes online communication session connections between client devices when the NAT types of the client devices are not compatible or P2P connection establishment has failed between the client devices.

In one embodiment, communication between the client devices and the CDX service 610 is established using a relatively lightweight network protocol such as User Datagram Protocol ("UDP") sockets. As is known by those of skill in the art, UDP socket connections do not require hand-shaking dialogues for guaranteeing packet reliability, ordering, or data integrity and, therefore, do not consume as much packet processing overhead as TCP socket connections. Consequently, UDP's lightweight, stateless nature is useful for servers that answer small queries from a vast number of clients. Moreover, unlike TCP, UDP is compatible with packet broadcasting (in which packets are sent to all devices on a local network) and multicasting (in which packets are sent to a subset of devices on the local network). As described below, even though UDP may be used, security can be maintained on the CDX service 610 by encrypting NAT traversal data using session keys.

In contrast to the low-overhead, lightweight network protocol used by the CDX service 610, in one embodiment, communication between the client devices 670A-N and the invitation service 620, registration service 630, push notification service 640, and/or the relay service 650 is established with an inherently secure network protocol such as Hypertext Transfer Protocol Secure ("HTTPS"), which relies on Secure Sockets Layer ("SSL") or Transport Layer Security ("TLS") connections. Details associated with these protocols are well known by those of skill in the art.

Figure 7:
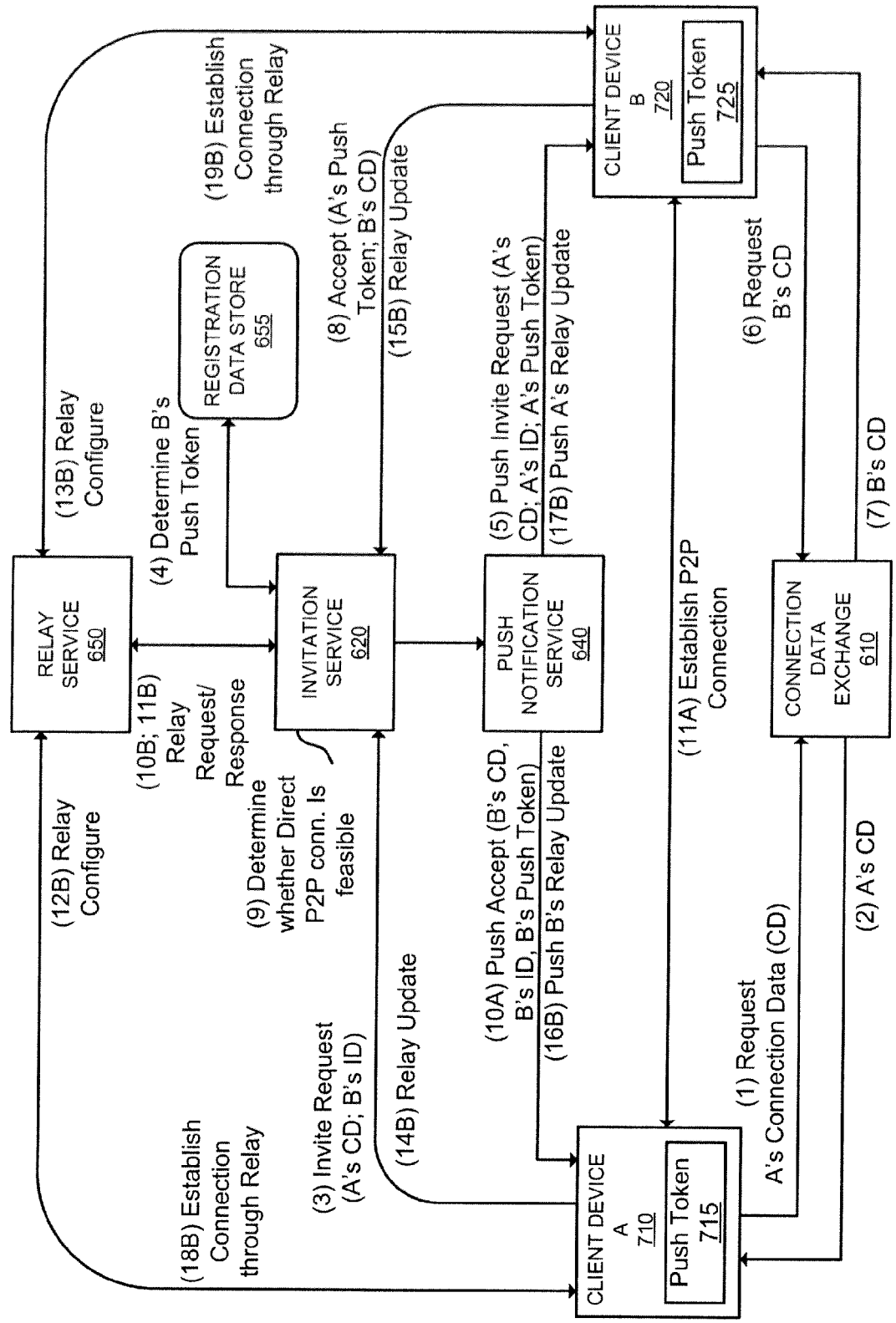
FIG. 7 is a data flow diagram illustrating online communication session establishment between client devices according to one embodiment.

FIG. 7 is a data flow diagram illustrating online communication session establishment between client devices according to one embodiment. In the example of FIG. 7, a user at the client device A 710 invites a user at the client device B 720 to an online communication session (e.g., a P2P video conference, a P2P instant messaging system, etc.). In this example, the client device A 710 is sometimes referred to as an initiating client device, the user of the client device B 720 is sometimes referred to as an intended recipient, and the client device B 720 is sometimes referred to as an intended recipient client device. In some embodiments, the online communication session invite is a blind invitation without presence. For example, the user at the client device A 710 does not know whether the user at the client device B 720 is currently online or available to participate in the online communication session.

While embodiments described in reference to FIGS. 6 and 7 are specific to using push tokens and push notifications, other embodiments are not so limited. For example, in other embodiments, any registry or mapping of client devices to unique tokens may be used to associate identifying tokens with client devices and to provide a trusted method of associating the identity of the client device with a uniquely identified token.

At operation 1, the client device A 710 requests its connection data from the connection data exchange 610. The connection data includes information for client devices to exchange with each other to establish an online communication session (e.g., a P2P session). Connection data includes the IP address of the client device (e.g., the public IP address), the port number of the request, and other information (e.g., priority information, etc.). The connection data exchange 610 determines the connection data of the client device A 710 (e.g., the public/private IP addresses and ports, NAT type of the client device A's NAT device). At operation 2, the connection data exchange 610 returns the connection data to the client device A 710.

At operation 3, the client device A 710 transmits an online communication session invitation request to the invitation service 620 to invite the client device B 720 to an online communication session (e.g., a P2P video conference, a P2P instant messaging session, etc.). In one embodiment, the invitation includes the connection data of client device A 710, which may include public/private IP addresses and ports for client device A 710 and the NAT type for client device A's NAT device, and an online communication session endpoint identifier associated with the user at the client device B 720 (e.g., a telephone number of client device B 720, a username of the user (e.g., an Apple ID), an email address, a mailing address, a MAC address, etc.). The online communication session invitation request can take the form of an HTTPS request and may include a client certificate signed by a pre-specified certificate authority.

At operation 4, the invitation service 620 determines the push token(s) associated with the online communication session endpoint identifier included in the request of operation 3. For example, the invitation service 620 accesses the registration data store 655 to determine the push token(s) that are associated with the online communication session endpoint identifier. As illustrated in FIG. 7, the push token 725 is assigned to the client device B 720 and thus is associated with its online communication session endpoint identifier. FIG. 10 illustrates an exemplary registration data store 655 according to one embodiment. As illustrated in FIG. 10, each of the online communication session identifier records 1010 includes a push token field 1015 and an online communication session identifier field 1020. As illustrated in FIG. 10, the same online communication session identifier may be associated with multiple push tokens. In such a case, multiple invitations will be transmitted (e.g., one per push token).

The invitation service 620 transmits a push request message to the push notification service 640. At operation 5, the push notification service 640 transmits an online communication session invite request, in the form of a push notification message, to the client device B 720. The request includes the connection data, the online communication session endpoint identifier, and the push token of the client device A 710 (the push token 715). The invite request may also include information specific to the online communication session to provide the user of the client device B 720 with information about the invite (e.g., the name of the person sending the invite (e.g., username, real name, phone number, or some combination thereof), what the invite is for (e.g., a P2P video conference, a P2P instant messaging session, etc.), etc.).

The online communication session invite request will be received and displayed on the client device B 720 if it is turned on and operating correctly. The invite request includes a mechanism for the user to accept or decline the invitation (e.g., an accept button and a decline button). The user at the client device A 710 may receive a notification if invite request is denied. Assuming that a user at the client device B 720 accepts the invitation request, at operation 6 the client device B 720 requests its connection data from the connection data exchange 610. The connection data exchange 610 determines the connection data of the client device B 720 (e.g., the public/private IP addresses and ports, NAT type of the client device B's NAT device), and at operation 7, returns the connection data to the client device B 720.

The client device B 720 then transmits an accept message to the invitation service 620 at operation 8. The accept message includes the client device B's 720 connection data and includes the push token of the client device A 710. The accept message may also contain an indication as to whether it is a retry from a previous failed direct P2P connection attempt between the client device A 710 and client device B 720. The accept message can take the form of an HTTPS message.

In some embodiments, the invitation service 620 determines whether a P2P connection between the client device A 710 and the client device B 720 is feasible. At operation 9, the invitation service 620 determines whether a direct P2P connection between client devices A and B is feasible. For example, in one embodiment, if the accept message received from the client device B 620 indicates that it is a retry from a previous failed direct connection attempt (or a specified number of previous failed direct connection attempts), then the invitation service 620 may conclude that a direct P2P connection is infeasible. To determine feasibility, the invitation service 620 may compare the NAT type data for the client devices A and B to determine if the NAT devices of the client devices A and B will support a direct P2P connection. In one embodiment, the accept message described above does not include an indication of previous failed attempts. Rather, after a failed direct connection attempt, either of the client devices 710-720 may transmit a special "relay invitation" request (e.g., in place of the invite request at operation 3 in FIG. 7) indicating that a relay connection is needed. In response, the invitation service may automatically invoke the relay operations described herein (as described below).

Certain combinations of NAT types are known to be incompatible for establishing P2P connections. For example, a full cone NAT may be used with any other NAT type except a closed/firewalled NAT to establish a direct P2P connection. By contrast, a symmetric NAT can only be used with a full cone NAT to establish a direct P2P connection. The feasibility of combining various NAT types in one embodiment is set forth in the NAT compatibility table 1110 shown in FIG. 11, in which columns represent NAT types of one client device (e.g., client device A 710) and rows represent NAT types of the other client device (e.g., client device B 720). A "1.0" in a cell indicates that the NAT types in the associated row and column are compatible and a "0.0" indicates that the NAT types are incompatible.

If the invitation service 620 determines that a direct P2P connection is feasible, then the invitation service 620 transmits a push request to the push notification service 640 to transmit acceptance of the invitation request. Thus at operation 10B, the push notification service 640 transmits an online communication session accept message, in the form of a push notification, to the client device A 710. The accept message includes the connection data, the online communication session endpoint identifier, and the push token of the client device B 720. The accept message will be displayed on the client device A 710. Since the client devices A and B have each other's connection data, the client devices A and B have sufficient information to establish a direct P2P connection. Thus at operation 11A, the client devices A and B establish a direct P2P connection using the exchanged connection data. The direct P2P connection may be established through known mechanisms (e.g., using Internet Connectivity Establishment (ICE) or other known P2P connectivity mechanisms).

If, however, the invitation service 620 determines that a direct P2P connection is infeasible, then it transmits a relay lookup request at operation 10B to the relay service 650 to determine one or more relay hosts for the client devices A and B to use for the connection. The relay lookup request may contain the networking information for the client devices A and B (e.g., NAT traversal/connection data and/or NAT type data) which is used by the relay service 650 to select appropriate relay hosts for both of the client devices.

Figure 8:
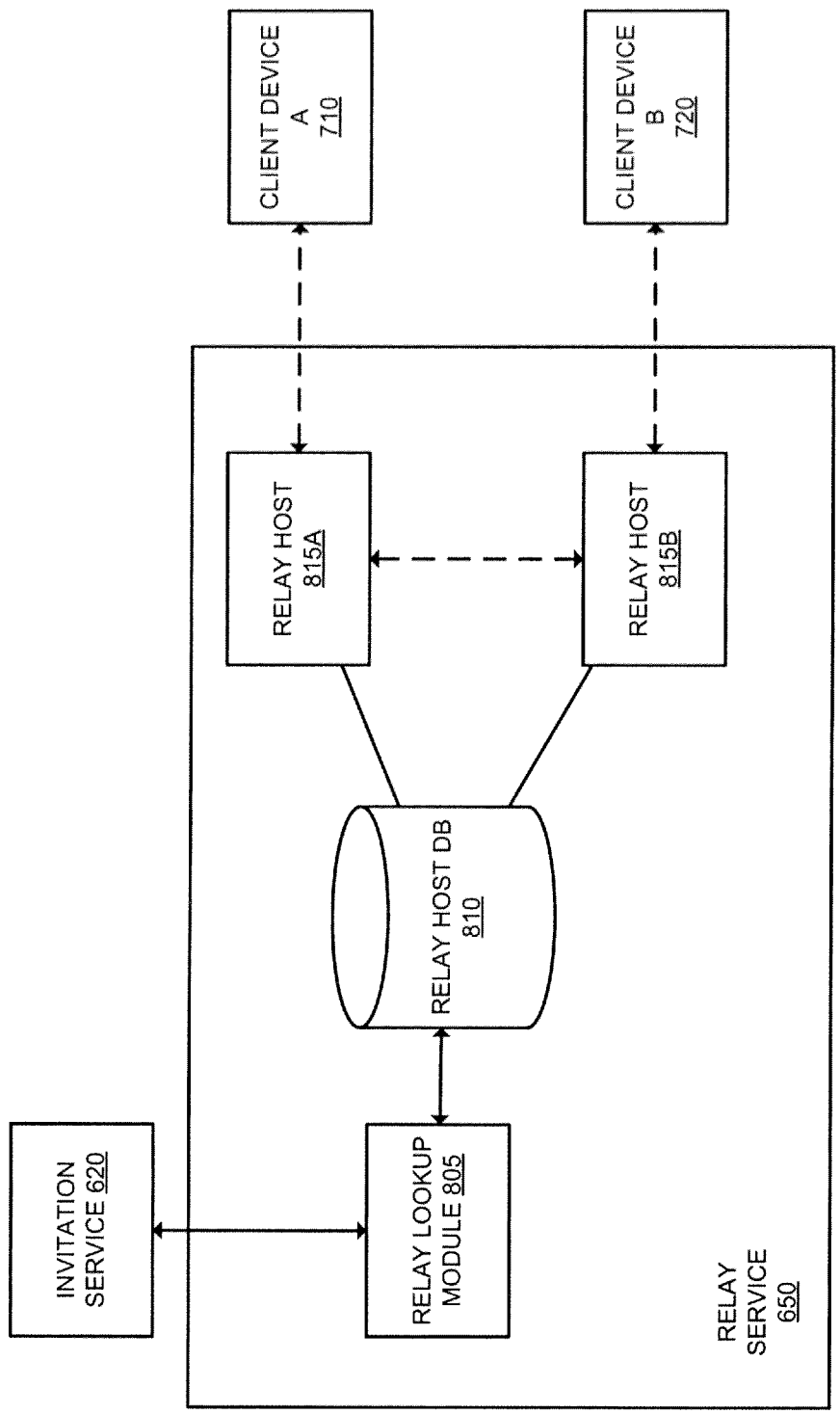
FIG. 8 is a block diagram illustrating an exemplary relay service according to one embodiment.

As illustrated in FIG. 8, in one embodiment, the relay service 650 includes a relay lookup module 805, a multiple relay hosts 815A-B, and a relay host database 810 containing network information related to each of the relay hosts 815A-

B. While FIG. 8 illustrates two relay hosts, it should be understood that there may be more or less relay hosts in some embodiments. The invitation service 620 transmits a relay lookup request to the relay lookup module 805, which queries the relay host database 810 using the network information for the client devices A and B. Upon receiving the database results, the relay lookup module 805 provides a response identifying the selected relay hosts 815A-B at operation 11B to the invitation service 620.

In one embodiment, the relay lookup response contains a relay token generated by the relay service 650 and the network addresses (IP addresses/ports) of the selected relay hosts 815A-B to be used by client devices A and B for the relay connection. In one embodiment, the relay token is associated with the relay session and is used by the relay hosts 815A-B to authenticate the client devices A and B upon connecting to the relay service 650. The token may take on various forms including, for example, unique ID relay session ID code, a digital certificate and/or a unique encryption key associated with the relay session.

The invitation service 620 transmits a relay response to the client devices A and B indicating that a relay connection will be made. In one embodiment, the relay response to the client device B can include the relay token and the network information for the relay host 815B. In one embodiment, the response to the client device B can be sent directly (bypassing the push notification service 640) because it is being sent in response to the client device B's invite accept message. The invitation service 620 also transmits a relay response to the client device A, which can include the relay token and the network information for relay host A 815A. In this instance, the response is pushed to client device A via the push notification service 640.

At operation 12B, the client device A 710 uses the network information for relay host 815A to establish a connection with the relay service 650. Similarly, at operation 13B, the client device B 720 uses the network information for relay host 815B to establish a connection with the relay service 650. In each of these transactions, new holes are opened in any NAT firewalls of the client devices A and B and the NAT traversal/connection data for the client devices A and B may be determined by the relay service 650 and returned to client devices A and B, respectively (e.g., by determining the public IP/port for the devices). In one embodiment, the relay service 650 and the client devices A and B implement the Traversal Using Relay NAT ("TURN") protocol, which, as understood by those of skill in the art, allows an element behind a NAT or firewall to receive incoming data over TCP or UDP connections.

At operation 14B, the client device A 710 transmits a relay update to the invitation service 620, which is forwarded to the push notification service and pushed to the client device B 720 at operation 17B. Similarly, at operation 15B, the client device B 720 transmits a relay update to the invitation service 620 which is forwarded to the push notification service 620 and pushed to client device A 610 at operation 16B. The relay update transmitted by the client device A 710 can include the session token, each device's online communication session endpoint identifier, and the NAT traversal/connection data determined by the relay service 650

At operation 18B and 19B the client devices A and B, respectively, establish an online communication session connection through the relay service 650. In one embodiment, the relay connections can be established when client device A 710 sends the NAT traversal/connection data of client device B 720 to the relay service 650, and vice versa, thereby allowing the relay service to determine the correct path to each peer's relay host 815A-B.

Using the techniques described above, the invitation service 620 may be implemented as a stateless service, which is inherently scalable and resilient, even in a large-scale system with a vast number of client devices. For example, because the push notification service 640 is inherently capable of locating and pushing content to registered client devices, the invitation service 620 is not required to track the current location of each device. Additionally, because devices can transmit NAT traversal/connection data with requests and responses, the invitation service 620 is never required to maintain any per-connection state information, thereby reducing the storage and processing requirements of the invitation service. Such an implementation is particularly useful in a large-scale system.

While FIG. 7 describes a user at a client device inviting a single user to an online communication session, embodiments are not so limited. For example, in some embodiments, a user at a client device may invite multiple users to an online communication session. For example, the user may transmit a single invite request message to the invitation service with multiple online communication session endpoint identifiers to invite multiple users at different client devices to participate in an online communication session.

Figure 26:
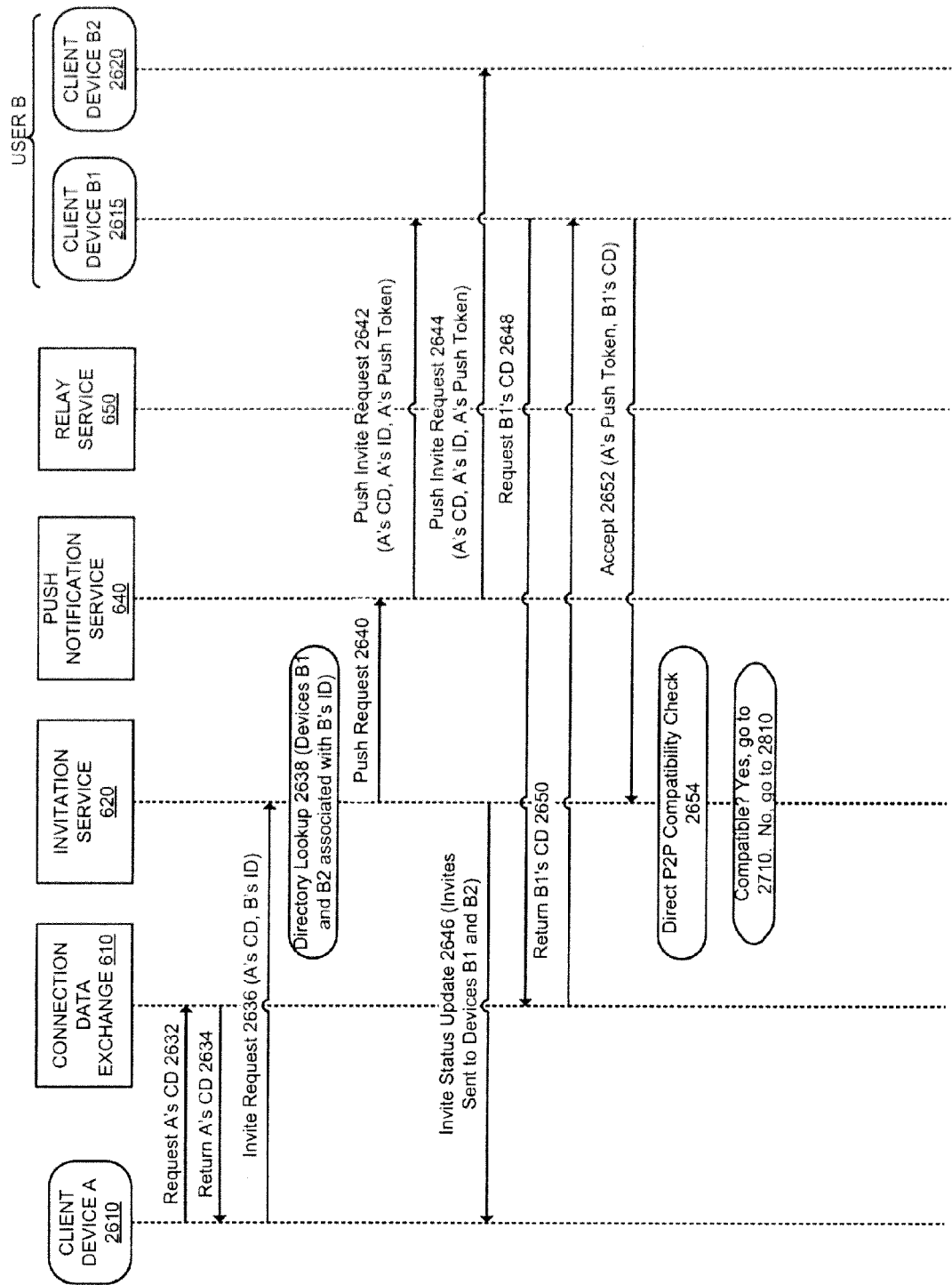
FIG. 26 is a data flow diagram illustrating exemplary operations for managing invitations when a user has multiple client devices that are associated with the same online communication session endpoint identifier according to one embodiment.

In some situations, a user may have multiple client devices that are associated with the same online communication session endpoint identifier. FIG. 26 is a data flow diagram illustrating exemplary operations for managing invitations when a user has multiple client devices that are associated with the same online communication session endpoint identifier.

The client device A (operated by the user A) 2610 transmits a request for its connection data from the connection data exchange 610 at operation 2632. The connection data exchange 610 returns client device A's connection data at operation 2634. The client device then transmits an online communication session invitation request to the invitation service 620 with a user ID B to invite the user B to an online communication session (e.g., a P2P video conference, a P2P instant messaging session, a video call, etc.). The invite request includes A's connection data.

The invitation service performs a directory lookup at operation 2638 based on B's ID included in the invite request message. In this example, the directory lookup operation returns a push token for the client device B1 and a push token for the client device B2. Thus, the client devices B1 and B2 are associated with B's ID. The invitation service 620 then transmits a push request message at operation 2640 to the push notification service 640 to push the invite request messages to the client device B1 2615 and the client device B2 2620. The push notification service 640 transmits an online communication session invite request, in the form of a push notification message, to the client device B1 2615 at operation 2642 and to the client device B2 2620 at operation 2644. Each invite request message includes the connection data of the client device A 2610, the online communication session endpoint identifier used by user A, and the push token of the client device A 2610. The invite requests may also include information specific to the online communication session (e.g., the name of the person sending the invite (e.g., username, real name, phone number, or some combination thereof), what the invite is for (e.g., a P2P video conference, a P2P instant messaging session, etc.), etc.). Thus, an online communication session invite request is sent to each of the devices that are associated with the online communication session endpoint identifier included in the original invitation request.

In one embodiment, the invitation service 620 transmits a status message to the inviting client device to indicate which client device(s) the invite was transmitted to. Thus, at operation 2646, the invitation service 620 transmits an invite status update to the client device A 2610 that indicates that an online communication session invite request was sent to the client device B1 2615 and the client device B2 2620. In one embodiment, the client device A 2610 tracks which client devices accept the invitation and keeps the other client devices apprised of the state of the online communication session.

In one embodiment, the client device B1 2615 and the client device B2 2620 will display an invitation request if they are powered on and capable of receiving the invite request. In the example illustrated in FIG. 26, a user at the client device B1 2615 will be accepting the invitation. Thus at operation 2648 the client device B1 2615 requests its connection data from the connection data exchange 610. The connection data exchange 610 determines the connection data of the client device B1 2615 and at operation 2650 returns it to the client device B1 2615.

The client device B1 2615 then transmits an accept message to the invitation service 620 at operation 2652. The accept message includes the connection data of the client device B1 2615 and the push token of the client device A 2610. The accept message may also contain an indication as to whether it is a retry from a previous failed direct P2P connection attempt between the client device A 2610 and the client device B1 2615. In addition, the accept message can also include the online communication session endpoint identifiers of A and B and the push token for the client device B 2615.

In some embodiments, after receiving an accept message to an online communication session, the invitation service 620 determines whether a direct P2P connection is feasible. Thus, at operation 2654, the invitation service 620 performs a direct P2P compatibility check to determine whether a direct P2P connection between the client device A 2610 and the client device B1 2615 is feasible, in a similar fashion as previously described. If the client devices are compatible for a direct P2P connection, then the operations described in reference to FIG. 27 (beginning at operation 2710) are performed. If the client devices are not compatible for a direct P2P connection, then the operations described in reference to FIG. 28 (beginning at operation 2810) are performed.

Figure 27:
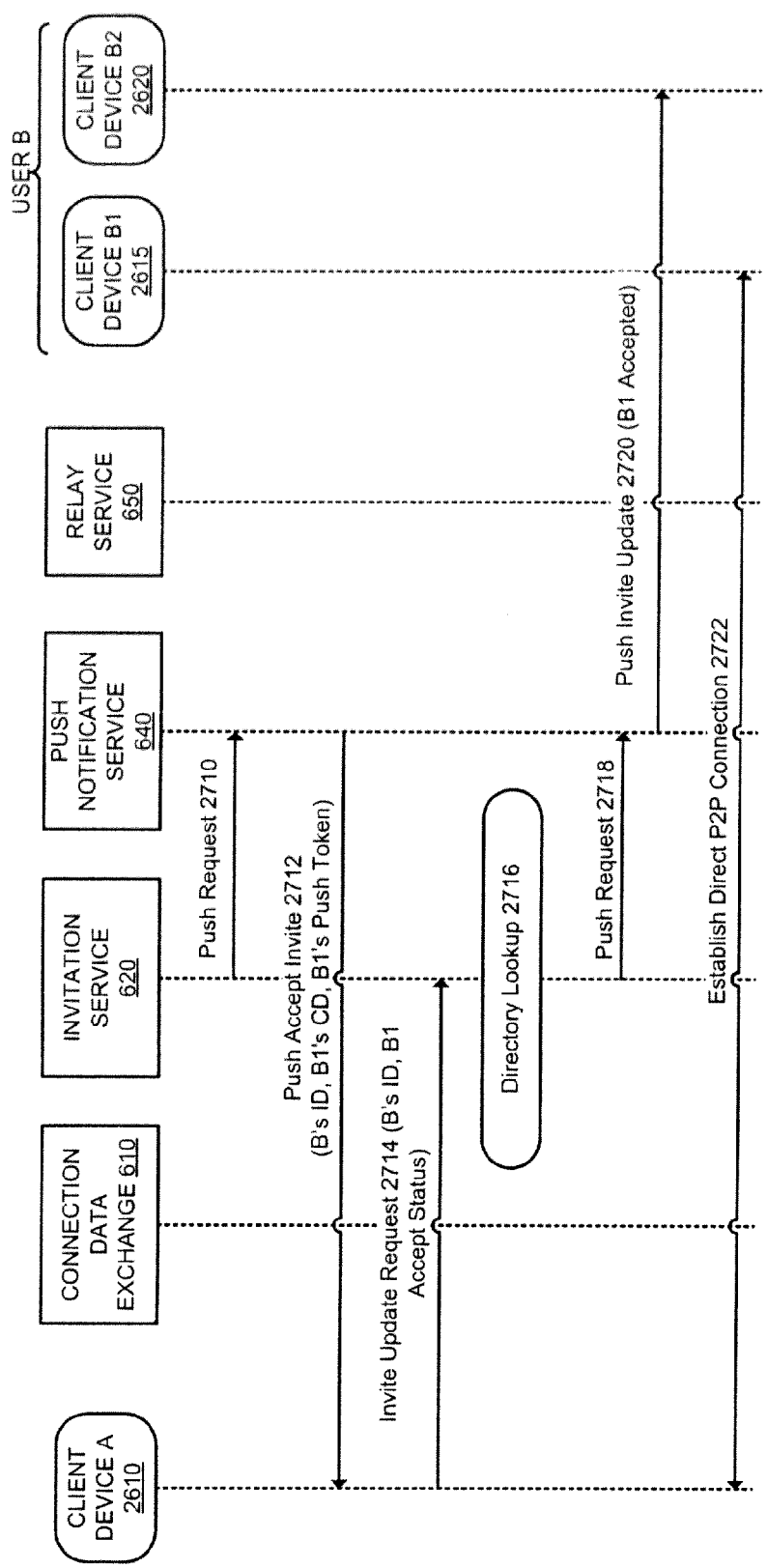
FIG. 27 is a data flow diagram that illustrates exemplary operations that are performed when a direct P2P connection is feasible according to one embodiment.

With reference to FIG. 27, which illustrates operations performed when a direct P2P connection is feasible, at operation 2710 the invitation service 620 transmits a push request to the push notification service 640 to transmit acceptance of the invitation by the client device B1 2615. At operation 2712, the push notification service 640 transmits an online communication session accept message, in the form of a push notification, to the client device A 2610. This accept message includes the connection data and the push token of the client device B1 2615, and the online communication session endpoint identifier used by the user B.

In one embodiment, sometime after receiving the accept message that indicates that the client device B1 2615 has accepted the invite, the client device A 2610 informs the client device B2 2620 that client device A 2620 has accepted the invite. Thus, at operation 2714, the client device A 2610 transmits an invite update request to the invitation service that includes the online communication session endpoint identifier of user B and indicates that the client device B1 2615 has accepted the invite. The invite update request may also instruct or indicate to the invitation service 620 which client device associated with the online communication session endpoint identifier of user B should receive the invite update message (in this example, the client device B2 2620 should receive the invite update message).

The invitation service 620 performs a directory lookup 2716 based on the online communication session endpoint identifier of user B to determine the push token of the client device B2 2620. After determining the push token, the invitation service transmits a push request at operation 2718 to the push notification service 640 to push the invite update message to the client device B2 2620. At operation 2720, the push notification service 640 transmits an invite update message, in the form of a push notification message, to the client device B2 2620. The invite update message indicates that the client device B1 2615 has accepted the online communication session invitation. The client device B2 2620 may display the invite update message and may maintain state of the online communication session between the client device A 2610 and the client device B1 2615 (e.g., the duration of the online communication session, etc.). As will be described in greater detail with reference to FIG. 30, in one embodiment, the client device B2 2620 can transmit a transfer request to cause the online communication session to transfer from the client device B1 2615 to the client device B2 2620.

Sometime after receiving the invite accept message in operation 2712, the client device A 2610 and the client device B1 2615 establish a direct P2P connection using the exchanged connection data at operation 2722. The direct P2P connection may be established through known mechanisms (e.g., using Internet Connectivity Establishment (ICE) or other known P2P connectivity mechanisms). It should be understood that the operation 2722 may be performed prior to or during the operations 2714-2720.

Figure 28:
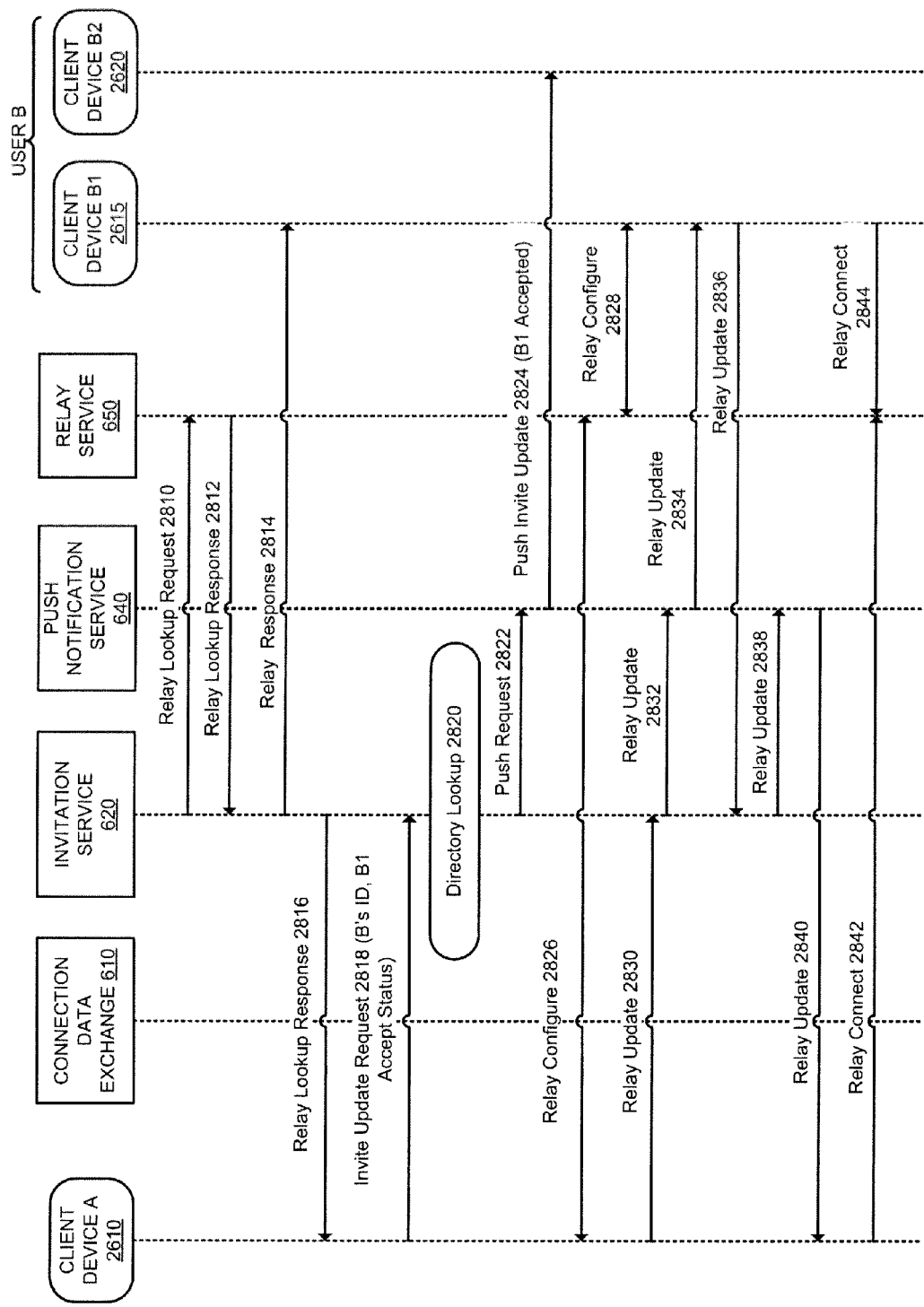
FIG. 28 is a data flow diagram illustrating exemplary operations that are performed when a direct P2P connection is infeasible according to one embodiment.

While FIG. 26 describes an example where only a single client device accepts the invite message, in some situations multiple client devices may accept an invitation to an online communication session directed to a single user. For example, the client device B1 2615 and the client device B2 2620 may accept the invitation in some situations. In one embodiment, the client device A 2610 establishes an online communication session with the first client device it receives an accept message from. The client device A 2610 may cause a cancel message to be sent to the other client device(s) (e.g., the cancel message may be transmitted to the invitation service and then pushed, via the push notification service, to those other client device(s)). Referring back to operation 2654 of FIG. 26, if a direct P2P connection is not feasible between the client device A 2610 and client device B1 2615, then the operations described in FIG. 28 are performed. FIG. 28 is a data flow diagram illustrating exemplary operations that are performed when a direct P2P connection is infeasible. At operation 2810, the invitation service 620 transmits a relay lookup request 2810 to the relay service 650 to determine a relay host to be used by the client device A 2610 and the client device B1 2615. The relay lookup request may contain the networking information for the client devices (e.g., NAT traversal/connection data and/or NAT type data) which is used by the relay service 650 to select appropriate relay hosts for the client devices. As illustrated in FIG. 8, one embodiment of the relay service 650 includes a plurality of relay hosts 815A-B and a relay host database 810 containing network information related to each of the relay hosts. For example, the invitation service 620 transmits a relay lookup request to a relay service 650, which queries the relay host database 810 using the network information for the client devices. Upon receiving the database lookup results, the relay service 650 provides a relay lookup response at operation 1201 identifying the selected relay hosts 815A-B. In one embodiment, the relay lookup response contains a relay token generated by the relay service 650 and the network addresses (IP addresses/ports) of the relay hosts 815A-B to be used by the client devices for the relay connection. In one embodiment, the relay token is associated with the relay session and is used by the relay hosts 815A-B to authenticate the client device A 2610 and the client device B1 2615 upon connecting to the relay service 650. The token may take on various forms including, for example, unique ID relay session ID code, a digital certificate and/or a unique encryption key associated with the relay session.

The invitation service 620 then transmits a relay response to the client device B1 2615 at operation 2814 that contains an indication that a relay connection will be made. In one embodiment, the relay response can include the relay token and the network information for the relay host selected for the client device B1 2615. In one embodiment, the relay response can be sent directly to the client device B1 2615 (bypassing the push notification service 640). The invitation service 620 also transmits a relay response to the client device A 2610 at operation 2816 that includes the relay token and the network information for the relay host selected for the client device A 2610. In some embodiments, the relay response is pushed to mobile device A via the push notification service 640.

At operation 2818, the client device A 2610 then transmits an invite update request to the invitation service 620 that includes the online communication session endpoint identifier of user B and indicates that the client device B1 2615 has accepted the invite. The invite update request may also instruct or indicate to the invitation service 620 which client device associated with the online communication session endpoint identifier of user B should receive the invite update message (in this example, the client device B2 2620 should receive the invite update message).

The invitation service 620 performs a directory lookup 2820 based on the online communication session endpoint identifier of user B to determine the push token of the client device B2 2620. After determining the push token, the invitation service transmits a push request at operation 2822 to the push notification service 640 to push the invite update message to the client device B2 2620. At operation 2824, the push notification service 640 transmits an invite update message, in the form of a push notification message, to the client device B2 2620. The invite update message indicates that the client device B1 2615 has accepted the online communication session invitation. The client device B2 2620 may display the invite update message and may maintain state of the online communication session between the client device A 2610 and the client device B1 2615 (e.g., the duration of the online communication session, etc.). In one embodiment, the client device B2 2620 can transmit a transfer request to cause the online communication session to transfer from the client device B1 2615 to the client device B2 2620.

At operation 2826, the client device A 2610 uses the network information for its selected relay host to establish a connection with the relay service 650. Similarly, at operation 2828, the client device B1 2620 uses the network information for its selected relay host to establish a connection with the relay service 650. In each of these operations, new holes can be opened in any NAT firewalls of the client devices and the NAT traversal/connection data for the client devices may be determined by the relay service 650 and returned to them (e.g., by determining the public IP/port of the client devices). In one embodiment, the relay service 650 and the client device A 2610 and the client device B1 2615 implement the Traversal Using Relay NAT ("TURN") protocol which, as understood by those of skill in the art, allows an element behind a NAT or firewall to receive incoming data over TCP or UDP connections.

At operation 2830, the client device A 2610 transmits a relay update to the invitation service 620 which is forwarded to the push notification service at operation 2832 and pushed to the client device B1 2615 at operation 2834. Similarly, at operation 2836 the client device B1 2615 transmits a relay update to the invitation service 620 which is forwarded to the push notification service 640 at operation 2838 and pushed to the client device A 2610 at operation 2840. The relay update message transmitted by the client device A 2610 can include the relay token, each online communication session identifier, and the NAT traversal/connection data determined by the relay service 650 at operations 2826 and 2828. In one embodiment, the relay update operations are performed since one or more of the client device's NAT information may have changed. Finally, at operations 2842 and 2844, the client device A 2610 and the client device B1 2620 respectively establish a P2P connection through the relay service 650. In one embodiment, the relay connections can be established responsive to the client device A 2610 transmitting the NAT traversal/connection data of the client device B1 2615 to the relay service 650, and vice versa, thereby allowing the relay service 650 to determine the correct path to each peer's relay host.

Figure 29:
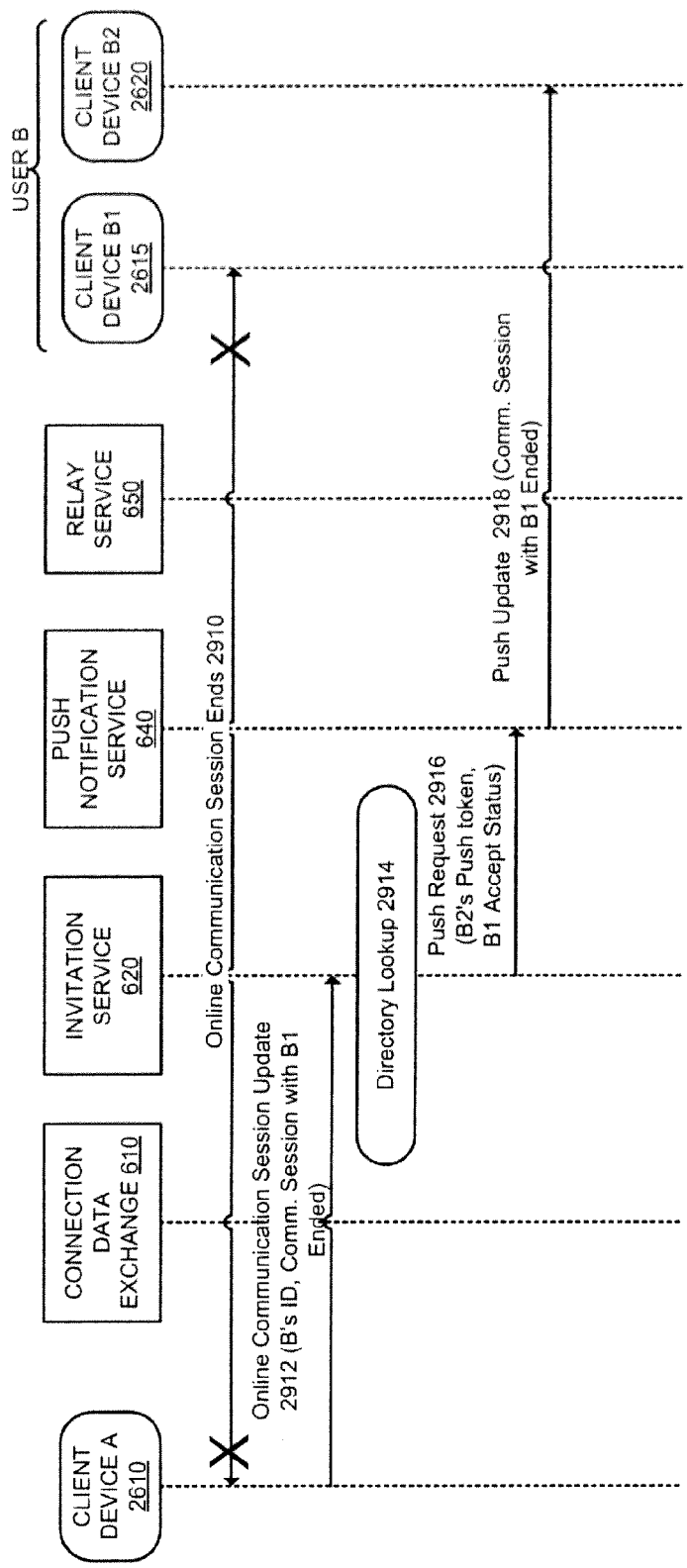
FIG. 29 is a data flow diagram that illustrates exemplary operations performed when an online communication session ends according to one embodiment.

FIG. 29 is a data flow diagram that illustrates exemplary operations performed when an online communication session ends according to one embodiment. At operation 2910, the online communication session between the client device A 2610 and the client device B1 2615 has ended. For example, either the client device A 2610 or the client device B1 2615 has terminated the online communication session (or the online communication session otherwise has been terminated). The online communication session may have been through a direct P2P connection or through a relay.

Sometime after the online communication session has ended, at operation 2912, the client device A 2610 transmits an online communication session update request to the invitation service 620. The online communication session update is sent to notify the client device B2 2620, which was not part of the online communication session, of the termination of the online communication session. The online communication session update request may include user B's online communication session identifier and may instruct or indicate to the invitation service 620 which client device associated with user B (e.g., the client device B2 2620) is to receive the update.

The invitation service 620 performs a directory lookup operation 2914 based on the online communication session endpoint identifier of user B to determine the push token of the client device B2 2620. After determining the push token, the invitation service transmits a push request at operation 2916 to the push notification service 640 to push the update message to the client device B2 2620. At operation 2720, the push notification service 640 transmits an online communication session update message, in the form of a push notification message, to the client device B2 2620. The online communication session update message indicates that the online communication session between the client device A 2910 and the client device B1 2615 has ended.

Figure 30:
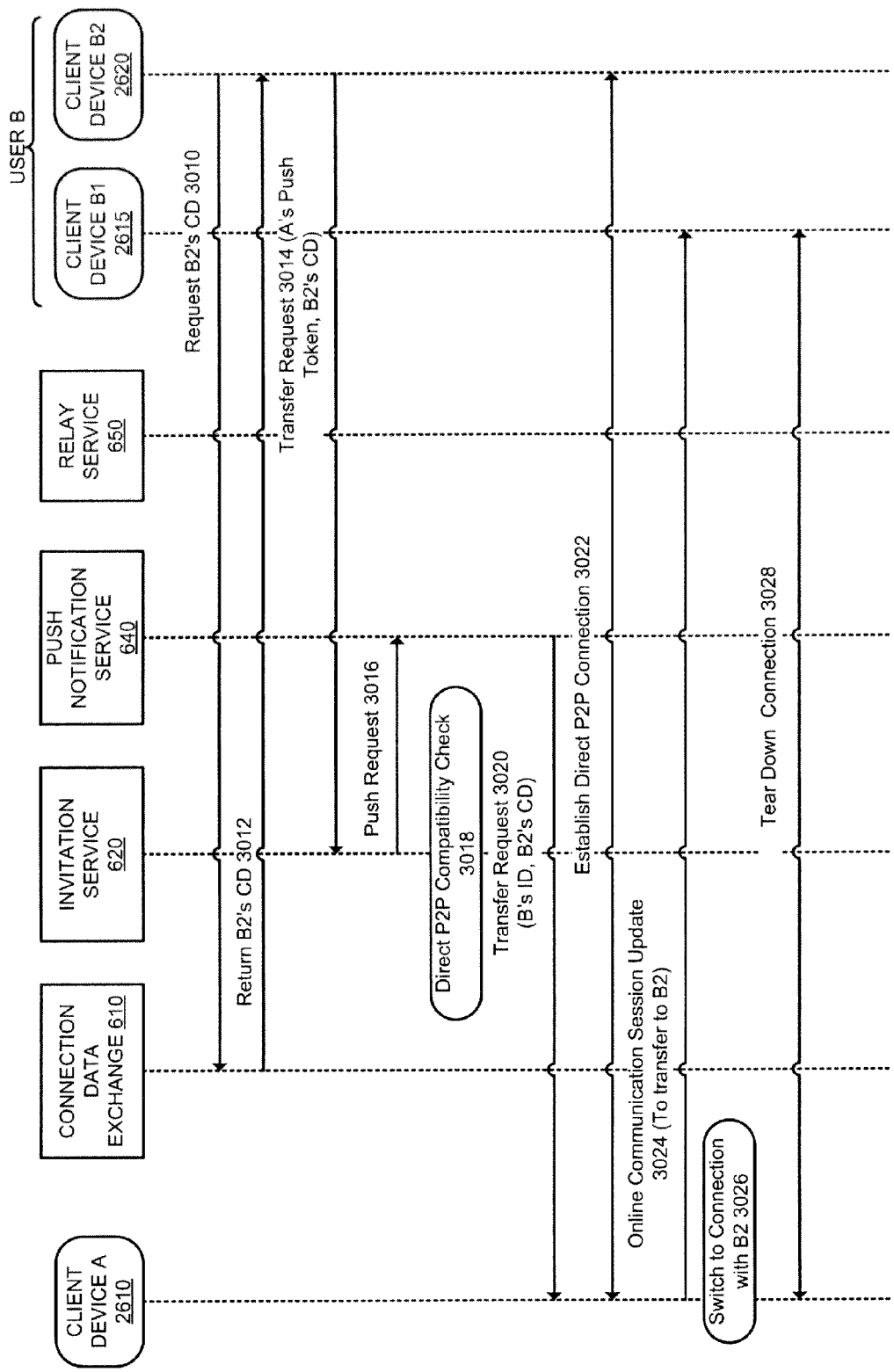
FIG. 30 is a flow diagram illustrating exemplary operations performed to transfer an online communication session from one client device to another client device according to one embodiment.

FIG. 30 is a flow diagram illustrating exemplary operations performed to transfer an online communication session from one client device to another client device according to one embodiment. In the example illustrated in FIG. 30, it is assumed that each of the client devices B1 2615 and B2 2620 received an invitation to an online communication session originated by client device A 2610 (they each share the online communication session endpoint identifier that was used in the invitation) and the client device B1 2615 accepted and established an online communication session with the client device A 2610 (as described in FIGS. 26 and 27 or 28). In addition, the client device B2 2620 has received an invite update that indicates that the client device B1 2615 has accepted the invitation. In the example illustrated in FIG. 30, the online communication session will be transferred from the client device B1 2615 to the client device B2 2620. For example, a user at the client device B2 2620 has indicated that it wants to take over the online communications session between the client devices A 2610 and the client device B1 2620. In one embodiment, the online communication session application 2115 displays a state of the online communication session between the client device A 2610 and the client device B1 2615 that allows a user at the client device B2 2620 to issue a transfer online communication session request (e.g., through a click or press of a link or virtual button available on the online communication session application 2115 of the client device B1 2615).

At operation 3010, the client device B2 2620 requests its connection data from the connection data exchange 610 and receives the requested connection data at operation 3012 (if it does not already know its connection data). The client device B2 2620 then transmits a transfer request message at operation 3014 to the invitation service 620 that includes the push token of the client device A 2610 and the connection data of the client device B2 2620. The transfer request message may also include the online communication session endpoint identifiers of A and/or B and/or the push token for the client device A 2610.

The invitation service 620 then transmits a push request to the push notification service 640 at operation 3016 to cause the push notification service 640 to transmit the transfer message, in the form of a push notification, to the client device A 2610. The invitation service 620 also performs a direct P2P compatibility check at operation 3018 to determine whether a direct P2P connection between the client device A 2610 and the client device B2 2620 is feasible. For purposes of this example a direct connection is feasible, however it should be understood that an online communication session transfer may also occur in a relay situation.

At operation 3020, the push notification service transmits the transfer request message to the client device A 2610. The transfer request message may include B's online communication session endpoint identifier and the connection data for the client device B2 2620. The transfer request message also indicates which device (i.e., the client device B2 2620) that is requesting the online communication session transfer (e.g., through a device ID and/or push token of the client device B2 2620). The transfer request message may cause the online communication session application 2115 of the client device A 2610 to display the transfer request, and may allow the user to accept or deny the transfer request. Assuming that the transfer request is accepted, the client device A 2610 establishes a direct P2P connection with the client device B 2620 using the exchanged connection data at operation 3022. It should be understood that at this point the online communication session between the client device A 2610 and the client device B1 2615 is active. The client device A 2610 then transmits an online communication session update to the client device B1 2615 that indicates that the online communication session will transfer to the client device B2 2620. In one embodiment, this update message is transmitted on the existing online communication session between the client devices. The client device A 2610 then switches to the online communication session with the client device B2 2620 at operation 3026 and tears down the online communication session with the client device B1 2615 at operation 3028.

Figure 31:
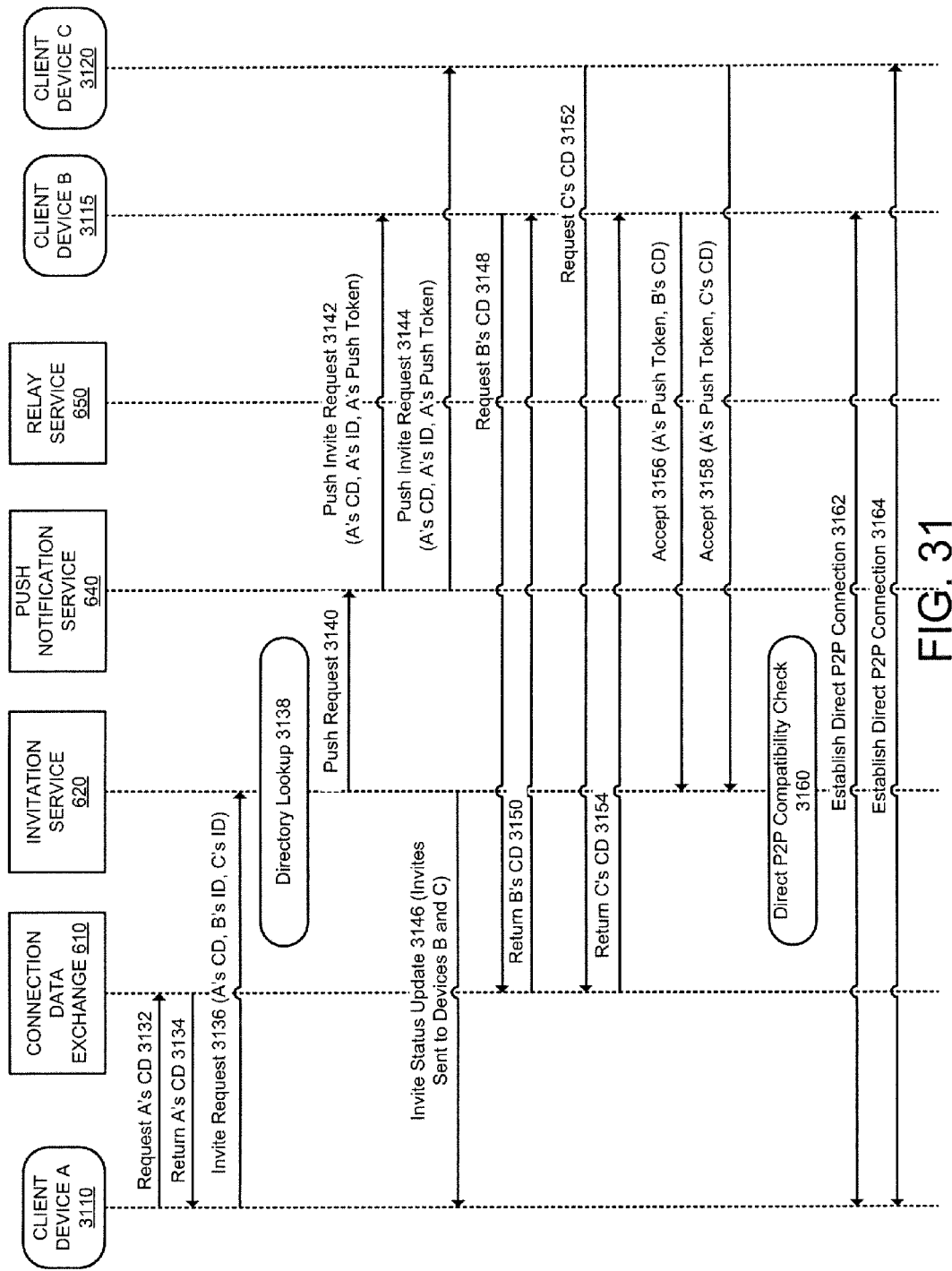
FIG. 31 is a flow diagram illustrating exemplary operations for initiating and establishing an online communication session with multiple users according to one embodiment.

While embodiments have been described with reference to inviting a single user to an online communication session (which may or may not be associated with multiple client device), in some embodiments multiple users may be invited to an online communication session. FIG. 31 is a flow diagram illustrating exemplary operations for initiating and establishing an online communication session with multiple users.

The client device 3110 requests its connection data from the connection data exchange 610 at operation 3132 and the requested connection data is returned at operation 3134. At operation 3136, the client device A 3110 transmits an invitation request to the invitation service 620 that includes the connection data of the client device A 3110, an online communication session endpoint identifier associated with user B and an online communication session endpoint identifier associated with user C. Thus, a user at the client device A 3110 is inviting multiple users to an online communication session.

The invitation service 620 performs a directory lookup operation 3138 to determine the push tokens associated with user B's online communication session endpoint identifier and user C's online communication session endpoint identifier. In this example and for purposes of simplicity, the directory lookup returns a result of the client device B 3115 being associated with user B's online communication session endpoint identifier and the client device C 3120 being associated with user C's online communication session endpoint identifier. The invitation service 620 then transmits a push request 3140 to the push notification service 640 to request that the push notification service 640 transmit the invitations, in the form of push messages, to the client devices B and C. The push notification service 640 then transmits the invite request to the client device B 3115 at operation 3142 and transmits the invite request to the client device C 3120 at operation 3144. Each invite request message includes the connection data of the client device A 3110, the online communication session endpoint identifier used by user A, and the push token of the client device A 3110.

In one embodiment, the invitation service 620 transmits a status message to the inviting client device to indicate which client device(s) the invite was transmitted to. Thus, at operation 3146, the invitation service 620 transmits an invite status update to the client device A 3110 that indicates that an online communication session invite request was sent to the client device B 3115 and the client device C 3120. In one embodiment, the client device B 3115 and the client device C 3120 will display an invitation request if they are powered on and capable of receiving the invite request.

In the example illustrated in FIG. 31, each of the invitations will be accepted. Thus at operation 3148 the client device B 3115 requests its connection data from the connection data exchange 610. The connection data exchange 610 determines the connection data of the client device B 3115 and at operation 3150 returns it to the client device B 3115. Similarly, the client device C 3120 requests its connection data from the connection data exchange 610 at operation 3152. The connection data exchange 610 determines the connection data of the client device C 3120 and at operation 3154 returns it to the client device C 3120. The client device B 3115 then transmits an accept message to the invitation service 620 at operation 3156, and the client device C 3120 transmits an accept message to the invitation service 620 at operation 3158. The invitation service 620 then performs a direct P2P compatibility check 3160 to determine whether a direct P2P connection is feasible between the client device A 3110 and the client device B 3115, and between the client device A 3110 and the client device C 3120. For purposes of this example, a direct P2P connection is feasible between the client devices. Thus, using the exchanged connection data, the client device A 3110 and the client device B 3115 establish a direct P2P connection for the online communication session at operation 3162, and the client device A 3110 and the client device B 3120 establish a direct P2P connection for the online communication session at operation 3164. In this example, the client device A 3110 essentially acts as the host of the online communication session. Thus, data being transmitted between the client device B 3115 and the client device C 3120 is relayed by the client device A 3110. In other embodiments, a full mesh of connections is established between the parties. In such an embodiment, another P2P connection would be established between the client device B 3115 and the client device C 3120.

While embodiments described herein describe a mechanism to register client devices for online communication sessions, in some embodiments the registration 140 may implement an API to allow different applications to register online communication session endpoint identifier and push tokens. The API implemented in one embodiment, is an interface implemented by a software component (hereinafter "API implementing software component") that allows a different software component (hereinafter "API calling software component") to access and use one or more functions, methods, procedures, data structures, and/or other services provided by the API implementing software component. For example, an API allows a developer of an API calling software component (which may be a third party developer) to leverage specified features provided by an API implementing software component. There may be one API calling software component or there may be more than one such software component. An API can be a source code interface that a computer system or program library provides in order to support requests for services from a software application. An API can be specified in terms of a programming language that can be interpretative or compiled when an application is built, rather than an explicit low level description of how data is laid out in memory.

The API defines the language and parameters that API calling software components use when accessing and using specified features of the API implementing software component. For example, an API calling software component accesses the specified features of the API implementing software component through one or more API calls (sometimes referred to as function or method calls) exposed by the API. The API implementing software component may return a value through the API in response to an API call from an API calling software component. While the API defines the syntax and result of an API call (e.g., how to invoke the API call and what the API call does), the API typically does not reveal how the API call accomplishes the function specified by the API call. Various function calls or messages are transferred via the one or more application programming interfaces between the calling software (API calling software component) and an API implementing software component. Transferring the function calls or messages may include issuing, initiating, invoking, calling, receiving, returning, or responding to the function calls or messages. Hence, an API calling software component can transfer a call and an API implementing software component can transfer a call.

By way of example, the API implementing software component and the API calling software component may be an operating system, a library, a device driver, an API, an application program, or other software module (it should be understood that the API implementing software component and the API calling software component may be the same or different type of software module from each other). The API calling software component may be a local software component (i.e., on the same data processing system as the API implementing software component) or a remote software component (i.e., on a different data processing system as the API implementing software component) that communicates with the API implementing software component through the API over a network. It should be understood that an API implementing software component may also act as an API calling software component (i.e., it may make API calls to an API exposed by a different API implementing software component) and an API calling software component may also act as an API implementing software component by implementing an API that is exposed to a different API calling software component.

The API may allow multiple API calling software components written in different programming languages to communicate with the API implementing software component (thus the API may include features for translating calls and returns between the API implementing software component and the API calling software component); however the API may be implemented in terms of a specific programming language.

Figure 9:
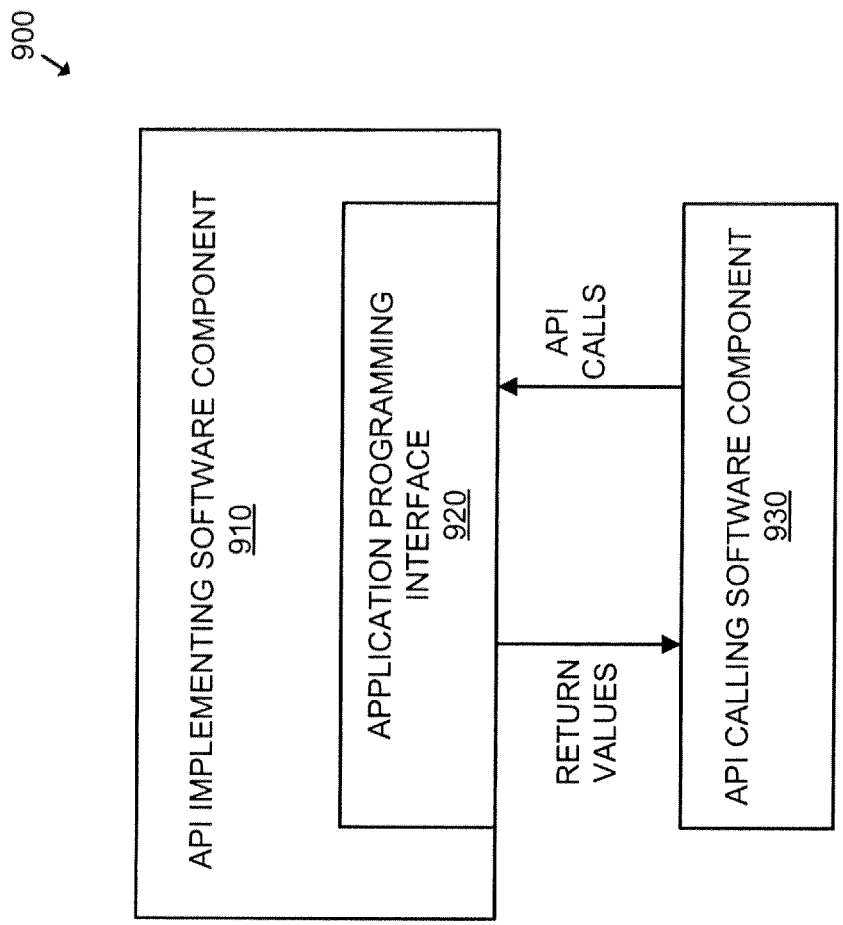
FIG. 9 illustrates one embodiment of an API architecture according to one embodiment.

FIG. 9 illustrates one embodiment of an API architecture which includes an API implementing software component 910 (e.g., an operating system, a library, a device driver, an API, an application program, or other software module) that implements the API 920. The API 920 specifies one or more functions, methods, classes, objects, protocols, data structures, formats and/or other features of the API implementing software component that may be used by the API calling software component 930. The API 920 can specify at least one calling convention that specifies how a function in the API implementing software component receives parameters from the API calling software component and how the function returns a result to the API calling software component. The API calling software component 930 (e.g., an operating system, a library, a device driver, an API, an application program, or other software module), makes API calls through the API 920 to access and use the features of the API implementing software component 910 that are specified by the API 920. The API implementing software component 910 may return a value through the API 920 to the API calling software component 930 in response to an API call.

It will be appreciated that the API implementing software component 910 may include additional functions, methods, classes, data structures, and/or other features that are not specified through the API 920 and are not available to the API calling software component 930. It should be understood that the API calling software component 930 may be on the same system as the API implementing software component 910 or may be located remotely and accesses the API implementing software component 910 using the API 920 over a network. While FIG. 9 illustrates a single API calling software component 930 interacting with the API 920, it should be understood that other API calling software components, which may be written in different languages (or the same language) than the API calling software component 930, may use the API 920.

The API implementing software component 910, the API 920, and the API calling software component 930 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Transitioning Between Circuit Switched Calls and Video Calls

In some embodiments, a client device can transition from an established audio only circuit switched call to a video call without significantly interrupting communication between the parties. For example, one party of an established audio only circuit switched call selects to transition to a video call (which includes video frames and audio), which causes a video call initiation message (a form of an online communication session invitation message) to be sent to the other participant(s) of the call. If the other participant(s) accept the video call invitation, a P2P connection will be established between the participant's client devices. While the P2P connection is being negotiated, the participants are able to communicate through the audio only circuit switched call. After the P2P connection is established and video is communicated between the parties, the client devices transition to the video call. The audio only circuit switched call is then dropped, and the participants are able to communicate through the video call.

Figure 12:
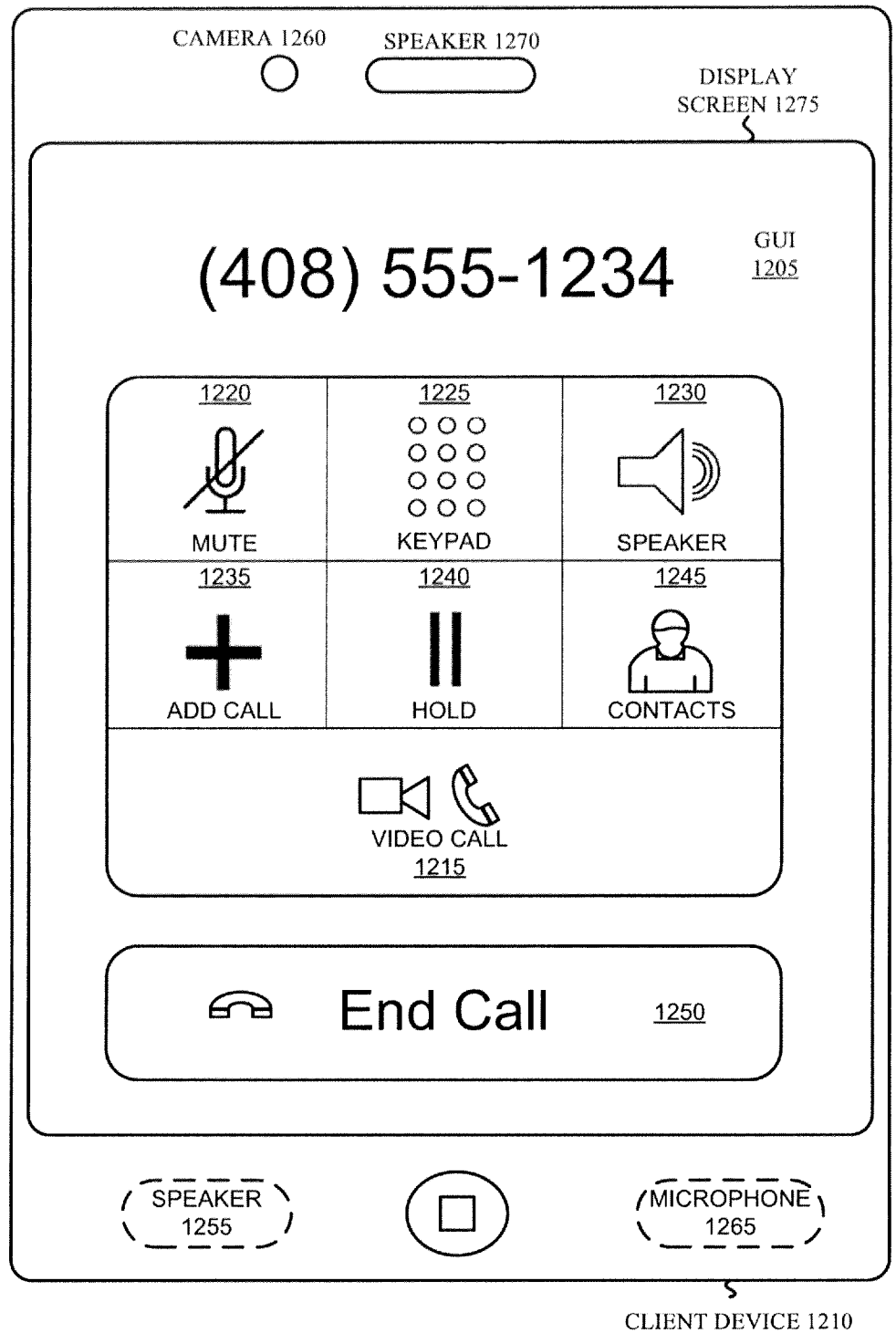
FIG. 12 illustrates an exemplary client device and a graphical user interface that is used to transition between circuit switched calls and video calls in accordance with some embodiments.

FIG. 12 illustrates an exemplary client device 1210 and a graphical user interface that is used to transition between circuit switched calls and video calls in accordance with some embodiments. The client device 1210 includes the speaker 1255 (which is used during speakerphone mode), front facing camera 1260 (which captures video used for the video call), microphone 1265 (which captures sound), the receiver/speaker 1270 (which is typically used when a user holds the client device 1210 to their ear during a call), and the display screen 1275 (which is a touch screen in some embodiments). The client device 1210 may also include a headphone/headset jack, a proximity sensor, an ambient light sensor, accelerometer(s), and other components. It should be understood that the architecture of the client device 1210 is exemplary and different architectures that include more or less components may be used in embodiments.

As illustrated in FIG. 12, the graphical user interface 1205 is currently being displayed on the display screen 1275. The user of the client device 1210 is currently participating in an audio only phone call (with the phone number (408) 555-1234). The graphical user interface 1205 includes several different options for the user during the call. For example, the client device 1210 performs the following responsive to receiving user input (e.g., tapping or other predefined gestures on the appropriate icon): ends the call when input is applied to the end call icon 1250, mutes the audio call responsive to input being applied to the mute icon 1220, displays a numeric keypad (e.g., to add additional phone numbers to the call) responsive to input being applied to the keypad icon 1225, places the call on speakerphone responsive to input being applied to the speaker icon 1230 (which changes the audio output to the speaker 1255), adds a call responsive to input being applied to the add call icon 1235, places the call on hold responsive to input being applied to the hold icon 1240, displays the user's contact list responsive to input being applied to the contacts icon 1245, and transitions to a video call responsive to input being applied to the video call icon 1215.

Figure 17:
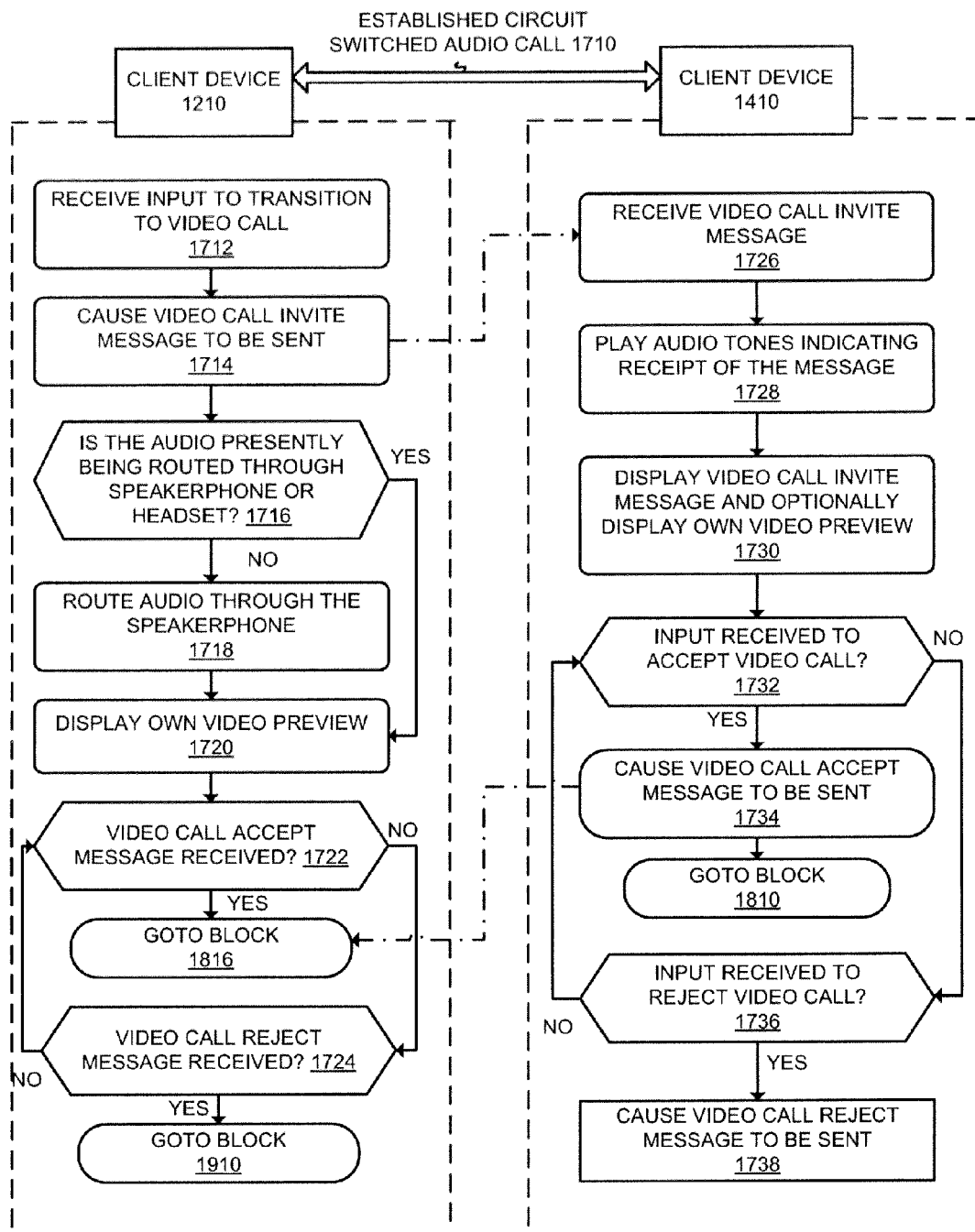
FIGS. 17 and 18 are flow diagrams that illustrate exemplary operations for transitioning between an audio only circuit switched phone call to a video call according to one embodiment.
Figure 18:
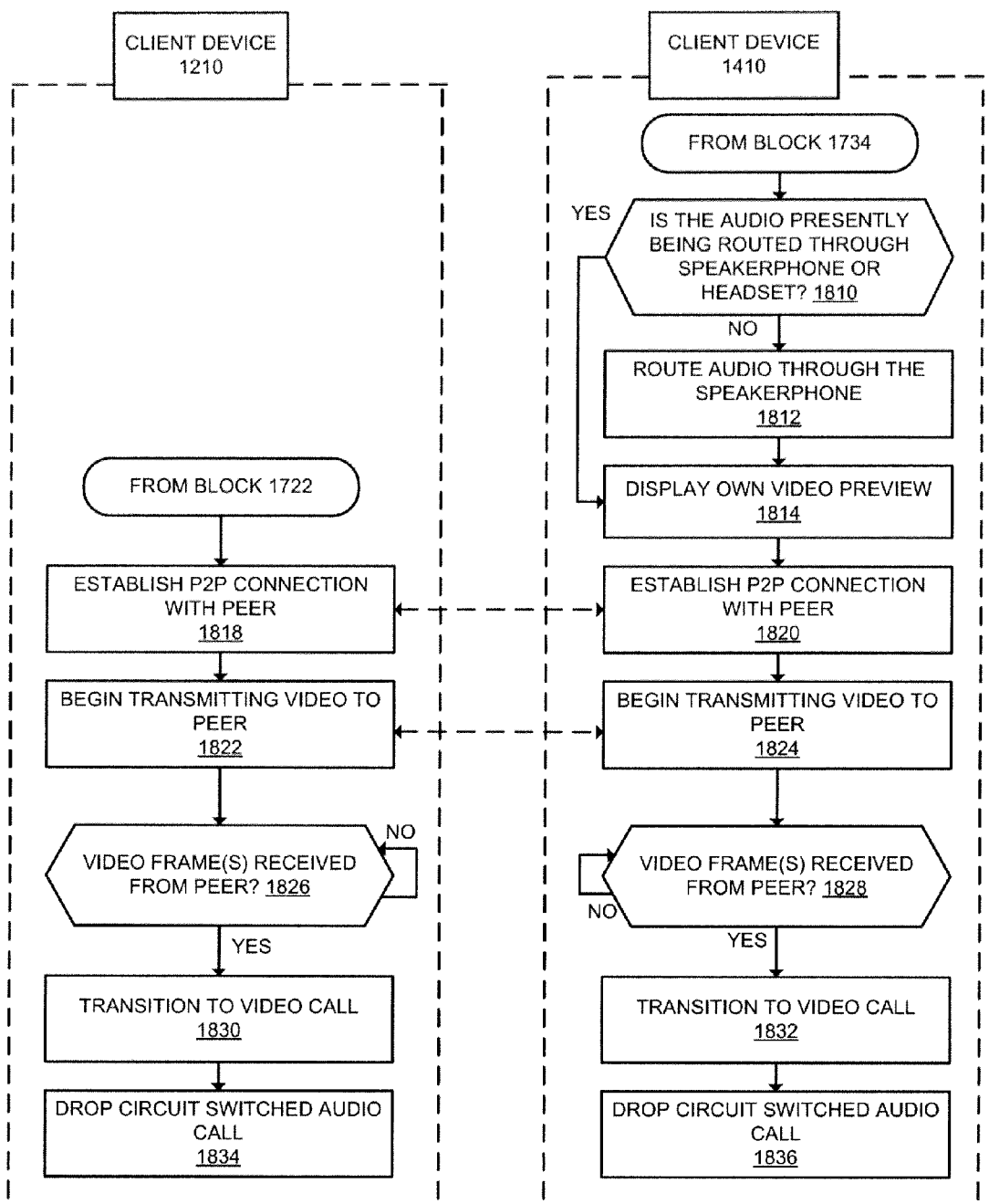

FIGS. 17-18 are flow diagrams that illustrate exemplary operations for transitioning between an audio only circuit switched call to a video call according to one embodiment. FIGS. 17-18 will be described with reference to the exemplary embodiments of FIGS. 12, 13, and 14. However, it should be understood that the operations of FIGS. 17-18 can be performed by embodiments of the invention other than those discussed with reference to FIGS. 12, 13, and 14, and the embodiments discussed with reference to FIGS. 12, 13, and 14 can perform operations different than those discussed with reference to the FIGS. 17-18.

As illustrated in FIG. 17, the client devices 1210 and 1410 are connected through an audio only circuit switched call 1710 (either the user of the client device 1210 or the user of the client device 1410 initiated the call). Thus, the users of the client device 1210 and 1410 can communicate over the established circuit switched audio call. At block 1712, the client device 1210 receives input to transition to a video call. For example, the user has selected to transition to a video call by tapping or performing another defined gesture on the video call icon 1215.

Flow then moves to block 1714, where the client device 1210 causes a video call invite message (which is a form of an online communication session invitation request message) to be sent to the client device 1410 (as identified by the phone number of the client device 1410). In some embodiments, the online communication session invitation request message is sent using the architecture described in FIGS. 6 and 7. Flow then moves to block 1716.

At block 1716, the client device 1210 determines whether the audio is presently being routed through the speakerphone (e.g., the speaker 1255) or through the headphone/headset jack. If it is, then flow moves to block 1720. If it is not, then flow moves to block 1718 where client device 1210 routes the audio through the speakerphone of the client device 1210 (e.g., the speaker 1255) and flow moves to block 1720.

Figure 13:
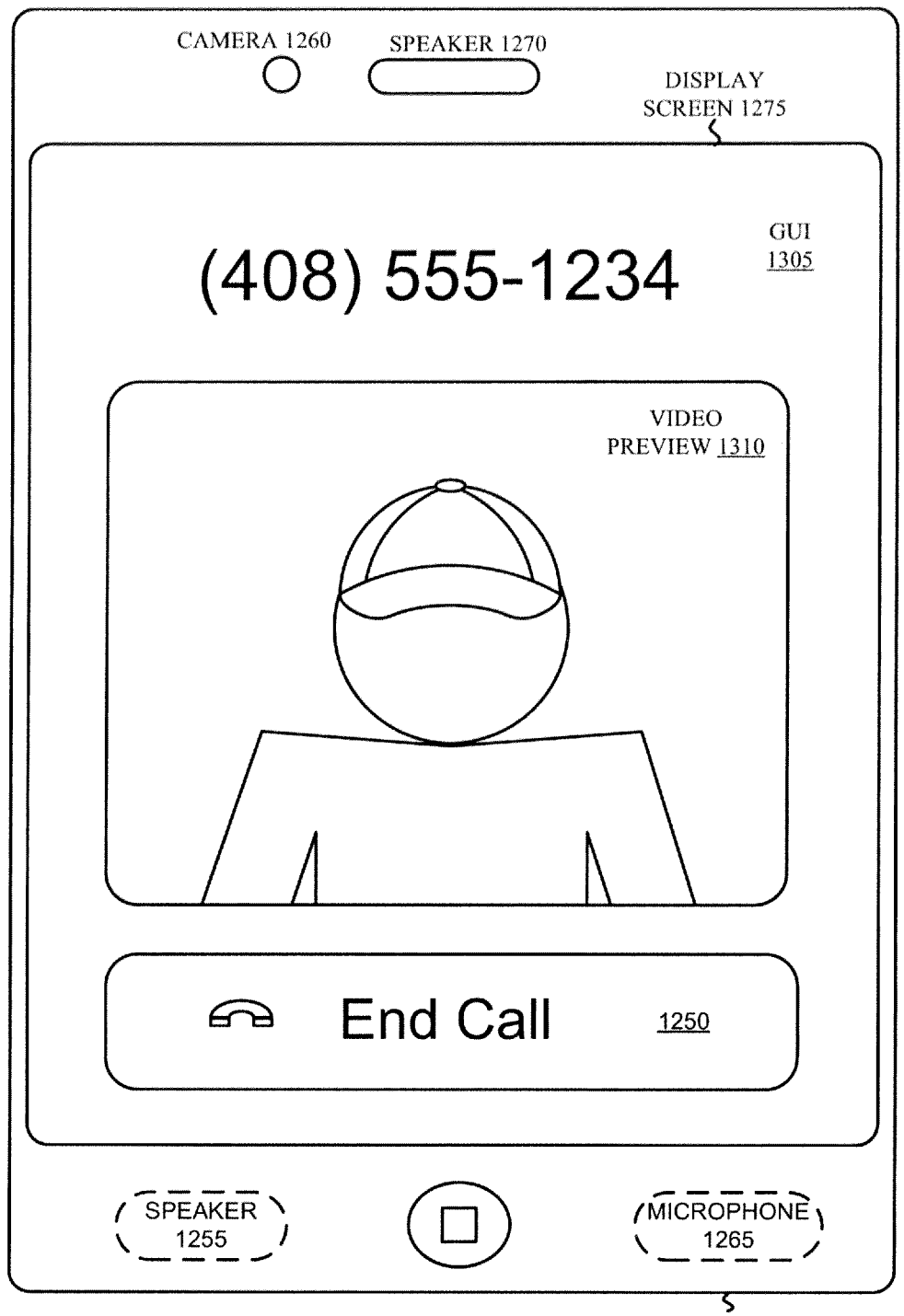
FIG. 13 illustrates the client device of FIG. 12 displaying a video preview according to one embodiment.

At block 1720, the client device 1210 displays a video preview of what the front facing camera 1260 is currently capturing to allow the user of the client device 1210 to prepare for the video call (e.g., to properly position the client device 1210 for the video call). FIG. 13 illustrates the client device 1210 displaying the video preview 1310 that displays video of what the front facing camera 1260 is currently capturing. Although not illustrated in FIG. 13, in some embodiments a cancel button is also displayed on the GUI 1305 that allows the user to cancel the video call invitation. Flow moves from block 1720 to block 1722.

Figure 14:
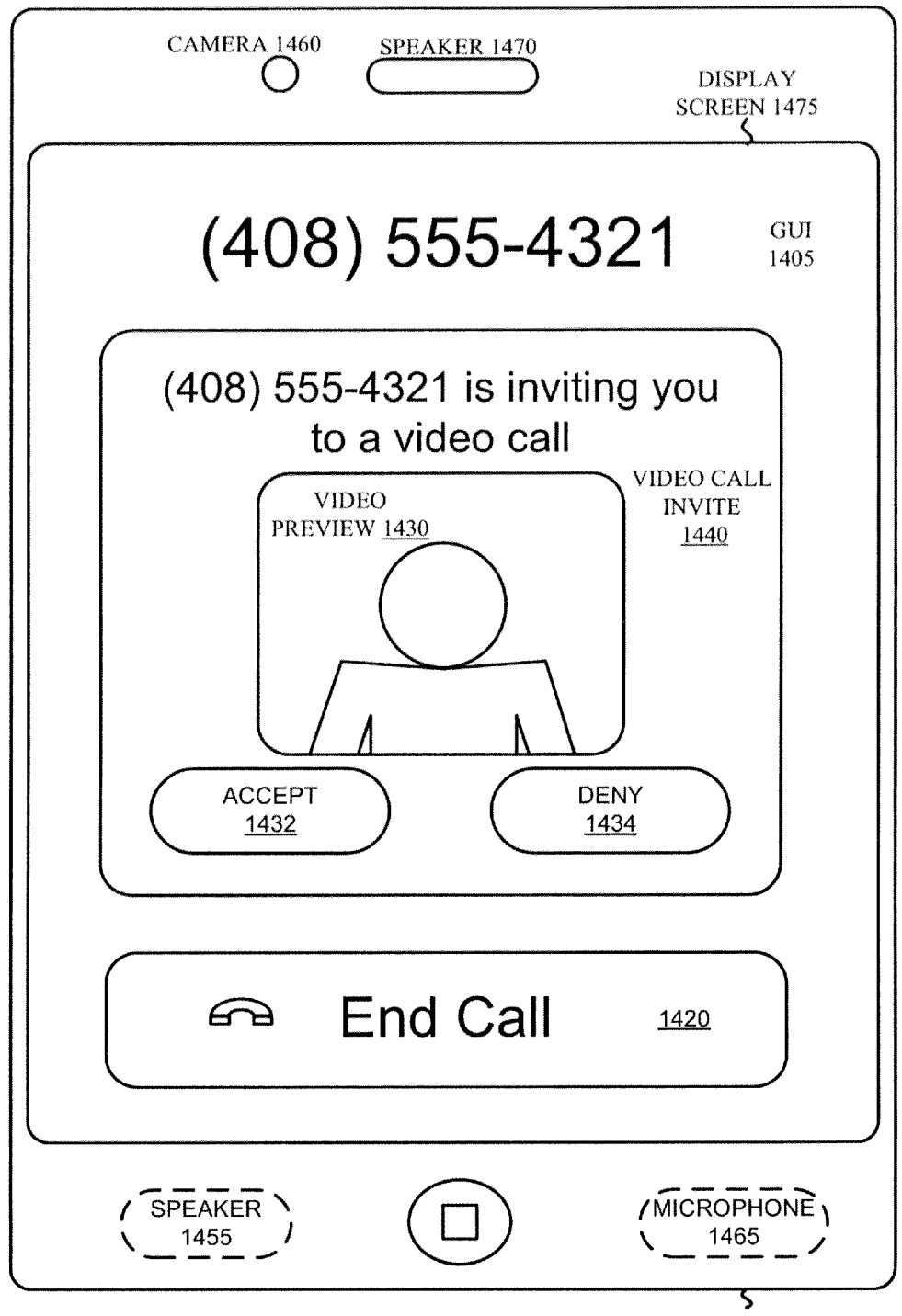
FIG. 14 illustrates an exemplary client device and graphical user interface that is used to accept or deny video call invitations according to one embodiment.

At block 1726, the client device 1410 receives a video call invite message inviting the user of the client device 1410 to a video call. Flow moves from block 1726 to block 1728. In some embodiments, the client device 1410 has an architecture that is similar to the client device 1210. For example, as illustrated in FIG. 14, the client device 1410 includes the speaker 1455 (which is used during speakerphone mode), front facing camera 1460 (which captures video used for the video call), microphone 1465 (which captures sound), the receiver/speaker 1470 (which is typically used when a user holds the client device 1210 to their ear during a call), and the display screen 1475 (which is a touch screen in some embodiments). The client device 1410 may also include a headphone/headset jack, a proximity sensor, an ambient light sensor, accelerometer(s), and other components. It should be understood that the architecture of the client device 1410 is exemplary and different architectures that include more or less components may be used in embodiments.

At block 1728, the client device 1410 plays one or more audio tones indicating receipt of the message to alert the user of the message. The audio tones may be different in different embodiments (e.g., the audio tones may be similar to call waiting tones used on the client device 1410 (although they are not originated by the carrier associated with the client device 1410), the audio tones may be unique and specific for video calls, etc.). In some embodiments, the client device 1410 does not play audio tones indicating receipt of the video call invite message if the client device 1410 is not near the user's ear (e.g., as indicated by a proximity sensor of the client device 1410) and/or if the call is currently on speakerphone mode. Flow moves from block 1728 to block 1730.

At block 1730, the client device 1410 displays the video call invite message and optionally displays a video preview of what the front facing camera 1460 is currently capturing to allow the user of the client device 1410 to prepare for the video call, and flow moves to block 1732. FIG. 14 illustrates the GUI 1405 that displays the video call invite 1440. As illustrated in FIG. 14, the video call invite 1440 includes an accept button 1432, a deny button 1434, and the video preview 1430 (which shows what the front facing camera 1460 is currently capturing). Although FIG. 1410 illustrates the video call invite 1440 including the video preview 1430 (that is, the video preview 1430 is contained within the video call invite 1440), in other embodiments the video preview 1430 is located outside and/or is overlapping the video call invite 1440. The user of the client device 1410 may select the accept button 1432 to accept the video call invite (e.g., by tapping or performing another predefined gesture for input on the accept button 1432) and can select the deny button 1434 to deny the video call invite (e.g., by tapping or performing another predefined gesture for input on the deny button 1434).

At block 1732, the client device 1410 determines whether input has been received to accept the video call (e.g., whether the user has accepted the video call invite by selecting the accept button 1432). If the client device 1410 receives input to accept the video call, then flow moves to block 1734, otherwise flow moves to block 1736. At block 1734 the client device 1410 causes a video call accept message to be transmitted to the client device 1210. In some embodiments, the accept message is transmitted to the client device 1210 using the architecture described in FIGS. 6 and 7. Flow then moves to block 1810.

At block 1736, it is determined whether input has been received to reject the video call request (e.g., whether the user has rejected the video call invite by selecting the deny button 1434). If the client device 1410 receives input to deny the video call invitation, then flow moves to block 1738, otherwise flow moves back to block 1732. At block 1738, the client device 1410 causes a video call deny message to be transmitted to the client device 1210. The client device 1410 may also clear the video call invite 1440 and stop displaying the video preview 1430. In some embodiments, the video call deny message is transmitted to the client device 1210 using the architecture described in FIGS. 6 and 7.

At block 1722, the client device 1210 determines whether it has received a video call accept message from the client device 1410. If it has, then flow moves to block 1816, otherwise flow moves to block 1724 where the client device 1210 determines whether it has received a video call deny message from the client device 1410. If it has, then flow moves to block 1910, otherwise flow moves back to block 1722.

With reference to FIG. 18, at block 1810 (the user at the client device 1410 has accepted the video call invitation), the client device 1410 determines whether audio is presently being routed through the speakerphone (e.g., the speaker 1470) or the headset of the client device 1410. If it is not, then flow moves to block 1812 where the audio route is changed from the speaker 1455 to the speakerphone (e.g., the speaker 1470), and flow moves to block 1814. If the audio is already being routed through the speakerphone or a headset, then flow moves to block 1814.

At block 1814, the client device 1410 displays a video preview of what the front facing camera 1460 is currently capturing. The operation in block 1814 is performed only if the video preview is not currently being displayed as a result of the operation in block 1730. Flow moves from block 1814 to block 1820.

At blocks 1818 and 1820, the client devices 1210 and 1410 establish a P2P connection with each other. The P2P connection may be established through known mechanisms (e.g., using Internet Connectivity Establishment (ICE) or other known P2P connectivity mechanisms). Assuming that the P2P connection is successfully established, flow moves from blocks 1818 and 1820 to blocks 1822 and 1824 respectively, where the client devices 1210 and 1410 begin transmitting video to each other over the P2P connection (the video from the front facing video cameras 1260 and 1460). In some embodiments, the video includes both video frames and corresponding audio (captured by the microphones 1265 and 1465 of the client devices 1210 and 1410 respectively), while in other embodiments the video and audio are separate streams communicated across the P2P connection.

Flow moves from blocks 1822 and 1824 to blocks 1826 and 1828 respectively. At blocks 1826 and 1828, the client devices 1210 and 1410 respectively determine whether they have received one or more video frames from their peer. If they have, then flow moves from blocks 1826 and 1828 to blocks 1830 and 1832 respectively. If they have not, then flow remains at blocks 1826 and 1828 until one or more video frames have been received.

In some embodiments, the client devices 1210 and 1410 wait to receive video frames from each other for a certain amount of time and if they do not exchange video frames over that time alternative action is taken. For example, in some embodiments the video call is cancelled and a message is displayed on the screens of the client devices 1210 and 1410 that the video call could not be established. The video call may fail to establish for a number of reasons including that bandwidth is insufficient for the video call, the video frames have failed to transmit or be received, etc. While in some embodiments the client devices wait for a single frame of video before proceeding, in other embodiments the client devices wait to receive a number of frames over a given time period (e.g., a flow of video frames) before proceeding.

At blocks 1830 and 1832, the client devices 1210 and 1410 respectively transition to the video call. Transitioning to the video call includes displaying the video that is being received and changing the audio route from the circuit switched audio call to the video call. In some embodiments, the video preview (e.g., the video preview 1310) moves to a corner of the screen (and shrinks in size) and the video being received from the peer is revealed. Thus, it should be understood that until the audio route has been changed from the circuit switched audio call to the video call, the participants can communicate through the circuit switched audio call (that is, the circuit switched audio call remains established while the video call is being negotiated). After transitioning to the video call, the circuit switched audio call can be dropped. Thus, flow moves from blocks 1830 and 1832 to blocks 1834 and 1836 respectively where the circuit switched audio call is dropped.

Figure 15:
FIGS. 15 and 16 illustrate client devices after transitioning to a video call according to one embodiment.
Figure 16:
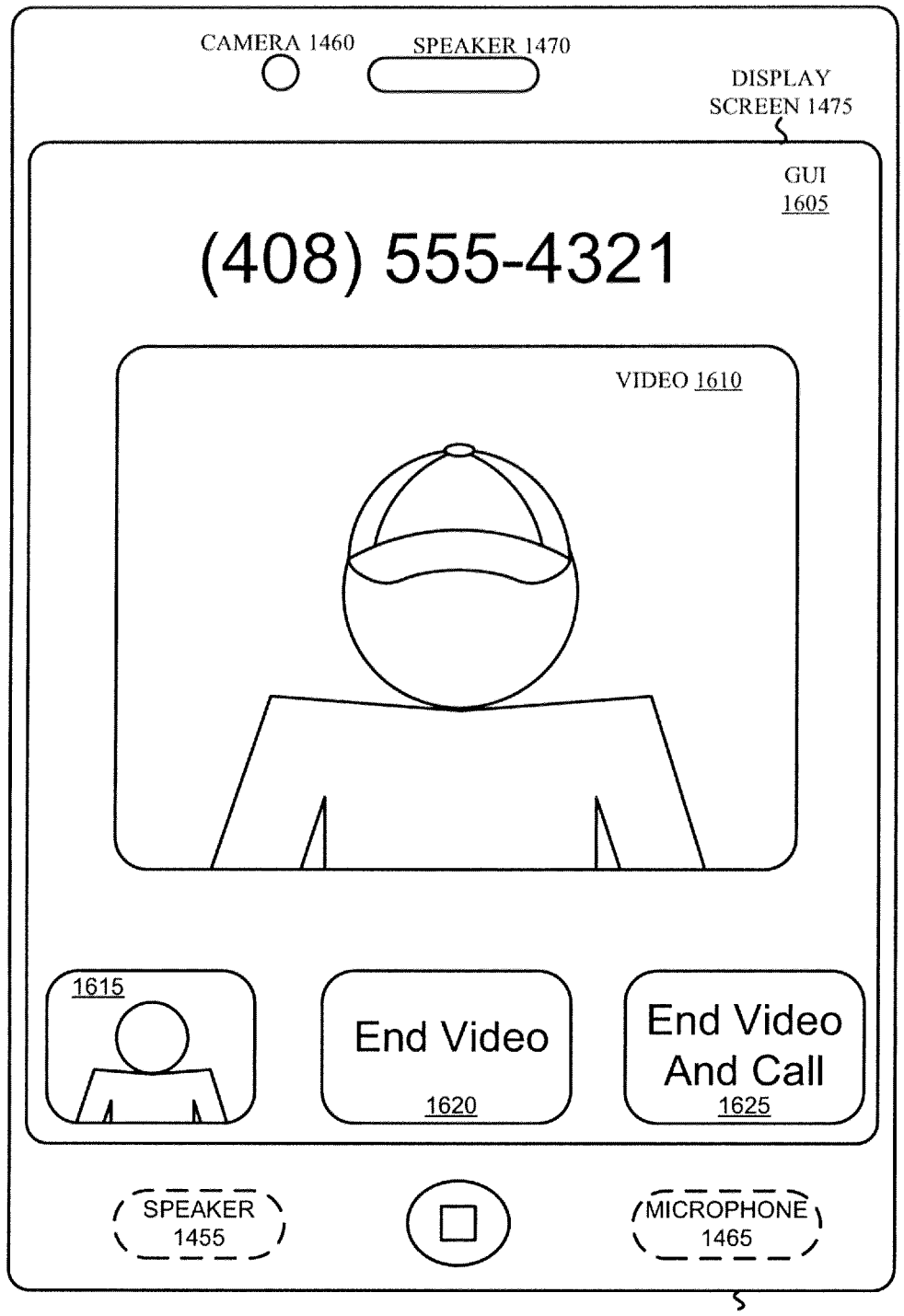

FIGS. 15 and 16 illustrate the client devices 1210 and 1410 respectively after they have transitioned to the video call. As illustrated in FIG. 15, the client device 1210 displays the video 1510, which is video of what is being captured by the front facing camera 1460 of the client device 1410. The client device 1210 also displays the video 1515, which is video of what is being captured by the front facing camera 1260. The GUI 1505 also includes the end video button 1520 and the end video and call button 1625. The end video button 1520 allows the user to end the video call and return to an audio call only. The end video and call button 1525 allows the user to end the video call completely (e.g., to end the conversation with the user at the client device 1410). As illustrated in FIG. 16, the client device 1410 displays the video 1610, which is video of what is being captured by the front facing camera 1260 of the client device 1210. The client device 1410 also displays the video 1615, which is video of what is being captured by the front facing camera 1460. The GUI 1605 also includes the end video button 1620 and the end video and call button 1625.

Figure 19:
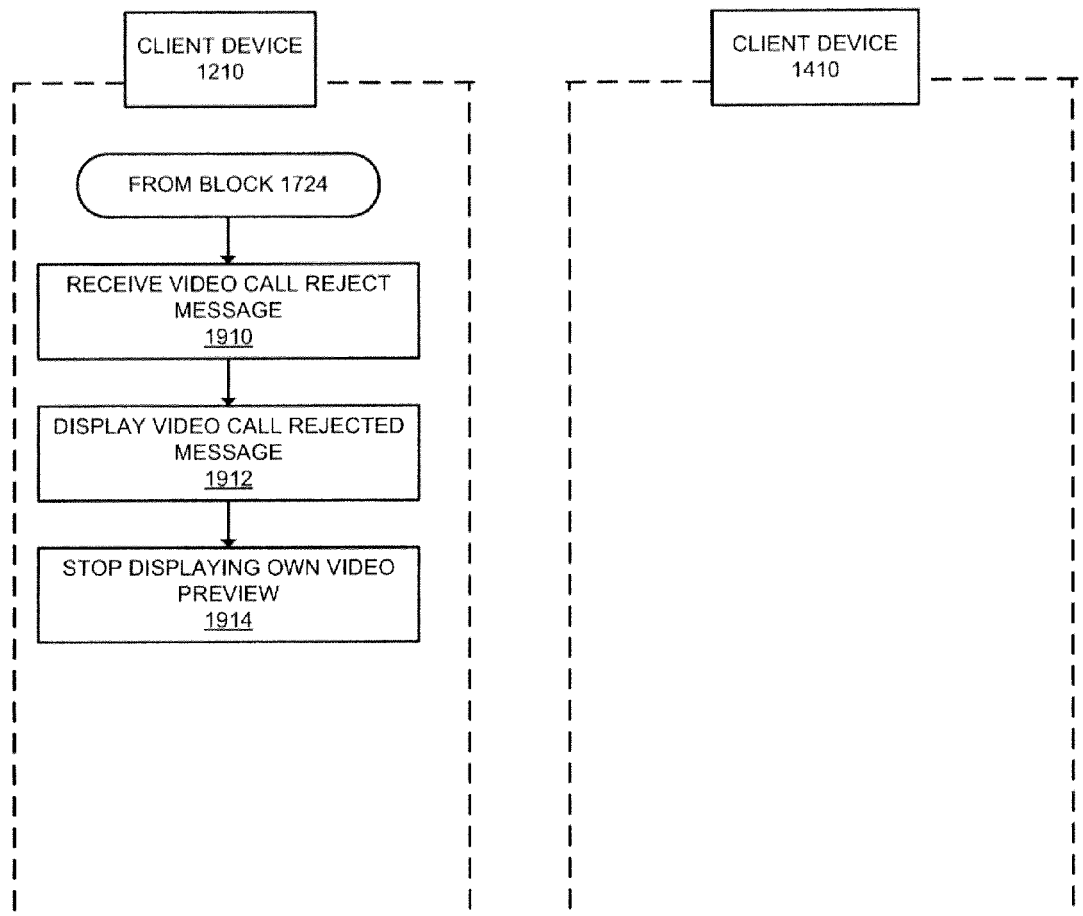
FIG. 19 is a flow diagram illustrating exemplary operations performed on a client device that has received a video call reject message according to one embodiment.

FIG. 19 is a flow diagram illustrating exemplary operations performed on a client device that has received a video call reject message according to one embodiment. At block 1910, the client device 1210 receives a video call reject message (the user at the client device 1410 has rejected the video call invitation). Flow moves from block 1910 to block 1912 and the client device 1210 displays a video call rejected message and optionally plays one or more audio tones indicating receipt of the video call reject message. Flow then moves to block 1914 where the client device 1210 stops displaying its own video preview. The client device 1210 may also prompt the user to return to the original audio output (e.g., through the speaker 1270) if the audio output was previously changed to the speakerphone in block 1718.

Figure 20:
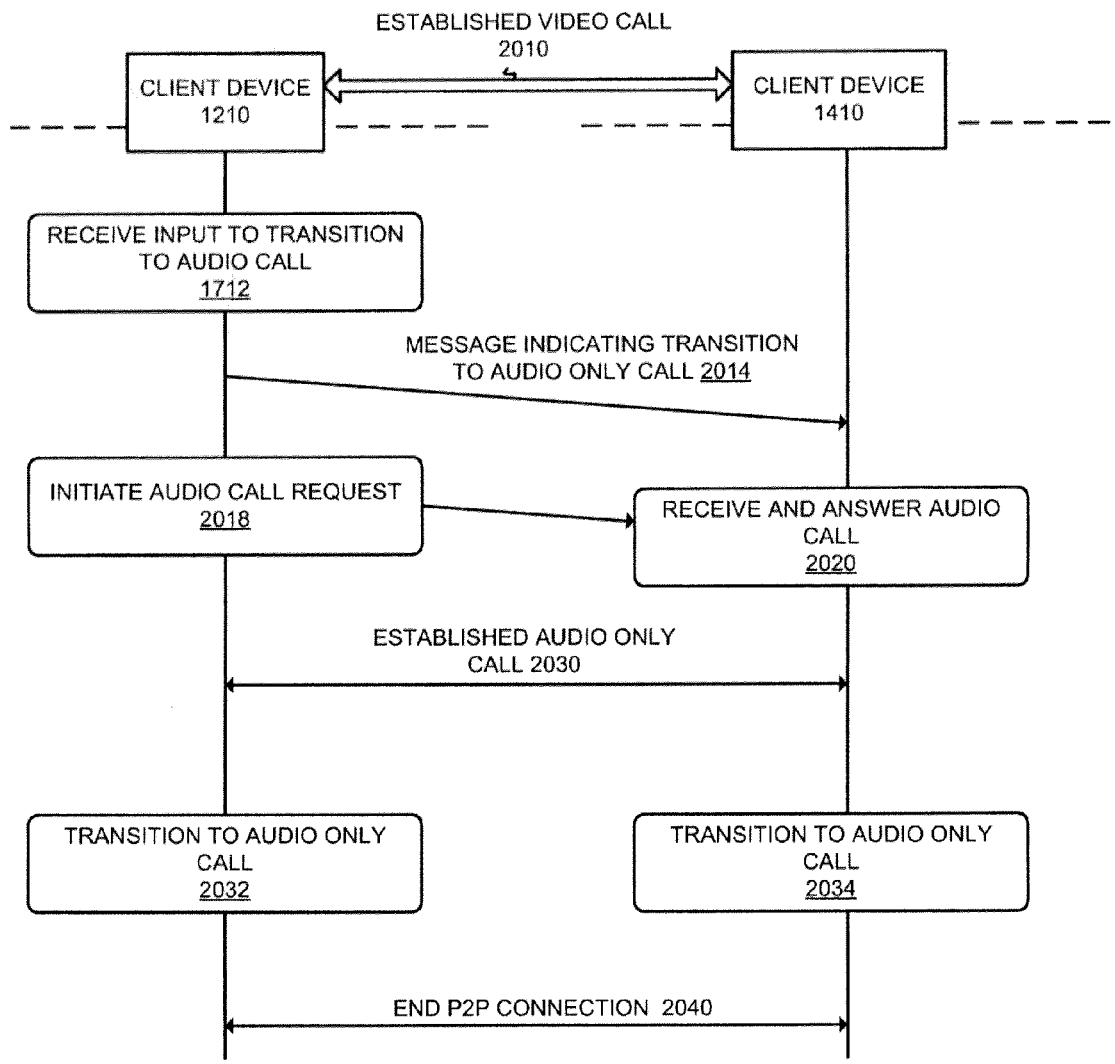
FIG. 20 is a flow diagram illustrating exemplary operations performed on a client device for transitioning from a video call to a circuit switched call according to one embodiment.

FIG. 20 is a flow diagram illustrating exemplary operations performed on a client device for transitioning from a video call to a circuit switched call according to one embodiment. A video call 2010 is established between the client devices 1210 and 1410 (the video call may be established according to mechanisms described in reference to FIGS. 17 and 18 or may be established without transitioning from a circuit switched audio call). At block 1712, the client device 1210 receives input to transition to an audio only circuit switched call. For example, with reference to FIG. 15, the user of the client device 1210 has selected the end video button 1520 (e.g., by tapping or performing another predefined gesture on the end video button 1520). The client device 1210 then transmits a message to the client device 1410 that indicates a transition to an audio only circuit switched call 2014.

The client device 1210 then initiates a circuit switched audio call request to the client device 1410 (e.g., the client device 1210 automatically calls the number of the client device 1410). In some embodiments this is performed in the background and does not require user interaction. The call is routed through a number of network elements of the carrier network infrastructure (e.g., base stations, mobile switching centers, etc.).

The client device 1410 receives and answers the circuit switched call 2020. In one embodiment the client device 1410 displays the incoming call request and may play audio tones indicating the incoming call request (e.g., call waiting tones or other tones), and requires user intervention to answer the call. In another embodiment, the client device 1410 automatically answers the call without user intervention (and may or may not play audio tones indicating the incoming call request). After the call is answered, the audio only circuit switched call is established 2030 between the client devices 1210 and 1410.

After the audio only circuit switched call is successfully established, the client devices 1210 and 1410 transition to the audio only call 2032 and 2034 respectively. For example, transitioning to the audio only call includes changing the audio route from the video call to the circuit switched call, stopping displaying the video that is being received, and stopping transmitting video. The client device may also stop displaying the video preview. Thus, it should be understood that while the circuit switched audio only call is being negotiated, users at the client devices 1210 and 1410 can communicate through the video call (that is, the video call remains established while the audio only circuit switched call is being negotiated). After successfully transitioning to the audio only circuit switched call, the client devices 1210 and 1410 end the P2P connection 2040. The users at the client devices 1210 and 1410 may then communicate through the audio only circuit switched call.

While embodiments of the invention have been described in relation to a video call having two participants, embodiments are not so limited as there may be more participants in the video call. In such embodiments, the client device may display multiple video streams from each different participant in the video chat.

While embodiments of the invention have been described in relation to a video call having two participants where each participant transmits video, embodiments are not so limited. For example, in some embodiments only a single party may be transmitting video to the other participant(s) and those other participant(s) may only be transmitting audio. In some embodiments each participant may determine whether to suspend transmitting video at any point during the video call.

In some embodiments, the quality of the video transmitted during the call is dynamically adjusted based on network conditions. For example, during periods when the network is congested, the bitrate of the video may be lowered. Similarly, during periods when the network is relatively free of congestion, the bitrate of the video may be increased. In some embodiments, if network conditions prevent video from being transmitted, the participant client devices automatically transition to an audio only circuit switched call. Thus, if the bandwidth drops below a certain level, the participant client devices may automatically transition to an audio only circuit switched call (or may prompt the user to transition to an audio only circuit switched call).

Hands-Free Services Support Via a Hands-Free Device for IP Video Calls

Figure 32:
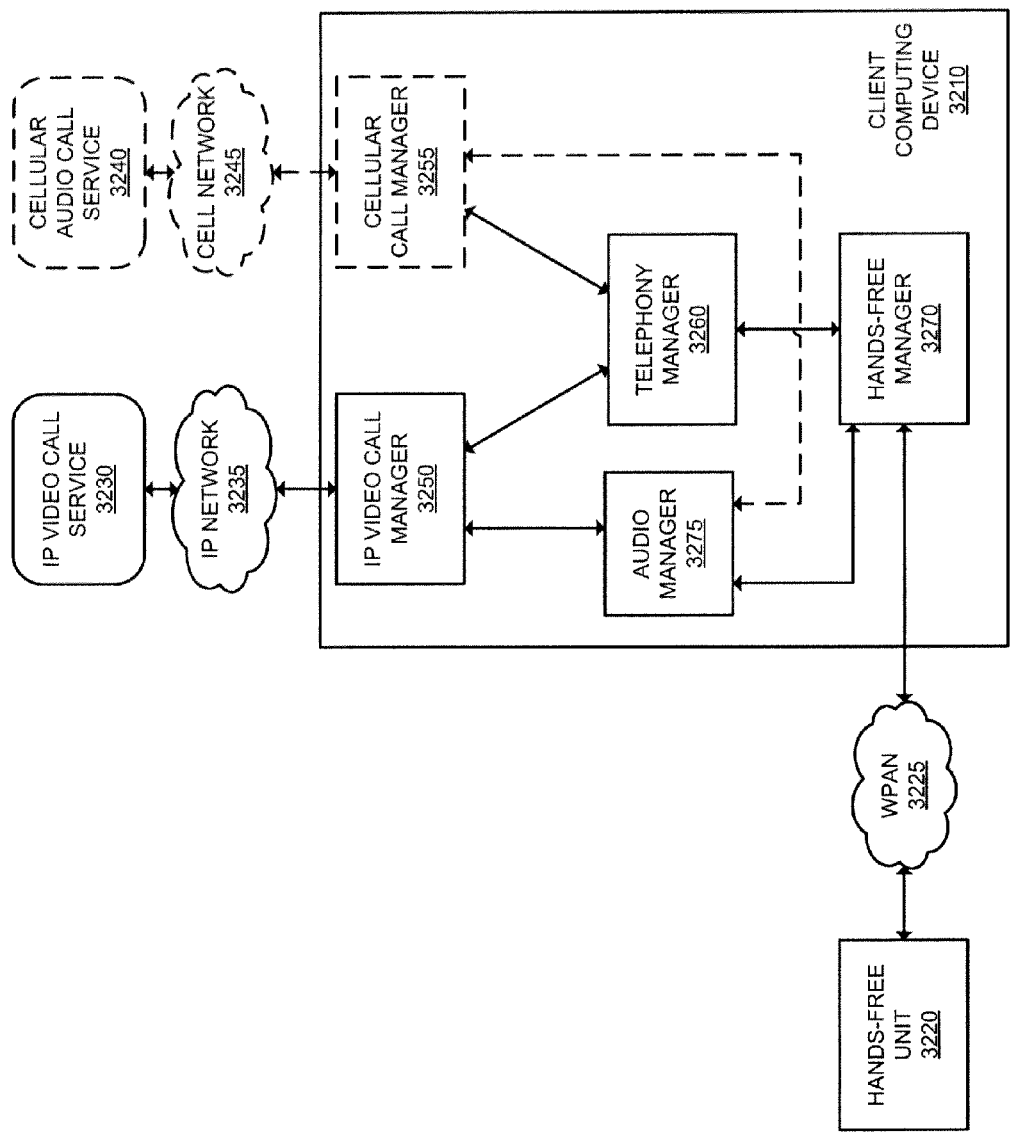
FIG. 32 is a block diagram illustrating a client computing device interfacing with a hands-free unit in accordance with one embodiment.

In one embodiment, the client devices include functionality to support interaction with a hands-free device (e.g., a headset, a car kit) over a WPAN (Wireless Personal Area Network) (e.g., Bluetooth, ZigBee, etc.) including support to manage IP video calls with the hands-free unit. FIG. 32 is a block diagram illustrating a client device interfacing with a hands-free unit to manage IP video calls in accordance with one embodiment. The client device 3210 includes the ability to initiate video calls (e.g., invite one or more recipients to an online communication session that is a video call) and the ability to accept video calls. In some embodiments, the client device 3210 also includes cellular telephony components to make and receive cellular telephone calls and/or access the Internet or other network through a cellular connection.

As depicted in FIG. 32, the client device 3210 includes the IP video call manager 3250, the telephony manager 3260, the audio manager 3275, and the hands-free manager 3270. In some embodiments, the client device 3210 also includes the cellular call manager 3255. The IP video call manager 3250 manages a P2P video call application including establishing an IP P2P video call over the IP network 3235 through the IP video call service 3230 as previously described herein. In one embodiment, the IP video call service 3230 includes one or more of the invitation service 620, the push notification service 640, the registration service 630 and/or the registration service 2130, and the relay service 650. The cellular call manager 3255 manages the cellular components to make and receive audio only cellular telephone calls over the cellular network 3245 using the cellular audio call service 3240.

The IP video call manager 3250 and the cellular call manager 3255 are coupled with the telephony manager 3260. The telephony manager 3260 manages the telephony operations for both of the IP video call manager 3250 and the cellular call manager 3255 including tracking the call history (both for video calls and audio only cellular calls) and other information related to the calls. The telephony manager 3260 also interfaces with the hands-free manager 3270 to provide hands-free services via an external hands-free device for IP video calls and cellular calls on behalf of the IP video call manager 3250 and the cellular call manager 3255. In one embodiment a common message format is used between the IP video call manager 3250, the cellular call manager 3255, and the telephony manager 3260, to provide support for the hands-free services for disparate protocol and call types (IP video call and audio only cellular call). Thus, the telephony manager 3260 provides similar support for hands-free services regardless of whether the hands-free services are for an IP video call or an audio only cellular call. This also prevents the hands-free manager 3270 from the need to understand whether the hands-free services are for an IP video call or for an audio only cellular call such that standard commands that are understandable by the hands-free devices can be used to provide hands-free services for IP video calls as well as for audio only cellular calls.

In one embodiment, the telephony manager 3260 also arbitrates between the IP video call manager 3250 and the cellular call manager 3255. For example, the telephony manager 3260 can cause an IP video call to be placed on hold to switch to an established audio-only cellular call and/or cause an audio-only cellular call to be placed on hold to switch to an IP video call.

The hands-free manager 3270 provides support for hands-free processing. In one embodiment, the hands-free manager 3270 implements a Bluetooth protocol stack for connection to Bluetooth compliant hands-free devices such as Bluetooth headset and Bluetooth car kits. In one specific embodiment, the hands-free manager 3270 implements a Bluetooth headset profile (e.g., as defined in the Headset Profile (HSP) 1.2 specification of Dec. 18, 2008) and/or a Bluetooth hands-free profile (e.g., as defined in the Hands-Free Profile 1.5 (HFP 1.5) specification of Nov. 25, 2005). The hands-free manager 3270 allows the hands-free unit 3220 to act as an auditory relay for an IP video call and for an audio only cellular call over the WPAN 3225, as well as perform other hands-free services. For example, in the case of an IP video call, the audio portion of the call may be routed through the hands-free unit 3220 instead of a speaker of the client device 3210 while the video portion of the call remains being displayed by the client device 3210 (or by an attached display). The hands-free unit 3220 also includes a microphone to capture audio information which is then transmitted to the client computing device 3210. Thus, a user can use the hands-free unit 3220 to talk and or listen to audio during an IP video call and/or during an audio only cellular call.

The hands-free manager 3270 also supports other hands-free services responsive to receiving input from the hands-free unit 3220 including performing one or more of the following for IP video calls and/or audio only cellular calls: allowing a user to answer a call; end a call; place a call on hold; mute a call; increase/decrease volume of a call; transfer audio to the client device; transfer audio to the hands-free unit; place a call; and redial the last call. Thus, a user can use the hands-free unit 3220 to answer an IP video call, end an IP video call, place an IP video call on hold and/or on mute, increase/decrease the volume of an IP video call, transfer audio of the IP video call to be output to a speaker of the client device 3210, transfer audio from the client device 3210 to the hands-free unit 3220, place an IP video call, and redial the last IP video call.

The IP video call manager 3250, the cellular call manager 3255, and the hands-free manager 3270 are also coupled with the audio manager 3275. The audio manager 3275 routes audio of the IP video calls and the audio only cellular calls through different sources. For example, the audio manager 3275 can cause the audio to be output through a speaker of the client device 3210 suitable for speakerphone mode, through a speaker of the client device 3210 used when a user holds the client device 3210 to their ear during a call, through a headset/headphone jack to a headset or headphone that is plugged into the client device 3210, and through a peered hands-free unit (such as the hands-free unit 3220).

Figure 33:
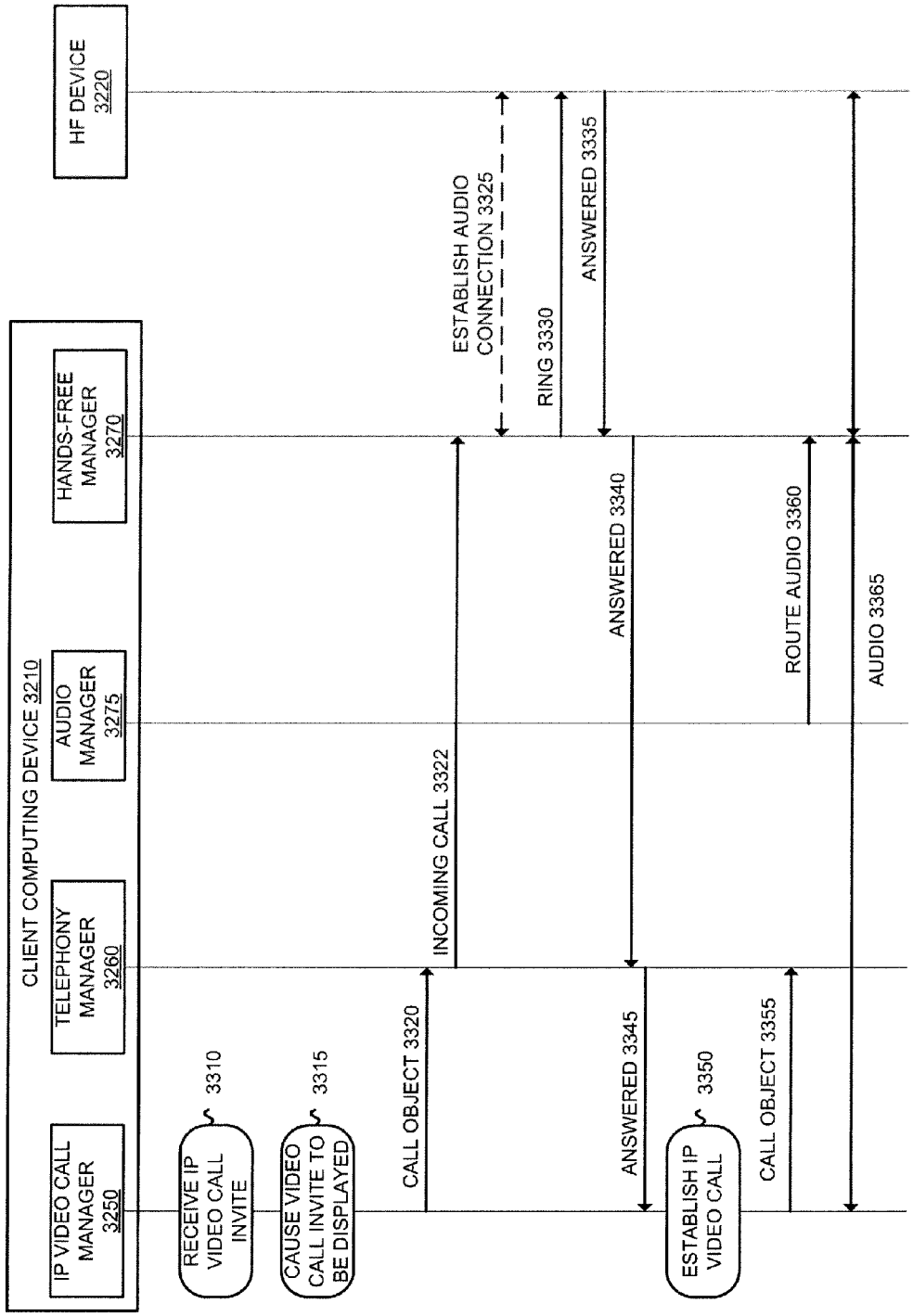
FIG. 33 illustrates a client computing device receiving an invitation for a video call, causing a hands-free device to ring, receiving an answer indication from the hands-free device, establishing the video call, and routing the audio to the hands-free device in accordance with one embodiment.

FIG. 33 illustrates the client device 3210 receiving an invitation for a video call, causing the hands-free device to ring, receiving an answer indication from the hands-free device, establishing the video call, and routing the audio to the hands-free device in accordance with one embodiment. FIG. 33 will be described with reference to the exemplary embodiment of FIG. 32. However, it should be understood that the operations of FIG. 33 can be performed by embodiments other than those discussed with reference to FIG. 32, and the embodiments discussed with reference to FIG. 32 can perform operations different than those discussed with reference to FIG. 33.

At operation 3310, the IP video call manager 3250 receives an IP video call invitation from another client device that invites the user of the client device 3210 to participate in an IP video call. The IP video call invitation may take the form of the invitation as described previously herein. The IP video call manager 3250 processes the invitation request including causing the invitation to be displayed at operation 3315. For example, the invitation request may be displayed in a similar way as the exemplary video call invitation 1440 illustrated in FIG. 14.

In addition, the IP video call manager 3250 generates and transmits a call object 3320 to the telephony manager 3260. The call object 3320 includes a set of parameters regarding the call. For example, the call object parameters include one or more of a status of the call (e.g., connecting), and call participant identifier (e.g., the phone number, email address, or other online communication session endpoint identifier), a start time, an indication whether it is an outgoing or incoming call, and a call identifier used internally to identify the call.

In one embodiment, the call object 3320 is a generic call object that, while the parameters are based on the information from the IP video call invitation, is in a format that is common for both IP video call invitation requests and incoming audio-only cellular calls. Thus, when receiving an incoming audio only cellular call, the cellular call manager 3255 generates a incoming call object of the same format. Thus, from the perspective of the telephony manager 3260, an IP video call invitation request or an incoming audio only cellular call appears to be same.

The telephony manager 3260 stores the information in the call object 3320 as part of a call history structure. The telephony manager 3260 also generates and sends an incoming call message 3322 to the hands-free manager 3270. In one embodiment, the telephony manager 3260 only sends the incoming call message 3322 if there is a hands-free device such as the hands-free device 3220 peered with the client device 3210 (e.g., the telephony manager 3260 first checks whether there is a hands-free device that is peered with the client device 3210). In other embodiments, the telephony manager 3260 sends the incoming call message 33220 to the hands-free manager 3270 regardless of whether there is a peered hands-free device and the hands-free manager 3270 determines whether to drop/ignore the message or process it depending on whether there is a peered hands-free device. For the purposes of FIG. 33 and subsequent Figures, it is assumed that the hands-free device 3220 is peered to the client computing device 3210. In one embodiment, the incoming call message 3322 includes the call identifier.

Responsive to receiving the incoming call message 3322, the hands-free manager 3270 causes a series of messages to be transmitted to the hands-free device 3220 alerting it and the user that there is an incoming call. As depicted in FIG. 33, the hands-free manager establishes an audio connection 3325 (e.g., a Synchronous Connection Oriented (SCO) link) with the hands-free device 3220 prior to sending a ring tone message 3330 over the established audio connection 3325. This ring tone message is selected by the client device 3210 and may be customizable by the user of the client device 3210. In one embodiment, the ring tone message for IP video calls is different than the ring tone for audio only cellular calls. In another embodiment, an audio connection is not established until after the call is answered. In such an embodiment, a ring alert message is sent to the hands-free device 3220 which then determines locally whether to play a ring-tone to alert the user of the incoming call (the ring alert message may also be sent prior to sending the ring tone message 3330). In such an embodiment, the ring alert message may be sent multiple times to the hands-free device 3220 until the call is answered or terminated.

Sometime after receiving the ring alert message and/or the ring message 3330, the hands-free device 3220 transmits the answered message 3335 that indicates that a user has answered the call. For example, the user has pressed an answer button on their hands-free device 3220 or otherwise has taken action on the hands-free device 3220 to answer the call. The hands-free manager 3270 receives the answered message 3335 and transmits an answered message 3340 to the telephony manager 3260. In one embodiment, the answered message 3340 includes the call identifier. Although not illustrated in FIG. 33, the hands-free manager 3270 may also transmit an acknowledgement message to the hands-free device 3220 responsive to receiving the answered message 3335.

The telephony manager 3260 determines that the answered call message 3340 belongs to the call indicated in the call object 3320 (e.g., by comparing the call identifier included in the message 3340 with the information stored from the call object 3320) and transmits a message 3345 to the IP video call manager 3250 that indicates that the call has been answered. Responsive to receiving this message, the IP video call manager 3250 establishes an IP video call at an operation 3350. For example, the IP video call manager 3250 causes an IP video call accept message to be sent to an invitation service as described previously herein and a P2P connection is established (either direct or through a relay) with the computing device that transmitted the invitation.

Sometime after the IP video call has been established, the IP video call manager 3250 transmits a call object 3355 to the telephony manager 3260. The call object 3355 includes a similar set of parameters as the call object 3320 with the exception that the status has changed from connecting to connected. In one embodiment, the call object 3355 is a generic call object that is in a format that is common for both established IP video calls and connected audio-only cellular calls.

In addition, sometime after the IP video call has been established, audio manager 3275 routes the audio portion of the established IP video call through the hands-free device 3220. In one embodiment, the IP video call manager 3250 or the telephony manager 3260 requests the audio manager 3275 to route the audio through the hands-free device. The audio manager 3275 may also transmit a message 3360 to the hands-free manager 3270 that indicates that the audio route will be changed to go through the hands-free device 3220. If an audio connection is not yet established, the hands-free manager 3270 will establish an audio connection with the hands-free device 3220. Assuming that there is an established audio connection, the audio portion 3365 of the video call is routed to the hands-free device 3220. Thus, the audio portion of the video call is handled through the hands-free device 3220 while the video portion of the video call is displayed on the client device 3210.

Figure 34:
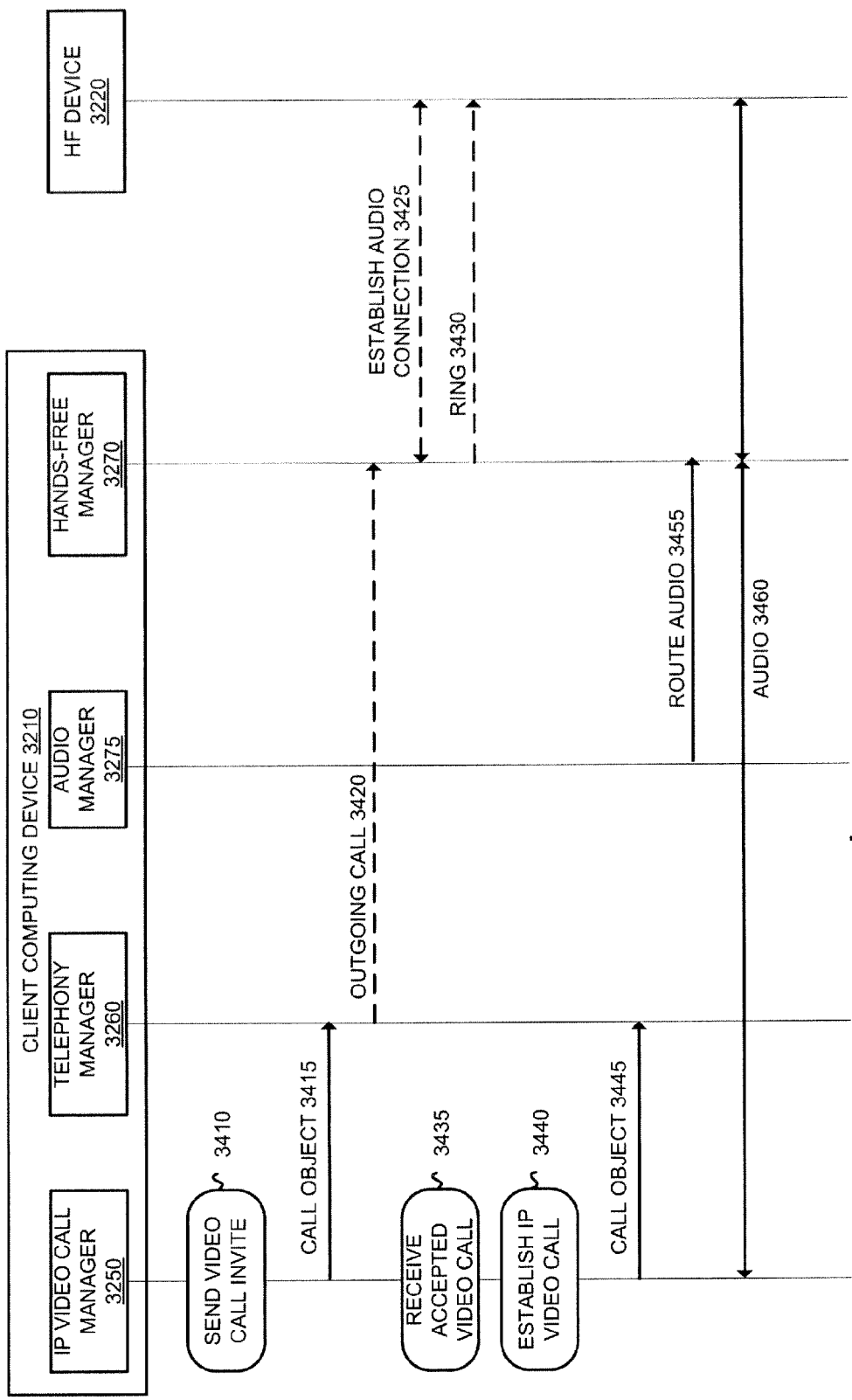
FIG. 34 illustrates a client computing device initiating a video call and routing the audio for the established video call through a hands-free device in accordance with one embodiment.

FIG. 34 illustrates the client device 3210 initiating a video call and routing the audio for the established video call through a hands-free device in accordance with one embodiment. FIG. 34 will be described with reference to the exemplary embodiment of FIG. 32. However, it should be understood that the operations of FIG. 34 can be performed by embodiments other than those discussed with reference to FIG. 32, and the embodiments discussed with reference to FIG. 32 can perform operations different than those discussed with reference to FIG. 34.

At operation 3410, the IP video call manager 3250 causes one or more IP video call invitation messages to be sent to other client device(s) to invite user(s) to an IP video call. The IP video call invitation message(s) may take the form of the invitation as described previously herein. The IP video call manager 3250 generates and transmits a call object 3415 to the telephony manager 3260. Similar to the call object 3320, the call object 3415 includes a set of parameters regarding the call and is in a generic format. The telephony manager 3260 stores the information in the call object 3415 as part of a call history structure.

In one embodiment, the telephony manager 3260 also generates and sends an outgoing call message 3420 to the hands-free manager 3270 that indicates that there is an outgoing call. Responsive to this message, the hands-free manager 3270 establishes an audio connection 3425 with the hands-free device 3220 (if a custom in-band ring tone is to be sent) and then transmits a ring tone message 3430 to the hands-free device 3220. In other embodiment, the hands-free manager 3270 transmits only a ring tone alert message to the hands-free device 3220 instead of establishing an audio connection and transmitting an in-band ring tone.

Sometime after sending the IP video call invitation, the IP video call manager 3250 receives an IP video call accept message 3435, which may take the form of a video call accept message as previously described herein. After receiving this message, a P2P IP video call is established with the accepting client device at operation 3440 (e.g., a P2P connection (either direct or through a relay) is established with the computing device that accepted the invitation).

Sometime after the IP video call has been established, the IP video call manager 3250 transmits a call object 3445 to the telephony manager 3260. The call object 3445 includes a similar set of parameters as the call object 3415 with the exception that the status has changed from connecting to connected. The call object 3445 is also in a generic format. In addition, sometime after the IP video call has been established, audio manager 3275 routes the audio portion of the established IP video call through the hands-free device 3220. In one embodiment, the IP video call manager 3250 or the telephony manager 3260 requests the audio manager 3275 to route the audio through the hands-free device. The audio manager 3275 may also transmit a message 3455 to the hands-free manager 3270 that indicates that the audio route will be changed to go through the hands-free device 3220. If an audio connection is not yet established, the hands-free manager 3270 will establish an audio connection with the hands-free device 3220. Assuming that there is an established audio connection, the audio portion 3460 of the video call is routed to the hands-free device 3220. Thus, the audio portion of the video call is handled through the hands-free device 3220 while the video portion of the video call is displayed on the client device 3210.

Figure 35:
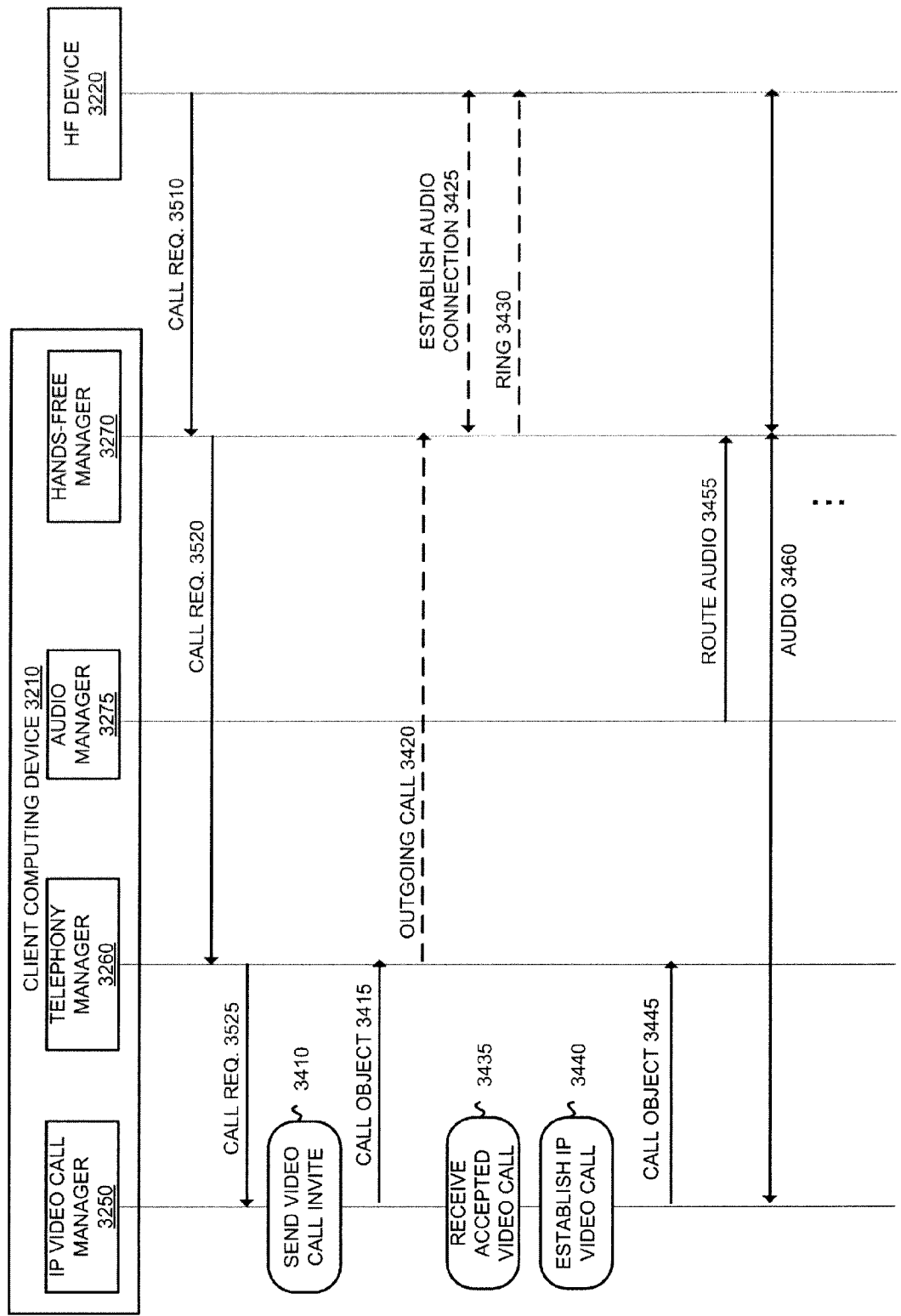
FIG. 35 illustrates a client computing device initiating a video call responsive to receiving a call request from a hands-free device in accordance with one embodiment.

FIG. 35 illustrates the client device 3210 initiating a video call responsive to receiving a call request from the hands-free device 3220 in accordance with one embodiment. FIG. 35 will be described with reference to the exemplary embodiment of FIG. 32. However, it should be understood that the operations of FIG. 35 can be performed by embodiments other than those discussed with reference to FIG. 32, and the embodiments discussed with reference to FIG. 32 can perform operations different than those discussed with reference to FIG. 35.

The hands-free manager 3270 receives a call request 3510 from the hands-free device 3220. The call request 3510 may be generated in response to a user selecting a phone number or other online communication session endpoint identifier to be called. For example, the user may select a redial button on the hands-free device 3220 which requests that the last call be redialed. The hands-free manager 3270 transmits a call request message 3520 to the telephony manager 3260. The telephony manager 3260 determines whether the call request message 3520 is requesting a call to an identifier that is associated with a video call (and thus the call request message should be sent to the IP video call manager 3250) or associated with a phone number for an audio only cellular call (and thus should be sent to the cellular call manager 3255). For example, in case that the call request 3520 is a redial request, the telephony manager 3260 accesses the last dialed call, which can be either an IP video call or an audio only cellular call, to determine where to send the call request. As depicted in FIG. 35, the telephony manager sends the call request message 3525 to the IP video call manager 3250. The call request message 3525 includes the identifier of the requested participant for the video call (e.g., a phone number, an email address, or other online communication session endpoint identifier). Responsive to receiving the call request message 3525, the IP video call manager 3250 causes an IP video call invitation message to be sent to the indicated participant at operation 3410 as described in FIG. 34. The remaining operations depicted in FIG. 35 are performed as described in reference to FIG. 34. Thus, the client device 3210 supports establishing an IP video call as a result of user action at a peered hands-free device.

Figure 36:
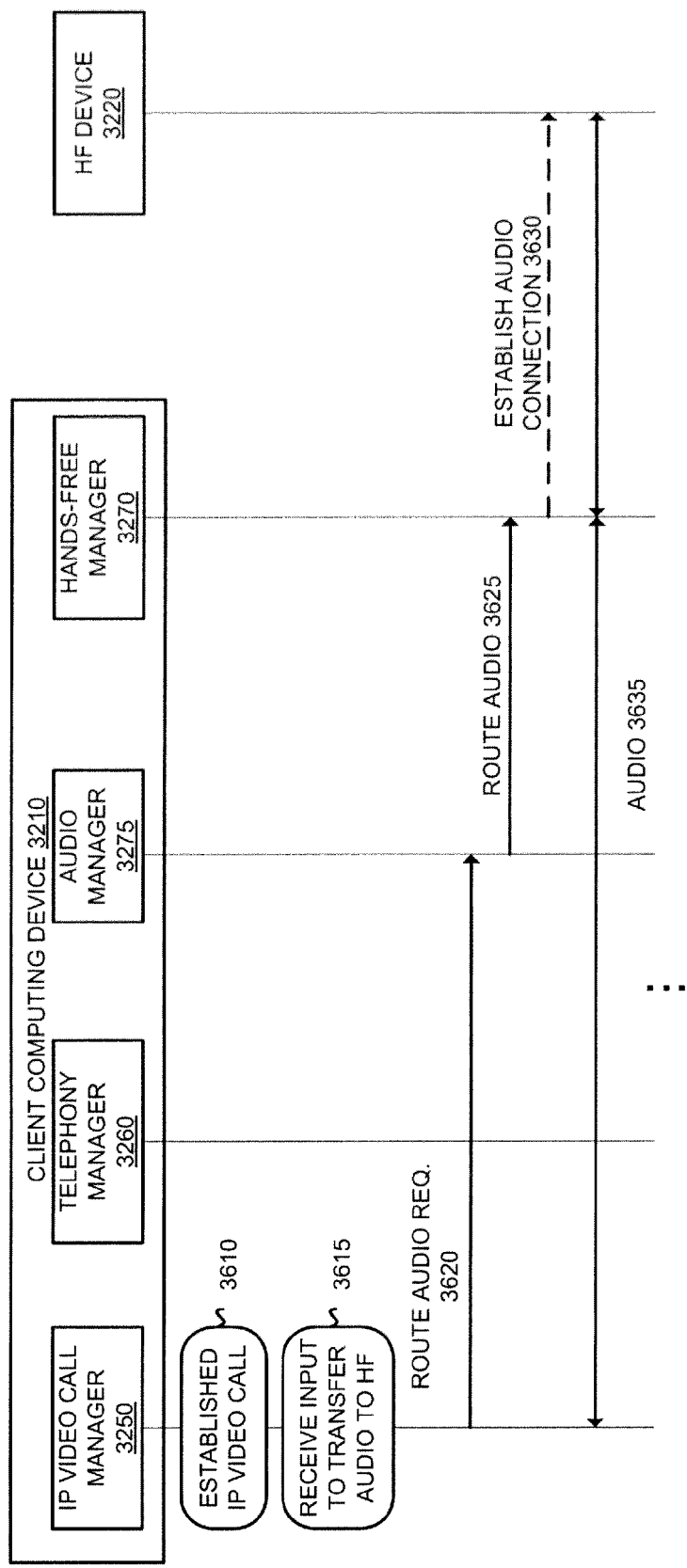
FIG. 36 illustrates a client computing device routing audio of an established video call to a hands-free device in accordance with one embodiment.

FIG. 36 illustrates the client device 3210 routing audio of an established video call to the hands-free device 3220 in accordance with one embodiment. There is an established IP video call 3610 between the client device 3210 and one or more other client devices. The audio portion of this call is currently being output by a speaker of the client device 3210 or through headphones that are plugged in the client device 3210. At operation 3615, the IP video call manager 3250 receives input to transfer the audio to the hands-free device 3220. For example, a user of the client device 3210 has provided input to the IP video call application to transfer the audio to a peered hands-free device. Responsive to receiving such input, the IP video call manager 3250 sends an audio route request 3620 to the audio manager 3275 to route the audio portion of the video call through the hands-free device 3220. The audio manager 3275 may transmit a message 3625 to the hands-free manager 3270 that indicates that the audio route will be changed to go through the hands-free device 3220. If an audio connection is not yet established, the hands-free manager 3270 will establish an audio connection 3630 with the hands-free device 3220. Assuming that there is an established audio connection, the audio portion 3635 of the video call is routed to the hands-free device 3220. Thus, after an IP video call is established, the client device 3210 allows the user to transfer the audio to a hands-free device.

While FIG. 36 illustrates transferring audio to a hands-free device responsive to receiving direct input at the client device, in other embodiments the user may cause the audio to be transferred to the hands-free device 3220 through input at the hands-free device 3220. In such embodiments, the hands-free manager 3270 receives a command from the hands-free device 3220 to transfer the audio. The hands-free manager 3270 then sends the request to the audio manager 3275 which then reroutes the audio.

In addition, while FIG. 36 illustrates transferring audio to a hands-free device, in some embodiments audio can also be transferred from the hands-free device to a speaker (or headphones) of the client device 3210. This can be initiated at the client device 3210 and/or the hands-free device 3220. In such embodiments, the audio manager 3275 receives the route audio request (either from the IP video call manager 3250 or the hands-free manager 3270) to route the audio to the client device 3210 and acts accordingly.

Figure 37:
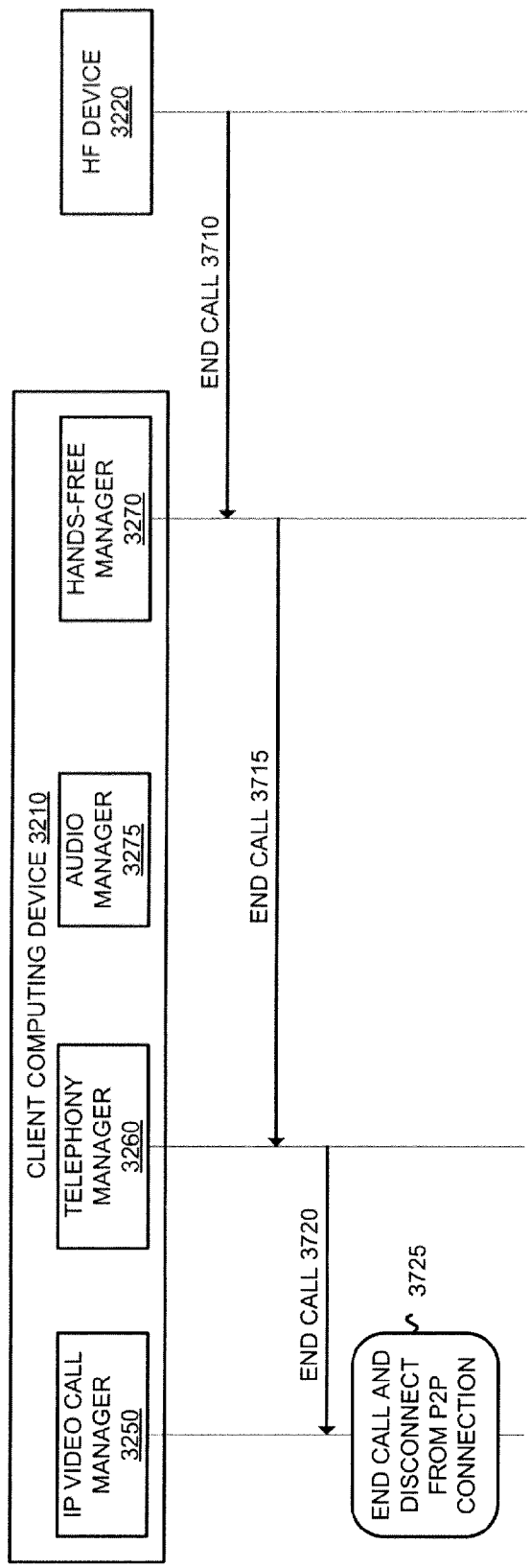
FIG. 37 illustrates a client computing device terminating a video call responsive to receiving an end call request from a hands-free device in accordance with one embodiment.

FIG. 37 illustrates the client device 3210 terminating a video call responsive to receiving an end call request from the hands-free device 3220 in accordance with one embodiment. The hands-free manager 3270 receives an end call message 3710 from the hands-free device 3220 responsive to a user selecting to end a call (e.g., an end button was selected on the hands-free device 3220) at the hands-free device 3220. The hands-free manager 3270 transmits the end call request 3715 to the telephony manager 3260. In one embodiment, the end call request 3715 includes a call identifier to indicate which call to end (in case there are multiple calls). The telephony manager 3260 determines that the call to end is associated with the IP video call manager 3250 and sends the end call message 3720 to the IP video call manager 3250. Responsive to receiving the end call message 3720, the IP video call manager 3250 causes the IP video call to be terminated and cause the client device 3210 to disconnect from the P2P connection. Thus, the client device 3210 supports allowing the user to end an IP video call using a peered hands-free device.

Figure 38:
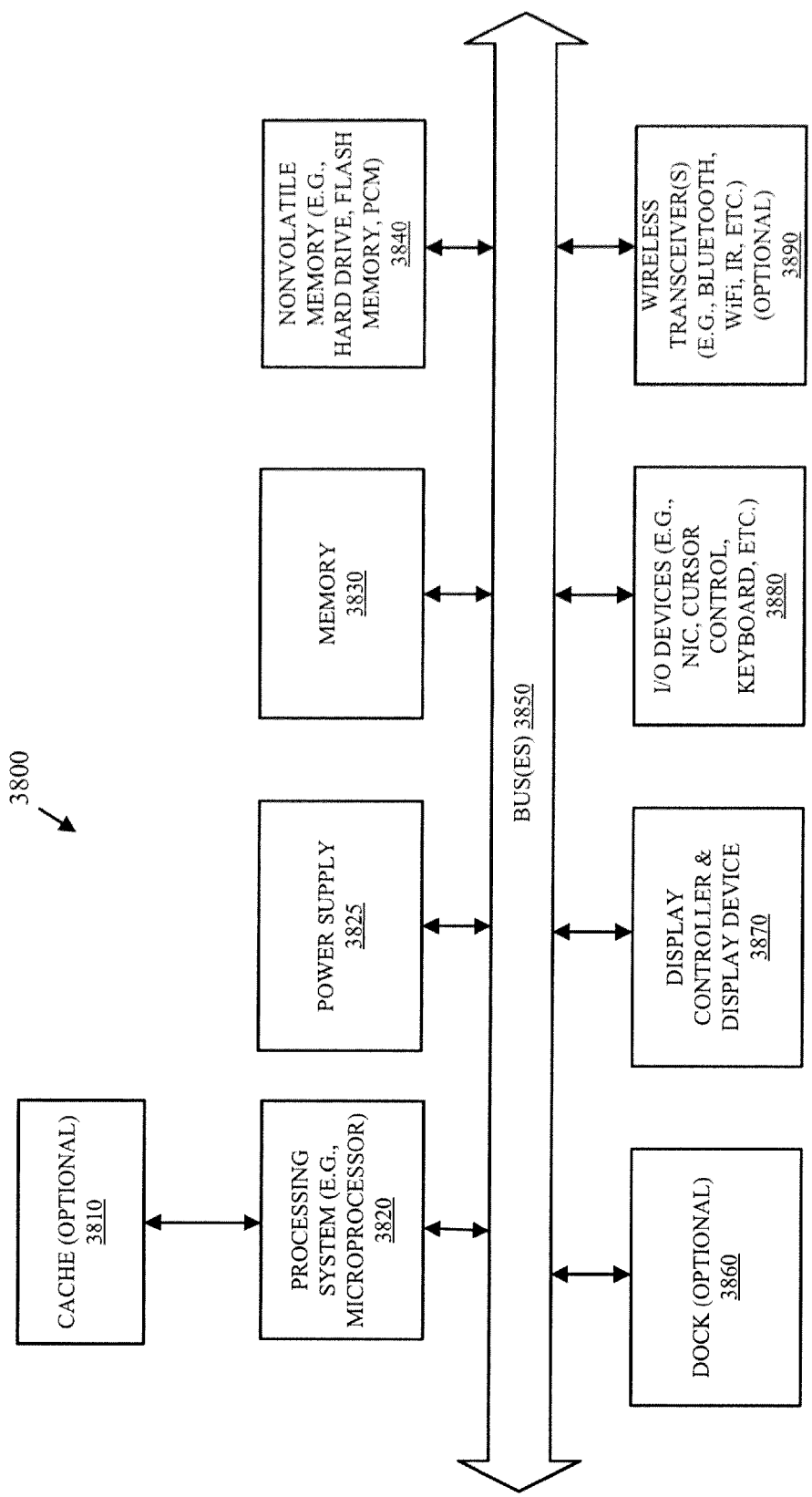
FIG. 38 is a block diagram illustrating an exemplary computer system which may be used in some embodiments.

FIG. 38 is a block diagram illustrating an exemplary computer system which may be used in some embodiments. For example, the exemplary architecture of the computer system 3800 may be included in the client devices 110, 1210, 1410, 2110, 2610, 3210, etc. or other computing devices described herein. It should be understood that while FIG. 38 illustrates various components of a computer system, it is not intended to represent any particular architecture or manner of interconnecting the components as such details are not germane to the present invention. It will be appreciated that other computer systems that have fewer components or more components may also be used.

As illustrated in FIG. 38, the computer system 3800, which is a form of a data processing system, includes the bus(es) 3850 which is coupled with the processing system 3820, power supply 3825, memory 3830, and the nonvolatile memory 3840 (e.g., a hard drive, flash memory, Phase-Change Memory (PCM), etc.). The bus(es) 3850 may be connected to each other through various bridges, controllers, and/or adapters as is well known in the art. The processing system 3820 may retrieve instruction(s) from the memory 30 and/or the nonvolatile memory 3840, and execute the instructions to perform operations as described above. The bus 3850 interconnects the above components together and also interconnects those components to the optional dock 3860, the display controller & display device 3870, Input/Output devices 3880 (e.g., NIC (Network Interface Card), a cursor control (e.g., mouse, touchscreen, touchpad, etc.), a keyboard, etc.), and the optional wireless transceiver(s) 3890 (e.g., Bluetooth, WiFi, Infrared, etc.).

Figure 39:
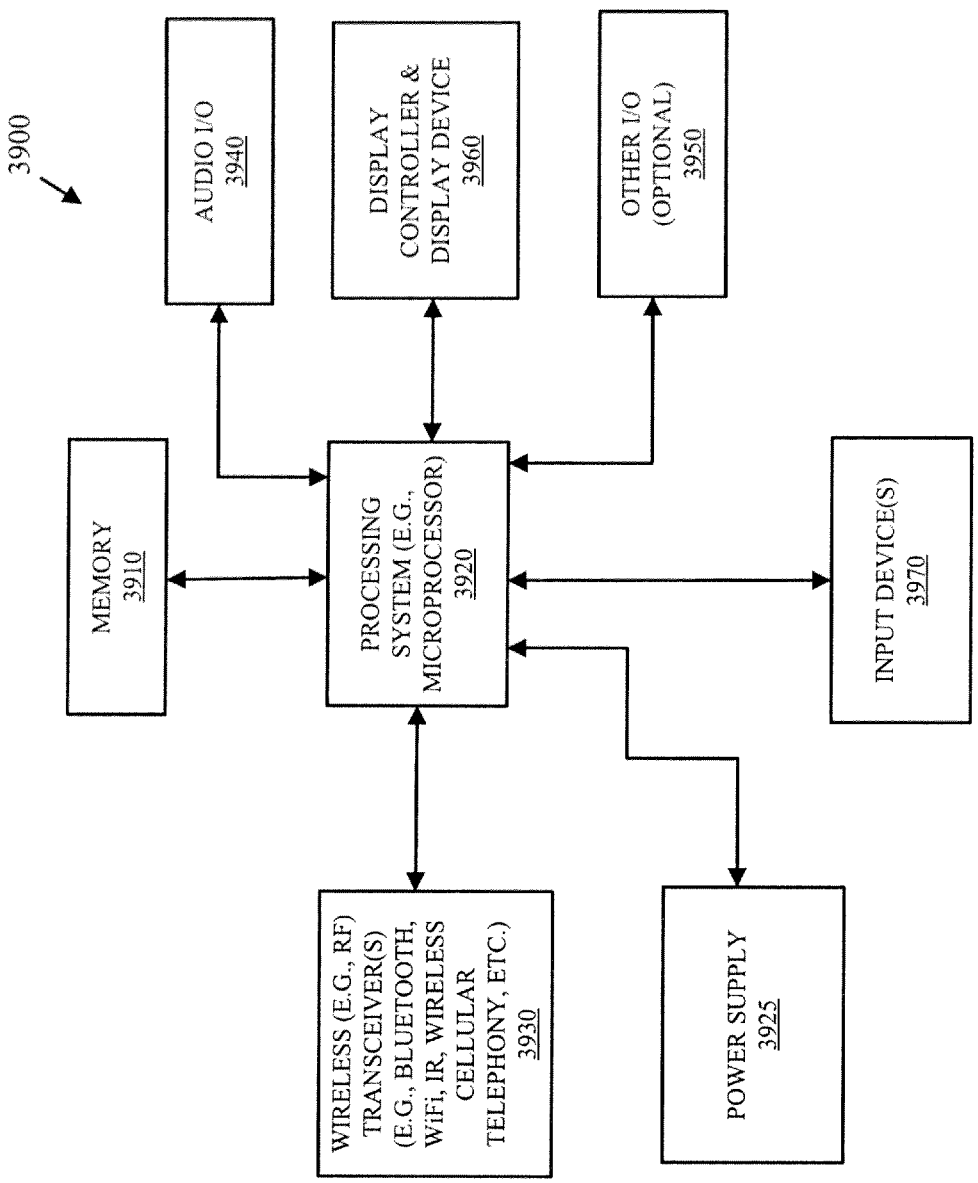
FIG. 39 is a block diagram illustrating an exemplary data processing system which may be used in some embodiments.

FIG. 39 is a block diagram illustrating an exemplary data processing system which may be used in some embodiments. For example, the data processing system 3900 may be a handheld computer, a personal digital assistant (PDA), a mobile telephone, a portable gaming system, a portable media player, a tablet or a handheld computing device which may include a mobile telephone, a media player, and/or a gaming system. As another example, the data processing system 3900 may be a network computer or an embedded processing device within another device.

According to one embodiment, the exemplary architecture of the data processing system 3900 may be included in the client devices 110, 1210, 1410, 2110, 2610, 3210, etc. or other computing devices described herein. The data processing system 3900 includes the processing system 3920, which may include one or more microprocessors and/or a system on an integrated circuit. The processing system 3920 is coupled with a memory 3910, a power supply 3925 (which includes one or more batteries) an audio input/output 3940, a display controller and display device 3960, optional input/output 3950, input device(s) 3970, and wireless transceiver(s) 3930. It will be appreciated that additional components, not shown in FIG. 39, may also be a part of the data processing system 3900 in certain embodiments, and in certain embodiments fewer components than shown in FIG. 39 may be used. In addition, it will be appreciated that one or more buses, not shown in FIG. 39, may be used to interconnect the various components as is well known in the art.

The memory 3910 may store data and/or programs for execution by the data processing system 3900. The audio input/output 3940 may include a microphone and/or a speaker to, for example, play music and/or provide telephony functionality through the speaker and microphone. The display controller and display device 3960 may include a graphical user interface (GUI). The wireless (e.g., RF) transceivers 3930 (e.g., a WiFi transceiver, an infrared transceiver, a Bluetooth transceiver, a wireless cellular telephony transceiver, etc.) may be used to communicate with other data processing systems. The one or more input devices 3970 allow a user to provide input to the system. These input devices may be a keypad, keyboard, touch panel, multi touch panel, etc. The optional other input/output 3950 may be a connector for a dock.

The techniques shown in the figures can be implemented using code and data stored and executed on one or more computing devices (e.g., client devices, servers, etc.). Such computing devices stores and transmits (internally and/or with other computing devices over a network) code (composed of software instructions) and data using machine-readable media, such as non-transitory tangible machine-readable media (e.g., machine readable storage media such as magnetic disks; optical disks; read only memory; flash memory devices) and transitory-propagating signals (e.g., electrical, optical, acoustical or other form of propagated signals—such as carrier waves, infrared signals, digital signals, etc.). In addition, such computing devices typically include a set of one or more processors coupled to one or more other components, such as one or more non-transitory tangible machine-readable media (to store code and/or data), user input/output devices (e.g., a keyboard, a touchscreen, and/or a display), and network connections (to transmit code and/or data using transitory propagating signals). The coupling of the set of processors and other components is typically through one or more busses and bridges (also termed as bus controllers). Thus, a non-transitory machine-readable medium of a given computing device typically stores instructions for execution on the set of one or more processors of that computing device. One or more parts of an embodiment may be implemented using different combinations of software, firmware, and/or hardware.

While operations have been described herein with reference to automatically validating an email address without requiring a user to click on a link included in a validation email message with respect to validating an email address for use as an online communication session endpoint identifier, embodiments are not so limited. For example, in some embodiments the operations described with reference to automatically validating an email address are performed when an email address needs to be validated for other reasons. For example, a user may be registering for a service that requires an email address to be validated as belonging to that user as a part of the registration process. The user provides the email address to the service and receives a message (e.g., through display of a web page of the service) that indicates that the email address needs to be validated and that a validation email message has been sent or will be sent to the email address that was provided (the validation email message may or may not include a validation link). An application on the client device may automatically check an email account corresponding to the email address for the validation message and when it is located, automatically parse the message to locate a validation token and transmit an email address validation message that includes the email address and the validation token to an email validation server associated with the service to validate the email address. While the flow diagrams in the figures show a particular order of operations performed by certain embodiments, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed in a client computing device for providing hands-free services for Internet Protocol (IP) video calls through a hands-free device, comprising:
    receiving an IP video call invitation request that requests the client computing device participate in a P2P (peer-to-peer) IP video call;
    generating a generic incoming call object based on the IP video call invitation request in a format that is common for both incoming audio only cellular calls and IP video call invitation requests, the incoming call object including a set of parameters regarding the incoming call, wherein the set of parameters regarding the call includes a status of the call, a call participant identifier, a start time, and a call identifier;
    alerting the hands-free device of the incoming call based on the incoming call object;
    responsive to receiving an indication from the hands-free device that a user has indicated to answer the incoming call, transmitting an IP video call accept message;

establishing a P2P connection for the P2P IP video call; and
routing an audio portion of the P2P IP video call through the hands-free device such that the hands free device acts as an auditory relay during the P2P IP video call, while displaying a portion of the video call on the client device.

2. The method of claim 1, further comprising establishing an audio connection with the hands-free device after establishing the P2P connection for the P2P IP video call.

3. The method of claim 1, wherein the hands-free device is a car-kit.

4. The method of claim 1, further comprising routing the audio portion of the IP video call through the hands-free device responsive to receiving a command from the hands-free device to transfer the audio.

5. A non-transitory machine-readable storage medium that provides instructions that, when executed by a processor, will cause the processor to perform operations for providing hands-free services for Internet Protocol (IP) video calls through a hands-free device, the operations comprising:
receiving an IP video call invitation request specific to the client computing device that requests the client computing device to participate in a P2P (peer-to-peer) IP video call;
generating a generic incoming call object based on the IP video call invitation request in a format that is common for both incoming audio only cellular calls and IP video call invitation requests, the incoming call object including a set of parameters regarding the incoming call, wherein the set of parameters regarding the call includes a status of the call, a call participant identifier, a start time, and a call identifier;
alerting the hands-free device of the incoming call based on the incoming call object;
responsive to receiving an indication from the hands-free device that a user has indicated to answer the incoming call, transmitting a device specific IP video call accept message;
establishing a P2P connection for the P2P IP video call; and
routing an audio portion of the P2P IP video call through the hands-free device such that the hands free device acts as an auditory relay during the P2P IP video call.

6. The machine-readable storage medium claim 5, further comprising instructions to perform operations including establishing an audio connection with the hands-free device after establishing the P2P connection for the P2P IP video call.

7. The machine-readable storage medium of claim 5, wherein the hands-free device is a car-kit.

8. The machine-readable storage medium of claim 5, further comprising instructions to perform operations including routing the audio portion of the IP video call through the hands-free device responsive to receiving a command from the hands-free device to transfer the audio, while continuing to display a video portion of the video call on the client device.

9. A client computing device, comprising:
a processor system including a system on an integrated circuit;
an internet protocol (IP) video call manager coupled to the processor system, to manage establishment of IP video calls and to generate and transmit a first call object, the first call object including a set of parameters regarding the IP video call;
a cellular call manager coupled to the processor system, to manage establishment of audio only cellular calls, and to generate and transmit a second call object, the second call object including a set of parameters regarding the audio only cellular call, wherein the first call object and second call object have a common format, and wherein the set of parameters regarding the IP video call and the set of parameters regarding the audio only cellular call each include a status of the call, a call participant identifier, a start time, and a call identifier;
a telephony manager coupled with the processing system, the IP video call manager and the cellular call manager to provide hands-free services via an external hands-free device for both IP video calls and audio only cellular calls on behalf of the IP video call manager and the cellular call manager, the hands-free services including: answer an incoming call via the external hands-free device, end a call via the external hands-free device, and initiate a call via the external hands-free device; and
a hands-free manager coupled to the telephony manager, to establish an audio connection with the hands-free device, wherein the hands-free manager sends a request to an audio manager to route an audio portion of the IP video call through the hands-free device while a video portion of the video call is displayed on the client device.

10. The computing device of claim 9, wherein the external hands-free device is a car-kit.

* * * * *